US006420030B1

(12) United States Patent
Hayashi et al.

(10) Patent No.: US 6,420,030 B1
(45) Date of Patent: Jul. 16, 2002

(54) BLACK IRON-BASED COMPOSITE PARTICLES, PROCESS FOR PRODUCING THE SAME, PAINT AND RUBBER OR RESIN COMPOSITION CONTAINING THE SAME

(75) Inventors: Kazuyuki Hayashi, Hiroshima; Yasuyuki Tanaka, Onoda; Hiroko Morii, Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/521,676

(22) Filed: Mar. 8, 2000

Related U.S. Application Data

(63) Continuation-in-part of application No. 09/181,331, filed on Oct. 28, 1998.

(30) Foreign Application Priority Data

Oct. 31, 1997 (JP) .............................................. 9-316150
Mar. 10, 1998 (JP) .............................................. 10-76519
May 6, 1999 (EP) .............................................. 0913431
Nov. 26, 1999 (JP) .......................................... 11-323174

(51) Int. Cl.$^7$ ................................................ B32B 5/16
(52) U.S. Cl. ........................ 428/407; 427/219; 427/220
(58) Field of Search ................................ 428/403, 407, 428/405; 427/219, 220

(56) References Cited

U.S. PATENT DOCUMENTS

| 3,849,152 A | 11/1974 | Mimeault |
| 4,528,240 A | 7/1985 | Miyoshi et al. |
| 4,810,305 A | 3/1989 | Braun et al. |

(List continued on next page.)

FOREIGN PATENT DOCUMENTS

| EP | 0453261 A1 | 10/1991 |
| EP | 0582472 A1 | 2/1994 |
| EP | 913431 | 5/1999 |

(List continued on next page.)

OTHER PUBLICATIONS

XP–00212476 Derwent AN 1990–152560
Publiccation No. 55147638 Abstract "Magnetic Toner" Nov. 1980.

Primary Examiner—Hoa T. Le
(74) Attorney, Agent, or Firm—Nixon & Vanderhye

(57) ABSTRACT

Black iron-based composite particles of the present invention comprise:
  as a core particle black iron oxide particle or black iron oxide hydroxide particle having an average particle size of 0.08 to 1.0 $\mu$m;
  a coating layer formed on the surface of the black iron oxide particle or black iron oxide hydroxide particle, comprising at least one organosilicon compound selected from the group consisting of:
  (1) organosilane compounds obtained from alkoxysilane compounds,
  (2) polysiloxanes, or modified polysiloxanes and
  (3) fluoroalkyl organosilane compounds obtained from fluoroalkylsilane compounds; and
  carbon black coat formed on said coating comprising said organosilicon compound, in an amount of 1 to 30 parts by weight based on 100 parts by weight of said black iron oxide particles or black iron oxide hydroxide particles. Such black iron-based composite particles have an excellent dispersibility in a vehicle, or a rubber or resin composition on the basis of a small amount of the carbon black which are desorbed from the surface of the black iron-based composite particles, and a high blackness substantially identical to a blackness of carbon black fine particles used solely, even when carbon black is contained therein only in a small amount.

26 Claims, 2 Drawing Sheets

(X20000)

U.S. PATENT DOCUMENTS

| | | |
|---|---|---|
| 4,818,614 A | 4/1989 | Fukui et al. |
| 4,882,225 A * | 11/1989 | Fukui et al. ................ 428/405 |
| 4,937,157 A | 6/1990 | Haack et al. |
| 5,035,748 A | 7/1991 | Burow et al. |
| 5,246,780 A | 9/1993 | Farer et al. |
| 5,269,842 A | 12/1993 | Katamoto |
| 5,324,571 A | 6/1994 | Koyama et al. |
| 5,340,395 A | 8/1994 | Larmignat et al. |
| 5,364,720 A | 11/1994 | Nakazawa et al. |
| 5,587,232 A | 12/1996 | Hayashi et al. |
| 5,686,012 A | 11/1997 | Hayashi et al. |
| 6,265,069 B1 * | 7/2001 | Bomal et al. ................ 428/405 |

FOREIGN PATENT DOCUMENTS

| | | |
|---|---|---|
| EP | 0945766 A2 | 9/1999 |
| FR | 2030604 | 11/1970 |
| GB | 1178050 | 1/1970 |
| JP | 55147638 | 11/1980 |
| JP | 02097968 | 4/1990 |
| JP | 02097968 A | 4/1990 |
| JP | 11-338191 | 12/1999 |

* cited by examiner (X20000)

(X20000)

(X20000)

(X20000)

BLACK IRON-BASED COMPOSITE PARTICLES, PROCESS FOR PRODUCING THE SAME, PAINT AND RUBBER OR RESIN COMPOSITION CONTAINING THE SAME

CROSS REFERENCE TO RELATED APPLICATION

This is a continuation-in-part of application, Ser. No. 09/181,331 filed Oct. 28, 1998.

BACKGROUND OF THE INVENTION

The present invention relates to black iron-based composite particles, a process for producing the black iron-based composite particles, and a paint and a rubber or resin composition containing the black iron-based composite particles. More particularly, the present invention relates to black iron-based composite particles not only having an excellent dispersibility in a vehicle, or a rubber or resin composition on the basis of a small amount of the carbon black which are desorbed from the surface of the black iron-based composite particles and a high blackness substantially identical to a blackness of carbon black fine particles used solely, even when carbon black is contained therein only in a small amount, but also capable of providing a paint for providing a coating film having an excellent acid resistance or a resin composition having an excellent aging resistance; a process for producing the black iron-based composite particles; a paint containing the black iron-based composite particles, which is excellent in acid resistance; and a rubber or resin composition containing the black iron-based composite particles, which is excellent in aging resistance.

Carbon black fine particles or magnetite particles are well known in the art as typical black pigments, and have been hitherto widely used as colorants for paints, printing ink, cosmetics, rubber or resin compositions or the like.

Among these black pigments, the carbon black fine particles are most excellent in blackness, and a coating film and rubber or resin composition prepared by using the carbon black fine particles also have an excellent acid resistance or aging resistance. However, since the carbon black fine particles have an average particle size as fine as about 0.005 to 0.05 μm, it has been difficult to disperse the particles in a vehicle, or a rubber or resin composition. Further, since the carbon black fine particles have a bulk density as high as about 0.1 g/cm$^3$, it has been difficult to handle the particles, resulting in deteriorated workability. Furthermore, it is also known that the carbon black fine particles have problems concerning safety and hygiene, such as carcinogenosis.

That is, as the amount of the carbon black fine particles used is increased, the blackness tends to become higher. However, when a larger amount of the carbon black fine particles is used, it is more and more difficult to disperse the particles in a vehicle, or a rubber or resin composition, resulting in not only deteriorated workability but also unfavorably causing problems concerning safety and hygiene.

On the other hand, the magnetite particles have a more appropriate particle size than that of the carbon black fine particles, especially an average particle size of about 0.08 to 1.0 μm and are, therefore, excellent in dispersibility in a vehicle, or a rubber or resin composition, resulting in a high handling property. Further, the magnetite particles can show a further advantage such as non-toxicity. However, the magnetite particles are still unsatisfactory in blackness, and the coating film and the rubber or resin composition prepared by using the magnetite particles are also unsatisfactory in acid resistance and aging resistance.

Further, the magnetite particles tend to be magnetically aggregated because of magnetic attracting property thereof. In consequence, in order to improve the dispersibility in a vehicle, or a rubber or resin composition, it is known to use, as non-magnetic black iron-based particles, manganese-containing hematite particles or manganese-containing iron oxide hydroxide particles. However, the blackness of these particles is inferior to that of the magnetite particles.

In recent years, it has been required to improve various properties of black particles as colorants. There has been a strong demand for such black particles capable of showing useful properties of the carbon black fine particles as well as those of black iron oxide particles such as magnetite particles and black manganese-containing hematite particles or black iron oxide hydroxide particles such as black manganese-containing goethite particles.

Especially, it has been strongly demand to provide such black particles capable of showing a high blackness substantially identical to a blackness of the carbon black fine particles used solely, even when the carbon black fine particles which are deteriorated in workability such as handing property and have problems concerning safety and hygiene, are contained therein only in a small amount; capable of providing a paint for providing a coating film having an excellent acid resistance or a resin composition having an excellent aging resistance; and further capable of exhibiting an excellent dispersibility in a vehicle, or a rubber or resin composition.

To satisfy these demands, it has been attempted to produce black composite particles composed of the carbon black fine particles and the magnetite particles, and having useful properties of both the particles. For example, there are known 1) a method comprising steps of adding a water dispersion containing carbon black fine particles to a water suspension containing magnetite particles precipitated from an aqueous solution and then mixing and stirring the resultant mixture, thereby causing the carbon black fine particles to be absorbed onto surfaces of the magnetite particles (Japanese Patent Publication (KOKOKU) No. 50-13300 (1975)); 2) a method comprising a step of introducing an iron-containing waste sludge in which high-molecular weight organic materials such as molasses are dissolved, and a carbon black-containing hot gas into a spray reactor at a temperature of 450 to 850° C., thereby producing magnetite particles from iron salts and simultaneously bonding the carbon black onto surfaces of the obtained magnetite particles using the molasses as a binding accelerator (Japanese Patent Application Laid-open (KOKAI) No. 49-48725 (1974)); 3) a method comprising steps of suspending carbon black in an iron salt-containing aqueous solution and then adding alkali to the resultant suspension to co-precipitate carbon black and magnetite particles, thereby obtaining a co-precipitated product whose surfaces are coated with carbon black (Japanese Patent Publication (KOKOKU) No. 55-39580(1980)); 4) a method comprising steps of adhering carbon black or the like on the surfaces of fine plate-like particles and fixing the carbon black or the like thereon using an anionic or cationic surfactant, a nonionic surfactant and an organic functional silane compound (Japanese Patent Application Laid-open (KOKAI) Nos. 6-145556(1994) and 7-316458(1995)); or the like.

At present, it have been most demanded to provide black particles having useful properties of the carbon black fine particles as well as those of the black iron oxide particles or black iron oxide hydroxide particles. However, all of the above mentioned known methods have failed to provide black particles satisfying these useful properties.

Specifically, in the case of the above-mentioned method 1), the desorption percentage of the carbon black still remains high as described in Comparative Examples hereinafter. As a result, when the carbon black-adsorbed magnetite particles are dispersed in vehicle or resin compositions, the carbon black fine particles are desorbed therefrom, i.e., it becomes difficult to uniformly disperse the black particles in vehicles and resin compositions, thereby failing to sufficiently improve the blackness of a paint and rubber or resin composition prepared therefrom.

In the case of the above-mentioned method 2), in order to obtain black particles having a high blackness substantially identical to a blackness of carbon black fine particles used solely, it is required to use the carbon black fine particles in an amount as large as about 280 parts by weight based on 100 parts by weight of the magnetite particles. In the case of the above-mentioned method 3), in order to obtain black particles having a high blackness substantially identical to a blackness of carbon black fine particles used solely, it is also required to use the carbon black fine particles in an amount as large as about 100 to 400 parts by weight based on 100 parts by weight of the magnetite particles. In addition, the carbon black fine particles tend to be desorbed from the surfaces of the co-precipitated product. Further, in the case of the above-mentioned method 4), the particles obtained by this method are not only deteriorated in blackness, but also show a high percentage of desorption of the carbon black fine particles therefrom. Besides, such particles obtained by the method 4) are not black particles.

As a result of the present inventors' earnest studies, it has been found that by forming a coating layer composed of at least one organosilicon compound selected from the group consisting of (1) organosilane compounds obtained from alkoxysilane compounds, (2) polysiloxanes or modified polysiloxanes and (3) fluoroalkyl organosilane compounds obtained from fluoroalkylsilane compounds, on the surface of specific black iron oxide particle or black iron oxide hydroxide particle, and forming a carbon black coat on the formed coating layer such that the amount of the carbon black is 1 to 30 parts by weight based on 100 parts by weight of the black iron oxide particles or black iron oxide hydroxide particles, the obtained black iron-based composite particles can have an excellent dispersibility in a vehicle, or a rubber or resin composition on the basis of a small amount of the carbon black which is desorbed from the surface of the black iron-based composite particles and a high blackness substantially identical to a blackness of carbon black fine particles used solely, even when the carbon black is contained therein only in a small amount, and can provide a coating film having an excellent acid resistance and a rubber or resin composition having an excellent aging resistance. The present invention has been attained on the basis of the above finding.

SUMMARY OF THE INVENTION

An object of the present invention is to provide black iron-based composite particles not only having a high blackness substantially identical to a blackness of carbon black fine particles used solely, even when carbon black is contained therein only in a small amount, but also capable of providing a paint for providing a coating film having an excellent acid resistance and a rubber or resin composition having an excellent aging resistance.

Another object of the present invention is to provide black iron-based composite particles showing a low percentage of desorption of carbon black therefrom, and an excellent dispersibility in a vehicle, or a rubber or resin composition on the basis of a small amount of the carbon black which are desorbed from the surface of the black iron-based composite particles.

A further object of the present invention is to provide a process for producing black iron-based composite particles not only having an excellent dispersibility in a vehicle, or a rubber or resin composition and showing a high blackness substantially identical to a blackness of carbon black fine particles used solely, even when carbon black is contained therein only in a small amount, but also capable of providing a paint for providing a coating film having an excellent acid resistance and a rubber of resin composition having an excellent aging resistance.

A still further object of the present invention is to provide a paint showing less change in gloss and lightness according to an acid resistance test for coating films.

A still further object of the present invention is to provide a rubber or resin composition which exhibits a small deterioration of the rubber or resin used therein.

To accomplish the aims, in a first aspect of the present invention, there is provided black iron-based composite particles comprising:

as a core particle black iron oxide particle or black iron oxide hydroxide particle having an average particle size of 0.08 to 1.0 $\mu$m;

a coating layer formed on the surface of the black iron oxide particle or black iron oxide hydroxide particle, comprising at least one organosilicon compound selected from the group consisting of:

(1) organosilane compounds obtained from alkoxysilane compounds, (2) polysiloxanes, or modified polysiloxanes and (3) fluoroalkyl organosilane compounds obtained from fluoroalkylsilane compounds; and a carbon black coat formed on the said coating layer comprising said organosilicon compound, in an amount of 1 to 30 parts by weight based on 100 parts by weight of said black iron oxide particles or black iron oxide hydroxide particles.

In a second aspect of the present invention, there is provided black iron-based composite particles comprising:

black iron oxide particles or black iron oxide hydroxide particles having an average particle size of 0.08 to 1.0 $\mu$m;

a coat formed on at least a part of the surface of the black iron oxide particle or black iron oxide hydroxide particle, comprising at least one compound selected from the group consisting of hydroxides of aluminum, oxides of aluminum, hydroxides of silicon and oxides of silicon;

a coating layer formed on the coat formed on the surface of the black iron oxide particle or black iron oxide hydroxide particle, comprising at least one organosilicon compound selected from the group consisting of:

(1) organosilane compounds obtained from alkoxysilane compounds, (2) polysiloxanes, or modified polysiloxanes and (3) fluoroalkyl organosilane compounds obtained from fluoroalkylsilane compounds; and a carbon black coat formed on the said coating layer the comprising said organosilicon compound, in an amount of 1 to 30 parts by weight based on 100 parts by weight of said black iron oxide particles or black iron oxide hydroxide particles.

In a third aspect of the present invention, there is provided a process for producing black iron-based composite particles, which process comprises:

mixing as core particles black iron oxide particles or black iron oxide hydroxide particles having an average particle size of 0.08 to 1.0 μm together with at least one compound selected from the group consisting of:
(1) alkoxysilane compounds,
(2) polysiloxanes or modified polysiloxanes, and
(3) fluoroalkylsilane compounds by using an apparatus capable of applying a shear force to the core particles, thereby coating the surface of said black iron oxide particle or black iron oxide hydroxide particle with the said compounds;

mixing the black iron oxide particles or black iron oxide hydroxide particles coated with the said compounds with carbon black fine particles having an average particle size of 0.005 to 0.05 μm in an amount of 1 to 30 parts by weight based on 100 parts by weight of the core particles by using an apparatus capable of applying a shear force, thereby forming a carbon black coat on the coating layer comprising the organosilicon compounds.

In a fourth aspect of the present invention, there is provided a paint comprising:
a paint base material, and
black iron-based composite particles comprising:
as a core particle black iron oxide particle or black iron oxide hydroxide particle having an average particle size of 0.08 to 1.0 μm;
a coating layer formed on the surface of the black iron oxide particle or black iron oxide hydroxide particle, comprising at least one organosilicon compound selected from the group consisting of:
(1) organosilane compounds obtained from alkoxysilane compounds,
(2) polysiloxanes, or modified polysiloxanes and
(3) fluoroalkyl organosilane compounds obtained from fluoroalkylsilane compounds; and
a carbon black coat formed on the said coating layer comprising said organosilicon compound, in an amount of 1 to 30 parts by weight based on 100 parts by weight of said black iron oxide particles or black iron oxide hydroxide particles.

In a fifth aspect of the present invention, there is provided a rubber or resin composition comprising:
a base material for rubber or resin composition, and black iron-based composite particles comprising:
as a core particle black iron oxide particle or black iron oxide hydroxide particle having an average particle size of 0.08 to 1.0 μm;
a coating layer formed on the surface of the black iron oxide particle or black iron oxide hydroxide particle, comprising at least one organosilicon compound selected from the group consisting of:
(1) organosilane compounds obtained from alkoxysilane compounds,
(2) polysiloxanes, or modified polysiloxanes and
(3) fluoroalkyl organosilane compounds obtained from fluoroalkylsilane compounds; and
a carbon black coat formed on the said coating layer comprising said organosilicon compound, in an amount of 1 to 30 parts by weight based on 100 parts by weight of said black iron oxide particles or black iron oxide hydroxide particles.

DETAILED DESCRIPTION OF THE INVENTION

Figure 1:
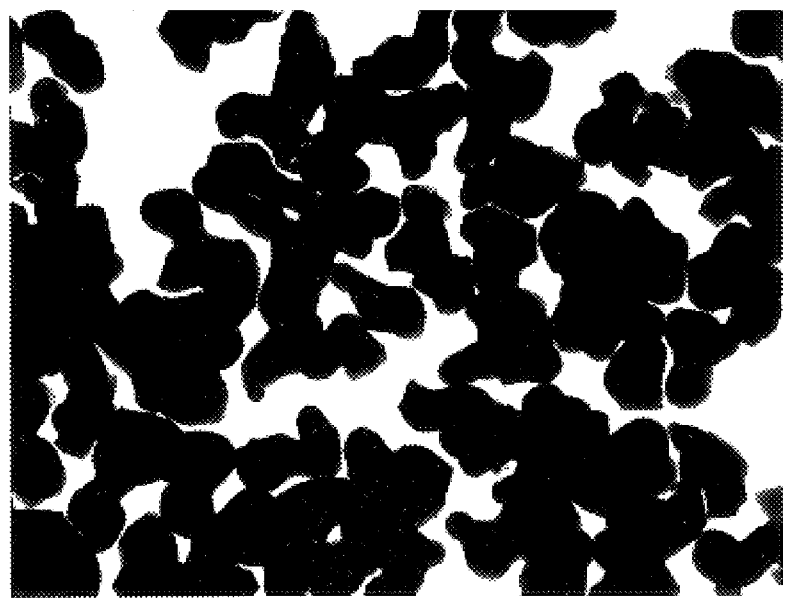
FIG. 1 is an electron photograph (×20,000) showing a particle structure of black manganese-containing hematite particles used in Example 1.

The particle shape and particle size of the black iron-based composite particles according to the present invention are considerably varied depending upon those of black iron oxide particles or black iron oxide hydroxide particles as core particles. Specifically, the black iron-based composite particles according to the present invention are substantially similar in particle shape to that of the core particles, and have a slightly larger particle size than that of the core particles.

The black iron-based composite particles according to the present invention may have such a particle size as defined below:

(i) In the case where the core particles are granular particles, the lower limit of the average particle size of the black iron-based composite particles is usually 0.082 μm, preferably 0.1 μm, and the upper limit thereof is usually 1.05 μm, preferably 0.7 μm, more preferably 0.5 μm.

(ii) In the case where the core particles are acicular or spindle-shaped particles, the lower limit of the average particle size (average major axis diameter) of the black iron-based composite particles is usually 0.082 μm, preferably 0.1 μm, and the upper limit thereof is usually 1.05 μm, preferably 0.7 μm, more preferably 0.5 μm; and the lower limit of the aspect ratio (average major axis diameter/average minor axis diameter) of the black iron-based composite particles is usually 2, preferably 3, and the upper limit thereof is usually 20, preferably 15, more preferably 10.

(iii) In the case where the core particles are plate-like particles, the lower limit of the average particle size (average plate surface diameter) of the black iron-based composite particles is usually 0.082 μm, preferably 0.1 μm, and the upper limit thereof is usually 1.05 μm, preferably 0.7 μm, more preferably 0.5 μm; and the lower limit of the plate ratio (average plate surface diameter/average thickness) of the black iron-based composite particles is usually 2, preferably 3, and the upper limit thereof is usually 50, preferably 20, more preferably 10.

When the average particle size of the black iron-based composite particles is less than 0.082 μm, the intermolecular force between the particles may be increased, so that it may become difficult to uniformly disperse the particles in a vehicle, or a rubber or resin composition. On the other hand, when the average particle size is more than 1.05 μm, it may become difficult to uniformly disperse the particles in a vehicle, or a rubber or resin composition.

The upper limit of the blackness of the black iron-based composite particles according to the present invention is preferably 18 when represented by a L* value thereof. When the L* value as the upper limit of the blackness is more than 18, the lightness of the black iron-based composite particles is increased and, therefore, the blackness thereof may become insufficient. The upper limit of the blackness is more preferably 17.8 when represented by a L* value. The lower limit of the blackness is preferably about 15 when represented by a L* value.

The percentage of desorption of carbon black from the black iron-based composite particles according to the present invention is usually not more than 20%, preferably not more than 10%. When the desorption percentage of carbon black is more than 20%, the desorbed carbon black tend to inhibit the composite particles from being uniformly dispersed in a vehicle, or a rubber or resin composition upon the production of a paint or a rubber or resin composition.

The black iron-based composite particles according to the present invention have a BET specific surface area of usually 1.0 to 200 m$^2$/g, preferably 2.0 to 150 m$^2$/g, more preferably 2.5 to 100 m$^2$/g.

When the BET specific surface area of the black iron-based composite particles according to the present invention is less than 1.0 m$^2$/g, coarse particles may be produced or sintered particles may be formed therein or therebetween, resulting in adversely affecting the dispersibility of the particles in a vehicle, or a rubber or resin composition. On the other hand, when the BET specific surface area is more than 200 m$^2$/g, the intermolecular force between the particles is increased due to the fineness thereof, so that it may become difficult to disperse the particles in a vehicle, or a rubber or resin composition.

Further, it is preferred that the black iron-based composite particles according to the present invention have a geometrical standard deviation of particle sizes of not more than 1.80. When the geometrical standard deviation of particle sizes is more than 1.80, coarse particles tend to be present among the composite particles, so that it may become difficult to uniformly disperse the particles in a vehicle or a rubber or resin composition. In view of uniform dispersion of the black iron-based composite particles in a vehicle, or a rubber or resin composition, the geometrical standard deviation of particle sizes of the black iron-based composite particles according to the present invention is preferably not more than 1.70. Further, in view of industrial production of the black iron-based composite particles, the lower limit of the geometrical standard deviation of particle sizes is preferably 1.01.

As the black iron oxide particles used as the core particles of the black iron-based composite particles according to the present invention, there may be exemplified magnetite particles or manganese-containing hematite particles which contain manganese in an amount of 5 to 40% by weight based on the weight of the manganese-containing hematite particles. As the black iron oxide hydroxide particles used as the core particles of the black iron-based composite particles according to the present invention, there may be exemplified manganese-containing goethite particles which contain manganese in an amount of 5 to 40% by weight based on the weight of the manganese-containing goethite particles.

Meanwhile, the particle shape of the black iron oxide particles or the black iron oxide hydroxide particles as the core particles is not particularly restricted. For example, there may be used such black iron oxide particles or black iron oxide hydroxide particles having a spherical shape, an octahedral shape, a hexahedral shape, a polyhedral shape, a granular shape, an acicular shape, a spindle-like shape, a plate-like shape or the like.

The black iron oxide particles or the black iron oxide hydroxide particles as the core particles may have such a particle size as defined below.

(i) In the case where the core particles have a spherical shape, an octahedral shape, a hexahedral shape, a polyhedral shape or a granular shape, the lower limit of the average particle size of the core particles is usually 0.08 μm, preferably 0.098 μm, and the upper limit thereof is usually 1.0 μm, preferably 0.68 μm, more preferably 0.48 μm.

(ii) In the case where the core particles are acicular particles or spindle-shaped particles, the lower limit of the average particle size (average major axis diameter) of the core particles is usually 0.08 μm, preferably 0.098 μm, and the upper limit thereof is usually 1.0 μm, preferably 0.68 μm, more preferably 0.48 mm; and the lower limit of the aspect ratio (average major axis diameter/average minor axis diameter) of the core particles is usually 2, preferably 3, and the upper limit thereof is usually 20, preferably 15, more preferably 10.

(iii) In the case where the core particles are plate-like particles, the lower limit of the average particle size (average plate surface diameter) of the core particles is usually 0.08 μm, preferably 0.098 μm, and the upper limit thereof is usually 1.0 μm, preferably 0.68 μm, more preferably 0.48 μm; and the lower limit of the plate ratio (average plate surface diameter/average thickness) of the core particles is usually 2, preferably 3, and the upper limit thereof is usually 50, preferably 20, more preferably 10.

With respect of the blackness of the black iron oxide particles as the core particles, in case of the magnetic particles, the lower limit of the blackness thereof, when represented by the L* value, is usually 18, and the upper limit thereof is usually 25, preferably 24. In the case of the black manganese-containing hematite particles, the lower limit of the blackness thereof as the core particles when represented by the L* value, is usually 18, and the upper limit thereof is usually 30, preferably 28, more preferably 25.

With respect to the blackness of the black iron oxide hydroxide particles as the core particles, in the case of the manganese-containing goethite particles, the lower limit of the blackness thereof, when represented by the L* value, is usually 18, and the upper limit thereof is usually 30, preferably 28, more preferably 25.

When the L* value is more than the above upper limit, the blackness of the core particles is insufficient, thereby failing to obtain the black iron-based composite particles having an excellent blackness according to the present invention.

The black iron oxide particles or black iron oxide hydroxide particles as the core particles may have a BET specific surface area of usually 1.0 to 200 m$^2$/g, preferably 2.0 to 150 m$^2$/g, more preferably 2.5 to 100 m$^2$/g.

Further, it is preferred that the black iron oxide particles or the black iron oxide hydroxide particles used as the core particles in the present invention have a geometrical standard deviation of particle sizes of usually not more than 1.8, preferably not more than 1.7. The lower limit of the geometrical standard deviation of particle sizes of the core particles is preferably 1.01.

The coating layer formed on the surfaces of the core particles, comprises at least one organosilicon compound selected from the group consisting of (1) organosilane compounds obtained from alkoxysilane compounds; (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group; and (3) fluoroalkyl organosilane compounds obtained from fluoroalkylsilane compounds.

The organosilane compounds (1) can be produced from alkoxysilane compounds represented by the formula (I):

$$R^1_a SiX_{4-a} \quad (I)$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

The alkoxysilane compounds may be dried or heat-treated, for example, at a temperature of usually 40 to 200° C., preferably 60 to 150° C. for usually 10 minutes to 12 hours, preferably 30 minutes to 3 hours.

Specific examples of the alkoxysilane compounds may include methyl triethoxysilane, dimethyl diethoxysilane, phenyl triethyoxysilane, diphenyl diethoxysilane, methyl trimethoxysilane, dimethyl dimethoxysilane, phenyl trimethoxysilane, diphenyl dimethoxysilane, isobutyl trimethoxysilane, decyl trimethoxysilane or the like. Among these alkoxysilane compounds, in view of the desorption percentage and the adhering effect of carbon black fine particles, methyl triethoxysilane, phenyl triethyoxysilane, methyl trimethoxysilane, dimethyl dimethoxysilane and isobutyl trimethoxysilane are preferred, and methyl triethoxysilane and methyl trimethoxysilane are more preferred.

As the polysiloxanes (2), there may be used those compounds represented by the formula (II):

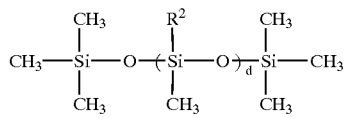

wherein $R^2$ is H— or $CH_3$—, and d is an integer of 15 to 450.

Among these polysiloxanes, in view of the desorption percentage and the adhering effect of carbon black, polysiloxanes having methyl hydrogen siloxane units are preferred.

As the modified polysiloxanes (2-A), there may be used:

(a1) polysiloxanes modified with polyethers represented by the formula (III):

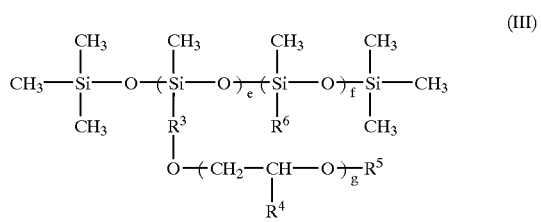

wherein $R^3$ is —($CH_2$)$_h$—; $R^4$ is —($CH_2$)$_i$—$CH_3$; $R^5$ is —OH, —COOH, —CH=$CH_2$, —CH($CH_3$)=$CH_2$ or —($CH_2$)$_j$—$CH_3$; $R^6$ is —($CH_2$)$_k$—$CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

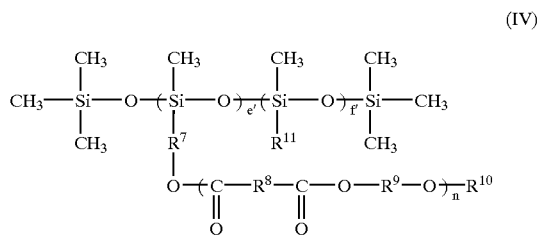

wherein $R^7$, $R^8$ and $R^9$ are —($CH_2$)$_q$— and may be the same or different; $R^{10}$ is —OH, —COOH, —CH=$CH_2$, —CH($CH_3$)=$CH_2$ or —($CH_2$)$_r$—$CH_3$; $R^{11}$ is —($CH_2$)$_s$—$CH_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

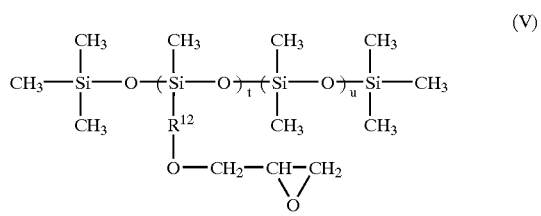

wherein $R^{12}$ is —($CH_2$)$_v$—; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black, the polysiloxanes modified with the polyethers represented by the formula (III), are preferred.

As the terminal-modified polysiloxanes (2-B), there may be used those represented by the formula (VI):

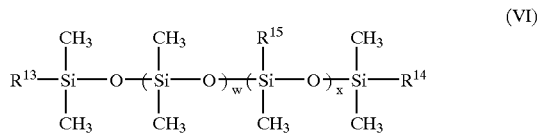

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —($CH_2$)$_y$—; wherein y is an integer of 1 to 15; w is an integer of 1 to 200; and x is an integer of 0 to 100.

Among these terminal-modified polysiloxanes, in view of the desorption percentage and the adhering effect of carbon black, the polysiloxanes whose terminals are modified with carboxylic acid groups are preferred.

The fluoroalkyl organosilane compounds (3) may be produced from fluoroalkylsilane compounds represented by the formula (VII):

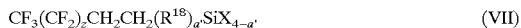

$$CF_3(CF_2)_zCH_2CH_2(R^{18})_{a'}SiX_{4-a'} \qquad (VII)$$

wherein $R^{18}$ is $CH_3$—, $C_2H_5$—, $CH_3O$— or $C_2H_5O$—; X is $CH_3O$— or $C_2H_5O$—; and z is an integer of 0 to 15; and a' is an integer of 0 to 3.

The fluoroalkylsilane compounds may be dried or heat-treated, for example, at a temperature of usually 40 to 200° C., preferably 60 to 150° C. for usually 10 minutes to 12 hours, preferably 30 minutes to 3 hours.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, heptadecafluorodecylmethyl diethoxysilane or the like. Among these fluoroalkylsilane compounds, in view of the desorption percentage and the adhering effect of carbon black fine particles, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

The amount of the coating layer composed of the organosilicon compounds is usually 0.02 to 5.0% by weight, preferably 0.03 to 4.0% by weight, more preferably 0.05 to 3.0% by weight (calculated as Si) based on the weight of the black iron oxide particles or the black iron oxide hydroxide particles coated with the organosilicon compounds.

When amount of the coating layer composed of the organosilicon compounds is less than 0.02% by weight, it may become difficult to adhere carbon black on the coating layer in such an amount enough to improve the blackness thereof. On the other hand, even when the coating amount of the organosilicon compounds is more than 5.0% by weight, a sufficient amount of carbon black can be adhered on the coating layer. However, it is meaningless because the blackness cannot be further improved by using such an excess amount of the organosilicon compounds.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA-100, MA7, #1000, #2400B, #30, MA8, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN INTERNATIONAL CO., LTD.), BLACK PEARLS-L, BLACK PEARLS 1000, BLACK PEARLS 4630, VULCAN XC72, REGAL 660, REGAL 400, etc. (tradename, produced by CABOTT SPECIALTY CHEMICALS INK CO., LTD.), or the like. In view of the compatibility with the organosilicon compounds, MA-100, MA7, #1000, #2400B and #30 are preferred.

The lower limit of the average particle size of the carbon black fine particles used is usually 0.005 μm, preferably 0.01 μm, and upper limit thereof is usually 0.05 μm. preferably 0.035 μm. When the average particle size of the carbon black fine particles used is less than 0.005 μm, the carbon black fine particles used are too fine to be well handled.

On the other hand, when the average particle size thereof is more than 0.05 μm, since the particle size of the carbon black fine particles used is much larger, it is necessary to apply a larger mechanical shear force for forming the uniform carbon black coat on the coating layer composed of the organosilicon compounds, thereby rendering the coating process industrially disadvantageous.

The amount of the carbon black formed is 1 to 30 parts by weight based on 100 parts by weight of the black iron oxide particles or the black iron oxide hydroxide particles as the core particles. When the amount of the carbon black coat formed is less than 1 part by weight, the blackness of the resultant composite particles is unsatisfactory because of insufficient amount of the carbon black coat formed onto the coating layer. On the other hand, when the amount of the carbon black coat formed is more than 30 parts by weight, the carbon black tend to be desorbed from the coating layer because of too much amount of the carbon black coat formed thereonto, though the obtained composite particles can show a sufficient blackness. As a result, the dispersibility of the obtained composite particles in a vehicle, or a rubber or resin composition is deteriorated.

The thickness of carbon black coat formed is preferably not more than 0.04 μm, more preferably not more than 0.03 μm, still more preferably not more than 0.02 μm. The lower limit thereof is more preferably 0.0001 μm.

In the black iron-based composite particles according to the present invention, the surfaces of the black iron oxide particles or the black iron oxide hydroxide particles as the core particles may be preliminarily coated with at least one compound selected from the group consisting of hydroxide of aluminum, oxides of aluminum, hydroxides of silicon and oxides of silicon (hereinafter referred to as "hydroxides and/or oxides of aluminum and/or silicon coat"), if required. In this case, the dispersibility of the obtained composite particles in a vehicle, or a rubber or resin composition may become improved as compared to those having no hydroxides and/or oxides of aluminum and/or silicon coat.

The amount of the hydroxides and/or oxides of aluminum and/or silicon coat is 0.01 to 50% by weight calculated as Al, $SiO_2$ or a sum of Al and $SiO_2$, based on the weight of the black iron oxide particles or the black iron oxide hydroxide particles as the core particles. When the amount of the hydroxides and/or oxides of aluminum and/or silicon coat is less than 0.01% by weight, the dispersibility of the obtained composite particles in a vehicle, or a rubber or resin composition cannot be improved. On the other hand, when the amount of the hydroxides and/or oxides of aluminum and/or silicon coat is more than 50% by weight, the obtained composite particles can exhibit a good dispersibility in a vehicle, or a rubber or resin composition, but it is meaningless because the dispersibility cannot be further improved by using such an excess amount of the hydroxides and/or oxides of aluminum and/or silicon coat.

The black iron-based composite particles using as the core particles the black iron oxide particles or the black iron oxide hydroxide particles having the hydroxides and/or oxides of aluminum and/or silicon coat may be substantially identical in a particle size, a geometrical standard deviation of particle sizes, a BET specific surface area and a blackness (L* value), to those having no hydroxides and/or oxides of aluminum and/or silicon coat.

Next, the process for producing the black iron-based composite particles according to the present invention, is described.

The granular magnetite particles as the core particles according to the present invention may be produced by a so-called wet process, i.e., by passing an oxygen-containing gas such as air through a suspension containing a ferrous hydroxide colloid obtained by reacting a ferrous salt aqueous solution with alkali hydroxide.

The acicular magnetite particles or the spindle-shaped magnetite particles may be produced by first forming acicular goethite particles or spindle-shaped goethite particles by a so-called wet process, i.e., by passing an oxygen-containing gas such as air through a suspension containing either ferrous hydroxide colloid, iron carbonate or iron-containing precipitates obtained by reacting a ferrous salt aqueous solution with alkali hydroxide, alkali carbonate or both of alkali hydroxide and alkali carbonate, and then after filtering-out and washing with water, heat-treating the resultant goethite particles at a temperature of 300 to 500° C. in a reducing atmosphere.

The granular manganese-containing hematite particles as the core particles according to the present invention, may be produced by first forming coated magnetite particles by coating the granular magnetite particles obtained by the above-mentioned wet process, with a manganese compound such that the coating amount of manganese is 8 to 150 atomic % based on whole Fe, or forming magnetite particles containing manganese in an amount of 8 to 150 atomic % based on whole Fe by conducting the above-mentioned wet process for producing the granular magnetite particles in the presence of manganese, and then after filtering-out, washing with water and drying, heat-treating the resultant manganese-coated magnetite particles or the manganese-containing magnetite particles at a temperature of 750 to 1,000° C. in an oxygen-containing gas such as air.

The manganese-containing hematite particles are non-magnetic material and, therefore, free from magnetic aggregation, thereby exhibiting a good dispersibility.

The acicular or spindle-shaped manganese-containing hematite particles may be produced by heat-treating acicular or spindle-shaped goethite particles containing manganese in an amount of 8 to 150 atomic % based on whole Fe which are obtained by the below-mentioned method, at a temperature of 400 to 800° C. in an oxygen-containing gas such as air.

The acicular or spindle-shaped manganese-containing goethite particles according to the present invention, may be produced by conducting the above-mentioned wet process for producing the acicular or spindle-shaped goethite particles, in the presence of manganese, thereby forming acicular or spindle-shaped goethite particles containing manganese in an amount of 8 to 150 atomic % based on whole Fe.

The coating of the black iron oxide particles or the black iron oxide hydroxide particles with the alkoxysilane compounds, the polysiloxanes, the modified polysiloxanes, the terminal-modified polysiloxanes or the fluoroalkylsilane compounds, may be conducted (i) by mechanically mixing and stirring the black iron oxide particles or the black iron oxide hydroxide particles together with the alkoxysilane compounds, the polysiloxanes, the modified polysiloxanes, the terminal-modified polysiloxanes or the fluoroalkylsilane compounds; or (ii) by mechanically mixing and stirring both the components together while spraying the alkoxysilane compounds, the polysiloxanes, the modified polysiloxanes, the terminal-modified polysiloxanes or the fluoroalkylsilane compounds onto the black iron oxide particles or the black iron oxide hydroxide particles. In these cases, substantially whole amount of the alkoxysilane compounds, the polysiloxanes, the modified polysiloxanes, the terminal-modified polysiloxanes or the fluoroalkylsilane compounds added can be applied onto the surfaces of the black iron oxide particles or the black iron oxide hydroxide particles.

In order to uniformly coat the surfaces of the black iron oxide particles or the black iron oxide hydroxide particles with the alkoxysilane compounds, the polysiloxanes, the modified polysiloxanes, the terminal-modified polysiloxanes or the fluoroalkylsilane compounds, it is preferred that the black iron oxide particles or the black iron oxide hydroxide particles are preliminarily diaggregated by using a pulverizer.

As apparatus (a) for mixing and stirring the core particles with the alkoxysilane compounds, the polysiloxanes, the modified polysiloxanes, the terminal-modified polysiloxanes or the fluoroalkylsilane compounds to form the coating layer thereof, and (b) for mixing and stirring carbon black fine particles with the particles whose surfaces are coated with the alkoxysilane compounds, the polysiloxanes, the modified polysiloxanes, the terminal-modified polysiloxanes or the fluoroalkylsilane compounds to form the carbon black coat, there may be preferably used those apparatus capable of applying a shear force to the particles, more preferably those apparatuses capable of conducting the application of shear force, spaturate force and compressed force at the same time. In addition, by conducting the above mixing or stirring treatment (a) of the core particles together with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the core particles may be changed to the organosilane compounds and fluoroalkyl organosilane compounds, respectively.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, the terminal-modified polysiloxanes or the fluoroalkylsilane compounds as uniformly as possible, the conditions of the above mixing or stirring treatment may be appropriately controlled such that the linear load is usually 2 to 200 Kg/cm, preferably 10 to 150 Kg/cm, more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, the terminal-modified polysiloxanes or the fluoroalkylsilane compounds added, is preferably 0.15 to 45 parts by weight based on 100 parts by weight of the black iron oxide particles or the black iron oxide hydroxide particles. When the amount of the alkoxysilane compounds, the polysiloxanes, the modified polysiloxanes, the terminal-modified polysiloxanes or the fluoroalkylsilane compounds added is less than 0.15 part by weight, it may become difficult to adhere the carbon black in such an amount enough to improve the blackness of the obtained composite particles.

On the other hand, when the amount of the alkoxysilane compounds, the polysiloxanes, the modified polysiloxanes, the terminal-modified polysiloxanes or the fluoroalkylsilane compounds added is more than 45 parts by weight, a sufficient amount of the carbon black can be adhered on the surface of the coating layer, but it is meaningless because the blackness of the composite particles cannot be further improved by using such an excess amount of the alkoxysilane compounds, the polysiloxanes, the modified polysiloxanes, the terminal-modified polysiloxanes or the fluoroalkylsilane compounds.

Next, the carbon black fine particles are added to the black iron oxide particles or the black iron oxide hydroxide particles coated with the alkoxysilane compounds, the polysiloxanes, the modified polysiloxanes, the terminal-modified polysiloxanes or the fluoroalkylsilane compounds, and the resultant mixture is continuously mixed and stirred to form a carbon black coat on the surfaces of the coating layer composed of the alkoxysilane compounds, the polysiloxanes, the modified polysiloxanes, the terminal-modified polysiloxanes or the fluoroalkylsilane compounds. In addition by conducting the above mixing or stirring treatment (b) of the carbon black fine particles together with the black iron oxide particles or the black iron oxide hydroxide particles coated with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the the black iron oxide particles or the black iron oxide hydroxide particles may be changed to the organosilane compounds and fluoroalkyl organosilane compounds, respectively.

In the case where the alkoxysilane compounds and the fluoroalkylsilane compounds are used as the coating compound, after the carbon black coat is formed on the surface of the coating layer, the resultant composite particles may be dried or heat-treated, for example, at a temperature of usually 40 to 200° C., preferably 60 to 150° C. for usually 10 minutes to 12 h ours, prefer ably 30 minutes t o 3 hours, thereby forming a coating layer composed of the organo-silicon compounds (1) and the fluoroalkyl organosilicon compounds (3), respectively.

It is preferred that the carbon black fine particles are added little by little and slowly, especially about 5 to 60 minutes.

In order to form carbon black coat onto the coating layer composed of the alkoxysilane compounds, the polysiloxanes, the modified polysiloxanes, the terminal-modified polysiloxanes or the fluoroalkylsilane compounds as uniformly as possible, the conditions of the above mixing or stirring treatment can be appropriately controlled such that the linear load is usually 2 to 200 Kg/cm, preferably 10 to 150 Kg/cm more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the carbon black fine particles added, is preferably 1 to 30 parts by weight based on 100 parts by weight of the black iron oxide particles or the black iron oxide hydroxide particles. When the amount of the carbon black fine particles added is less than 1 part by weight, it may become difficult to form the carbon black coat in such an amount enough to improve the blackness of the obtained composite particles. On the other hand, when the amount of the carbon black fine particles added is more than 30 parts by weight, a sufficient blackness of the resultant composite particles can be obtained, but the carbon black tend to be desorbed from the surface of the coating layer because of too large amount of the carbon black adhered, resulting in deteriorated dispersibility in a vehicle, or a rubber or resin composition.

At least a part of the surface of the black iron oxide particles or the black iron oxide hydroxide particles may be coated with at least one compound selected from the group consisting of hydroxides of aluminum, oxides of aluminum, hydroxides of silicon and oxides of silicon, if required, in advance of mixing and stirring with the alkoxysilane compounds, the polysiloxanes, the modified polysiloxanes, the terminal-modified polysiloxanes or the fluoroalkylsilane compounds.

The coat of the hydroxides and/or oxides of aluminum and/or silicon may be conducted by adding an aluminum compound, a silicon compound or both the compounds to a water suspension in which the black iron oxide particles or the black iron oxide hydroxide particles are dispersed, followed by mixing and stirring, and further adjusting the pH of the suspension, if required, thereby coating the surfaces of the black iron oxide particles or the black iron oxide hydroxide particles with at least one compound selected from the group consisting of hydroxides of aluminum, oxides of aluminum, hydroxides of silicon and oxides of silicon. The thus obtained particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment.

As the aluminum compounds, there may be exemplified aluminum salts such as aluminum acetate, aluminum sulfate, aluminum chloride or aluminum nitrate, alkali aluminates such as sodium aluminate, alumina sols or the like.

The amount of the aluminum compound added is 0.01 to 50.00% by weight (calculated as Al) based on the weight of the black iron oxide particles or the black iron oxide hydroxide particles. When the amount of the aluminum compound added is less than 0.01% by weight, it may be difficult to sufficiently coat the surfaces of the black iron oxide particles or the black iron oxide hydroxide particles with hydroxides or oxides of aluminum or silicon, thereby failing to improve the dispersibility in a vehicle, or a rubber or resin composition. On the other hand, when the amount of the aluminum compound added is more than 50.00% by weight, the coating effect is saturated and, therefore, it is meaningless to add such an excess amount of the aluminum compound.

As the silicon compounds, there may be exemplified water glass #3, sodium orthosilicate, sodium metasilicate, colloidal silic a or the like.

The amount of the silicon compound added is 0.01 to 50.00% by weight (calculated as $SiO_2$) based on the weight of the black iron oxide particles or the black iron oxide hydroxide particles. When the amount of the silicon compound added is less than 0.01% by weight, it may be difficult to sufficiently coat the surfaces of the black iron oxide particles or the black iron oxide hydroxide particles with hydroxides or oxides of silicon, thereby failing to improve the dispersibility in a vehicle, or a rubber or resin composition. On the other hand, when the amount of the silicon compound added is more than 50.00% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 50.00% by weight (calculated as a sum of Al and $SiO_2$) based on the weight of the black iron oxide particles or the black iron oxide hydroxide particles.

Next, the paint containing the black iron-based composite particles according to the present invention is described.

The solvent-based paint containing the black iron-based composite particles according to the present invention can exhibit a $L^*$ value of 15 to 19.5 when formed into a coating film and, therefore, the blackness of the paint is substantially identical to the blackness of the carbon black fine particles solely, even when carbon black is contained therein only in a small amount. In addition, the paint may exhibit a gloss of not less than 85%, an acid resistance ($\Delta G$ value) of not more than 10.0 and a $\Delta L^*$ value of not more than 1,0. In view of the blackness, the $L^*$ value is preferably 15 to 18.5, more preferably 15 to 18; the gloss is preferably not less than 87%, more preferably 88%; the acid resistance represented by a $\Delta G$ value is preferably not more than 9.5, more preferably not more than 9.3; and the $\Delta L^*$ value is preferably not more than 0.9, more preferably not more than 0.8.

The water-based paint containing the black iron-based composite particles according to the present invention can exhibit a $L^*$ value of 15 to 20 when formed into a coating film and, therefore, the blackness of the paint is substantially identical to the blackness of the carbon black fine particles solely, even when carbon black is contained therein only in a small amount. In addition, the paint can exhibit a gloss of not less than 80%, an acid resistance ($\Delta G$ value) of not more than 10.0 and a $\Delta L^*$ value of not more than 1.0. In view of the blackness, the $L^*$ value is preferably 15 to 19, more preferably 15 to 18; the gloss is preferably not less than 83%, more preferably 85%; the acid resistance represented by a $\Delta G$ value is preferably not more than 9.5, more preferably not more than 9.0; and the $\Delta L^*$ value is preferably not more than 0.9, more preferably not more than 0.8.

The blending percentage of the black iron-based composite particles in the paint according to the present invention is 1.0 to 100 parts by weight based on 100 parts by weight of a paint base material. In view of the handling property of the paint, the blending percentage of the black iron-based composite particles in the paint is preferably 2.0 to 100 parts by weight, more preferably 5.0 to 100 parts by weight.

The paint may contain as paint base materials, resins, solvents and if required, a defoamer, an extender pigment, a dryer, a surfactant, a hardener, auxiliaries and the like.

Examples of the resins for the solvent-based paint may include those ordinarily used therefor, such as acrylic resins, alkyd resins, polyester resins, polyurethane resins, epoxy resins, phenol resins, melamine resins, amino resins or the like. Examples of the resins for the water-based paint may also include those ordinarily used therefor, such as water-soluble alkyd resins, water-soluble melamine resins, water-soluble acrylic resins, water-soluble urethane emulsion resins or the like.

Examples of the solvents for the solvent-based paint may include those ordinarily used therefor, such as toluene, xylene, butyl acetate, methyl acetate, methyl isobutyl ketone, butyl cellosolve, ethyl cellosolve, butyl alcohol, hydrocarbons or the like.

As the solvents for the water-based paint, there may be exemplified those ordinarily used therefor, such as water containing butyl cellosolve, butyl alcohol or the like.

As the defoamer, there may be used commercially available products such as NOPCO 8034 (tradename), SN DEFOAMER 477 (tradename), SN DEFOAMER 5013 (tradename), SN DEFOAMER 247 (tradename) or SN DEFOAMER 382 (tradename) (all produced by SUN NOPCO LTD.); ANTIFOAM 08 (tradename) or EMULGEN 903 (tradename) (both produced by KAO CO., LTD.); or the like.

Next, the rubber or resin composition colored by the black iron-based composite particles according to the present invention is described.

The rubber or resin composition colored by the black iron-based composite particles according to the present invention has a $L^*$ value of 15 to 21 and, therefore, can show a high blackness substantially identical to the blackness of the carbon black fine particles solely, even when carbon black is contained therein only in a small amount. In addition, the dispersibility measured by the visual observation is 4 or 5. With respect to the aging resistance, the percentage of discolored portions caused when the composition is heated at 190° C. for 90 minutes is not more than 15%. In view of the blackness, the $L^*$ value is preferably 15 to 20, more preferably 15 to 19.5. The aging resistance is preferably not more than 10%, more preferably not more than 5%.

The blending percentage of the black iron-based composite particles in the rubber or resin composition according to the present invention is 0.5 to 200 parts by weight based on 100 parts by weight of base materials of the rubber or resin composition. In view of the handling property of the rubber or resin composition, the blending percentage of the black iron-based composite particles in the rubber or resin composition is 100 parts by weight.

The rubber or resin composition may contain as base materials, rubber, or known thermoplastic resins and if required, additives such as a lubricant, a plasticizer, an antioxidant, an ultraviolet light absorber or various other stabilizers.

The additives may be added in an amount of not more than 50% by weight based on the total weight of the black iron-based composite particles and the rubber or the resin. When the amount of the additives added is more than 50% by weight, the rubber or resin composition is deteriorated in moldability.

The rubber or resin composition according to the present invention may be produced by preliminarily intimately mixing a raw rubber or resin material and the black iron-based composite particles together and applying a strong shear force to the mixture by a kneader or an extruder to diaggregate agglomerates of the black iron-based composite particles and uniformly disperse the individual black iron-based composite particles in the rubber or resin. The thus produced rubber or resin composition may be formed into an appropriate shape according to the application thereof upon use.

The point of the black iron-based composite particles according to the present invention lies in the following. That is, the black iron oxide particles or the black iron oxide hydroxide particles whose surfaces may be coated with at least one compound selected from the group consisting of hydroxide of aluminum, oxides of aluminum, hydroxides of silicon and oxides of silicon, are coated with the organosilicon compounds, and further coated with carbon black on the surfaces of the coating layer composed of the organosilicon compounds. The thus obtained black iron-based composite particles are not only excellent in dispersibility in a vehicle, or a rubber or resin composition on the basis of a small amount of the carbon black which are desorbed from the surface of the black iron-based composite particles, but also can show a blackness substantially identical to or not lower than the blackness obtained by using carbon black fine particles solely, even when carbon black is contained therein only in a small amount.

The reason why the black iron-based composite particles according to the present invention can show an excellent blackness, is considered as follows. That is, although the carbon black fine particles tend to be ordinarily aggregated due to the fineness thereof, the carbon black coat formed on the surfaces of the black iron oxide particles or the black iron oxide hydroxide particles through the organosilicon compounds applied on the surface of the core particles, is uniform and dense. For this reason, the black iron-based composite particles exhibit high blackness.

The reason why the amount of the carbon black desorbed from the surfaces of the black iron-based composite particles is small, is considered such that the organosilicon compounds onto which the carbon black coat is formed, are strongly bonded to the surface of the black iron oxide particle or the black iron oxide hydroxide particle as a core particle.

Especially, in the case of using the alkoxysilane compounds or the fluoroalkylsilane compounds, metalloxane bonds ($\equiv$Si—O—M; wherein M represents a metal atom contained in the black iron-based core particle, such as Si, Al or Fe) are formed between the metal elements such as Si, Al or Fe which are contained within the black iron oxide particle or the black iron oxide hydroxide particle or present at the surface thereof, and alkoxy groups of the alkoxysilane compounds or the fluoroalkylsilane compounds on which the carbon black coat is formed, so that the organosilicon compounds onto which the carbon black coat is formed, can be more strongly bonded to the surface of the black iron oxide particle or the black iron oxide hydroxide particle.

The reason why the black iron-based composite particles according to the present invention can show an excellent dispersibility in vehicles, or a rubber or resin composition, is considered as follows. That is, due to the face that the amount of the carbon black desorbed from the surface of the black iron-based composite particle is small, it is unlikely that the dispersion in the system is inhibited by the carbon black desorbed. Further, since the carbon black coat is formed on the surface of the black iron-based composite particle, irregularities are formed thereon, whereby the contact between the particles can be effectively prevented.

In addition, it is noted that a coating film having an excellent acid resistance and a rubber or resin composition having an excellent aging resistance can be obtained by using the black iron-based composite particles according to the present invention.

The reason why such a coating film having an excellent acid resistance, or such a rubber or resin composition having an excellent aging resistance can be obtained by using the black iron-based composite particles according to the present invention, is considered as follows. That is, since the carbon black which is inherently excellent in acid resistance and aging resistance, is formed on the surfaces of the black iron oxide particles or the black iron oxide hydroxide particles through the organosilicon compounds, the inherent properties of the black iron oxide particles or the black iron oxide hydroxide particles such as a high oxidizability and a high surface activity can be eliminated. Thus, the inherent properties of the carbon black are effectively exhibited, so that the acid resistance of the coating film and the aging resistance of the rubber or resin composition can be enhanced.

The black iron-based composite particles according to the present invention can show an excellent dispersibility in a vehicle, or a rubber or resin composition on the basis of a small amount of the carbon black which is desorbed from the surface of the black iron-based composite particles and a high blackness substantially identical to the blackness of carbon black fine particles solely, even when carbon black is contained therein only in a small amount, and can provide a paint having an excellent acid resistance and a rubber or resin composition having an excellent aging resistance. As a result, the black iron-based composite particles can be advantageously used as black pigments for paints, printing ink, cosmetics, rubber or resin compositions, or the like.

The paint according to the present invention can exhibit a high blackness substantially identical to the blackness of carbon black fine particles solely, even when carbon black is contained therein only in a small amount, and can form a coating film having an excellent acid resistance. Therefore, the paint according to the present invention can be suitably used as a black paint.

The rubber or resin composition according to the present invention can also exhibit a high blackness substantially identical to the blackness of carbon black fine particles solely, even when carbon black is contained therein only in a small amount, and have an aging resistance. Therefore, the rubber or resin composition according to the present invention can be suitably used as a black rubber or resin composition.

Further, the black iron-based composite particles according to the present invention are excellent in dispersibility in a vehicle, and a rubber or resin composition and, therefore, can show excellent handling property or workability, thereby rendering these particles industrially and economically favorable.

Furthermore, since the amount of the carbon black used is small, the black iron-based composite particles according to the present invention are advantageous in view of safety and hygiene.

EXAMPLES

The present invention will now be described in more detail with reference to the following examples, but the present invention is not restricted to those examples and various modifications are possible within the scope of the invention.

Various properties were evaluated by the following methods.

(1) The average particle sizes of black iron oxide particles, black iron oxide hydroxide Particles, carbon black fine particles used and black iron-based composite particles were respectively expressed by average values (measured in a predetermined direction) of about 350 particles which were sampled from a micrograph obtained by magnifying an original electron micrograph ($\times$20,000) by four times in each of the longitudinal and transverse directions.

(2) The aspect ratio of the particles was expressed by a ratio of average major axis diameter to minor axis diameter thereof.

(3) The geometrical standard deviation of particle sizes was expressed by values obtained by the following method.

That is, the particle sizes were measured from the above magnified photograph. The actual particle sizes and the number of the particles were obtained from the calculation on the basis of the measured values. On a logarithmic normal probability paper, the particle sizes were plotted at regular intervals on the abscissa-axis and the accumulative number of particles belonging to each interval of the particle sizes were plotted by percentage on the ordinate-axis by a statistical technique. The particle sizes corresponding to the number of particles of 50% and 84.13%, respectively, were read from the graph, and the geometrical standard deviation was measured from the following formula:

Geometrical standard deviation={particle size corresponding to 84.13% under integration sieve}/{particle size (geometrical average diameter) corresponding to 50% under integration sieve}

The more the geometrical standard deviation nears 1.0, the more excellent the particle size distribution of the particles.

(4) The specific surface area was expressed by values measured by a BET method.

(5) The amounts of Mn, Al and Si which were present within black iron oxide particles, black iron oxide hydroxide particles and black iron-based composite particles or on the surfaces thereof, and the amount of Si contained in organo-silicon compounds, were measured by a fluorescent X-ray spectroscopy device 3063 (manufactured by RIGAKU DENKI KOGYO CO., LTD.) according to JIS K0119 "General rule of fluorescent X-ray analysis".

(6) The amount of carbon black coat formed on the surface of the black iron oxide particles or black iron oxide hydroxide particles was measured by "Horiba Metal, Carbon and Sulfur Analyzer EMIA-2200 Model" (manufactured by HORIBA SEISAKUSHO CO., LTD.).

(7) The thickness of carbon black coat formed on the surfaces of the black iron-based composite particles is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(8) The blackness of black iron oxide particles, black iron oxide hydroxide particles and black iron-based composite particles, were measured by the following method. That is, 0.5 g of sample particles and 0.7 ml of castor oil were intimately kneaded together by a Hoover's muller to form a paste. 4.5 g of clear lacquer was added to the obtained paste and was intimately mixed to form a paint. The paint was applied on a cast-coated paper by using a 6-mil applicator to produce a coating film piece (having a film thickness of about 30 $\mu$m). The thus obtained coating film piece was measured according to JIS ZU8729 by a multi-light source spectrographic colorimeter MSC-IS-2D (manufactured by SUGA TESTING MACHINES MANUFACTURING CO., LTD.) to determine a L* value of colorimetric indices thereof.

(9) The blackness of each of paints containing black particles, was measured with respect to a coating film produced from the paint having the same composition as that of Example 2 or 3, and the blackness of each of rubber or resin compositions containing black particles, was measured with respect to a resin plate having the same composition as that of Example 4. The respective blackness was expressed by a L* value of colorimetric indices which were measured according to JIS ZU8729 by a multi-light source spectrographic colorimeter MSC-IS-2D (manufactured by SUGA TESTING MACHINES MANUFACTURING CO., LTD.).

Here, the L* value represents a lightness, and the smaller the L* value, the more excellent the blackness.

(10) The dispersibility in a vehicle of paint was measured with respect to a coating film produced in the same manner as in Example 2 or 3, by examining the gloss on the surface of the coating film.

The gloss was measured by irradiating light at an incident angle of 20°, using a glossmeter UGV-5D (manufactured by SUGA TESTING MACHINES MANUFACTURING CO., LTD.).

The higher the gloss, the more excellent the dispersibility.

(11) The viscosity (at 25° C.) of the paint prepared in the same manner as in Example 2 or 3, was measured at a shear rate (D) of 1.92 sec$^{-1}$ by E-type viscometer (cone plate-type viscometer) EMD-R (manufactured by TOKYO KEIKI CO., LTD.).

(12) The dispersibility in rubber or resin composition was evaluated by visually counting the number of undispersed aggregate particles on a surface of the rubber or resin composition obtained in the same manner as in Example 4 and classifying the results into the following five ranks. The 5th rank represents most excellent dispersing condition.

Rank 1: not less than 50 undispersed aggregate particles per 1 cm$^2$ were recognized;

Rank 2: 10 to 49 undispersed aggregate particles per 1 cm$^2$ were recognized;

Rank 3: 5 to 9 undispersed aggregate particles per 1 cm$^2$ were recognized;

Rank 4: 1 to 4 undispersed aggregate particles per 1 cm$^2$ were recognized;

Rank 5: No undispersed aggregate particles were recognized.

(13) The acid resistance of a coating film was measured by the following method. That is, the paints containing the black particles, were applied onto a cold-rolled steel plate (having a size of 0.8 mm×70 mm×150 mm: JIS G-3141) and then dried to prepare a sample on which a coating film having a thickness of 150 $\mu$m was formed. The gloss and blackness of the thus prepared sample were measured.

Next, the sample was suspended by a thread and then was immersed by about 120 mm in depth into a 5 wt. % aqueous sulfuric acid solution of a temperature of 25° C. in a 1,000 cc beaker. The sample was allowed to stand in the suspended condition for 24 hours.

Next, the sample was removed from the aqueous sulfuric acid solution and gently washed with flowing water. After water attached to the sample was removed by shaking, the gloss and blackness of the treated sample were measured at a central portion thereof. Based on the measured values of gloss and blackness before and after the immersion, the amount of change in gloss ($\Delta$G value) and the amount of change in blackness ($\Delta$L* value) between before and after the immersion were obtained, thereby evaluating the acid resistance of the sample. The smaller both the $\Delta$G value and the $\Delta$L* value, the more excellent the acid resistance.

(14) The aging resistance of a rubber or resin composition was measured by the following method. That is, colored resin plates (each having a size of 1.5 cm in length×1.5 cm in width×1 mm in thickness) in which the black particles were mixed and kneaded, were heated at 190° C. to determine a surface area S of discolored portions thereof caused due to deterioration of the resin. The ratios of the discolored surface area S to a surface area $S_0$ (1.5 cm×1.5 cm=2.25 cm²) of the resin plate before heating were determined and represented at intervals of 5%.

That is, the condition that the percentage of $(S/S_0) \times 100$ is 0%, represents that no deterioration of resin was caused. On the other hand, the condition that the percentage of $(S/S_0) \times 100$ is 100%, represents that a whole portion of the resin was deteriorated.

(15) The desorption percentage (T %) of carbon black desorbed from the black iron-based composite particles was measured by the following method.

That is, 3 g of the black iron-based composite particles and 40 ml of ethanol were placed in a 50-ml precipitation pipe and then was subjected to ultrasonic dispersion for 20 minutes. Thereafter, the obtained dispersion was allowed to stand for 120 minutes, and separated the carbon black desorbed from the black iron-based composite particles on the basis of the difference in specific gravity therebetween. Next, the thus separated black iron-based composite particles were mixed again with 40 ml of ethanol, and the obtained mixture was further subjected to ultrasonic dispersion for 20 minutes. Thereafter, the obtained dispersion was allowed to stand for 120 minutes, thereby separating the black iron-based composite particles and carbon black desorbed, from each other. The thus separated black iron-based composite particles were dried at 100° C. for one hour, and then the carbon content thereof was measured by the "Horiba Metal, Carbon and Sulfur Analyzer EMIA-2200 Model" (manufactured by HORIBA SEISAKUSHO CO., LTD.). The desorption percentage (T %) was calculated according to the following formula:

$$T(\%) = \{(W_a - W_e)/W_a\} \times 100$$

wherein $W_a$ represents an amount of carbon black initially formed on the black iron-based composite particles; and $W_e$ represents an amount of carbon black which still remains on the black iron-based composite particles after the above desorption test.

The closer to zero the desorption percentage (T %), the smaller the amount of carbon black desorbed from the black iron-based composite particles.

Example 1

Production of Black Iron-based Composite Particles 20 kg of black manganese-containing hematite particles obtained according to the method described in Japanese Patent Application Laid-open (KOKAI) No. 4-144924 (1992) and shown in the electron photograph (×20,000) of FIG. 1 (particle shape: granular shape; average particle size: 0.30 μm; geometrical standard deviation of particle sizes: 1.46; BET specific surface area value: 3.6 m²/g; Mn content: 13.3 wt. %; and blackness (L* value): 22.6), were diaggregated in 150 liters of pure water using a stirrer, and further passed through a TK pipeline homomixer (manufactured by TOKUSHU KIKA KOGYO CO., LTD.) three times, to obtain a slurry containing the black manganese-containing hematite particles.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the black manganese-containing hematite particles were dispersed.

The black manganese-containing hematite particles in the obtained slurry, which remain on a sieve of 325 meshes (mesh size: 44 μm) was 0%. The slurry was filtered and washed with water, thereby obtaining a wet cake composed of the black manganese-containing hematite particles. The obtained wet cake composed of the black manganese-containing hematite particles was dried at 120° C. 11.0 kg of the dried particles were then charged into an edge runner "MPUV-2 Model" (tradename, manufactured by MATSUMOTO CHUZO TEKKOSHO CO., LTD.), and mixed and stirred at 30 Kg/cm and a stirring speed of 22 rpm for 30 minutes, thereby lightly diaggregating the particles.

110 g of methyl triethoxysilane was mixed and diluted with 200 ml of ethanol to obtain a solution of methyl triethoxysilane. The methyl triethoxysilane solution was added to the thus diaggregated black manganese-containing hematite particles while operating an edge runner "MPUV-2 Model" (tradename, manufactured by MATSUMOTO CHUZO TEKKOSHO CO., LTD.). The black manganese-containing hematite particles were continuously mixed and stirred at a linear load of 60 Kg/cm and a stirring speed of 22 rpm for 60 minutes to form a coating layer composed of methyl triethoxysilane on the surface of the black manganese-containing hematite particles.

Figure 2:
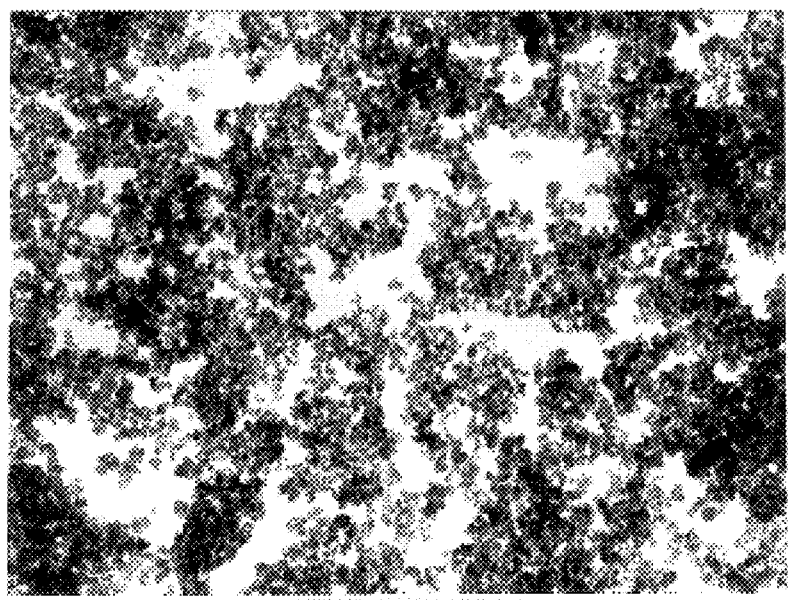
FIG. 2 is an electron photograph (×20,000) showing a particle structure of carbon black fine particles used in Example 1.

Next, 990 g of carbon black fine particles as shown in the electron photograph (×20,000) of FIG. 2 (particle shape: granular shape; particle size: 0.022 μm; geometrical standard deviation of particle sizes: 1.68; BET specific surface area value: 134 m²/g; and blackness (L* value): 16.6), were added to the black manganese-containing hematite particles coated with methyl triethoxysilane for 10 minutes while operating an edge runner "MPUV-2 Model" (tradename, manufactured by MATSUMOTO CHUZO TEKKOSHO CO., LTD.). Further, the particles were continuously mixed and stirred at a linear load of 60 Kg/cm and a stirring speed of 22 rpm for 60 minutes to form a carbon black coat on the coating layer composed of methyl triethoxysilane, thereby obtaining black iron-based composite particles.

The obtained black iron-based composite particles were heat-treated at 105° C. for 60 minutes by using a drier.

Figure 3:
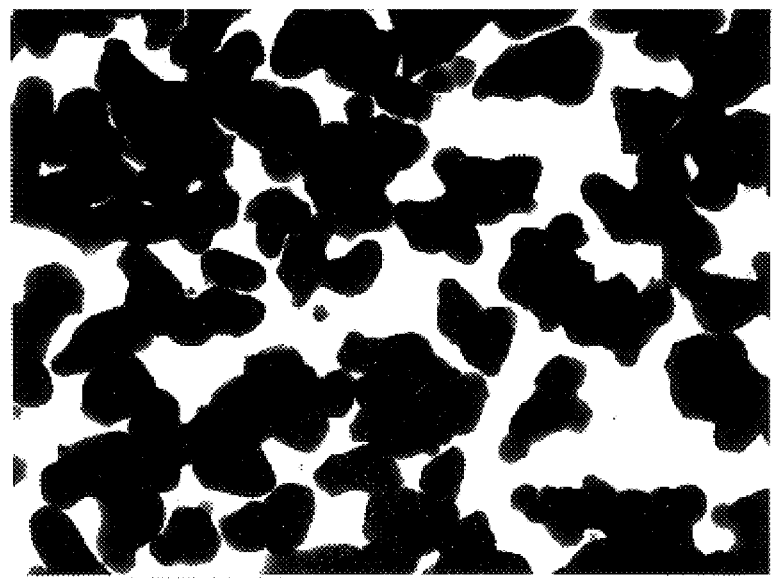
FIG. 3 is an electron photograph (×20,000) showing a particle structure of black iron-based composite particles obtained in Example 1.

The resultant black iron-based composite particles were granular particles having an average particle size of 0.31 μm as shown in the electron photograph (×20,000) of FIG. 3. In addition, the black iron-based composite particles showed a geometrical standard deviation of particle sizes of 1.46, a BET specific surface area value of 9.1 m²/g, and a blackness (L* value) of 17.6. The desorption percentage of carbon black from the black iron-based composite particles was 6.6%. The amount of a coating organosilane compound produced from methyl triethoxysilane was 0.16% by weight (calculated as Si). The amount of the carbon black coat formed on the coating layer composed of the organosilane compound produced from methyl triethoxysilane is 8.22% by weight (calculated as C) based on the weight of the black iron-based composite particles (corresponding to 9 parts by weight based on 100 parts by weight of the black manganese-containing hematite particles). The thickness of the carbon black coat formed was 0.0024 μm. Since no carbon black was recognized on the electron photograph of FIG. 3, it was confirmed that a whole amount of the carbon black used contributed to the formation of the carbon black coat on the coating layer composed of the organosilane compound produced from methyl triethoxysilane.

Figure 4:
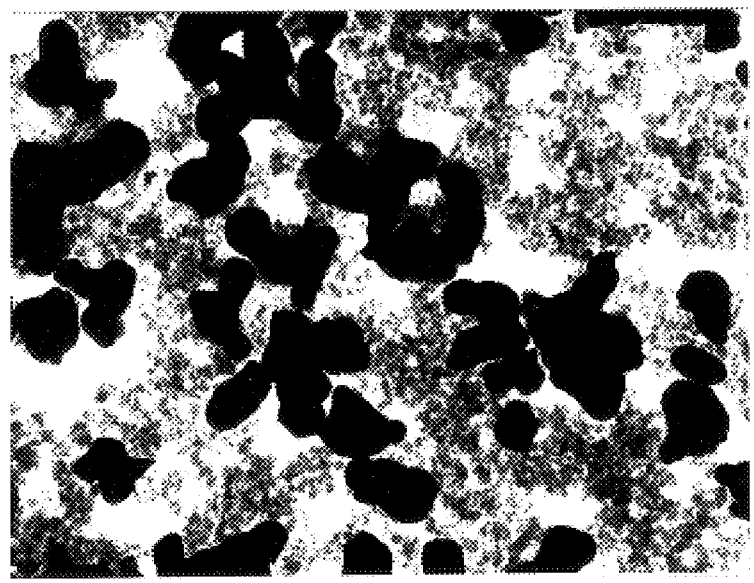
FIG. 4 is an electron photograph (×20,000) showing a particle structure of mixed particles of black manganese-containing hematite particles and carbon black fine particles for comparative purposes.

For a comparative purpose, the black manganese-containing hematite particles not coated with methyl triethoxysilane and the carbon black fine particles were mixed and stirred together by an edge runner in the same manner as described above, thereby obtaining treated particles as shown in the electron photograph (×20,000) of FIG. 4. As shown in FIG. 4, it was recognized that the carbon black fine particles were not adhered on the black manganese-containing hematite particles, and the individual particles were present separately.

Example 2

Production of Solvent-based Paint Containing Black Iron-based Composite Particles 10 g of the black iron-based composite particles produced in Example 1, were blended with an amino alkyd resin and a thinner at the following weight ratio, and charged into a 140-ml glass bottle together with 90 g of 3 mmφ glass beads. Next, the obtained mixture was mixed and dispersed for 90 minutes by a paint shaker, thereby preparing a mill base.

| Composition of Mill Base: | |
|---|---|
| Black iron-based composite particles | 12.2 parts by weight |
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a paint containing the black iron-based composite particles.

| Composition of paint: | |
|---|---|
| Mill base | 39.0 parts by weight |
| Amino alkyd resin (AMILAC No. 1026, produced by KANSAI PAINT CO., LTD.) | 61.0 parts by weight |

The coating film produced from the thus obtained paint, showed a gloss of 89% and a blackness (L* value) of 17.4. Further, as a result of an acid resistance test thereof, the amount of change in gloss (ΔG value) was 5.6%, and the amount of change in lightness (ΔL* value) was 0.6.

Example 3

Production of Water-based Paint Containing Black Iron-based Composite Particles 7.62 g of the black iron-based composite particles obtained in Example 1, were blended with a water-soluble alkyd resin and the like at the following weight ratio, and charged into a 140-ml glass bottle together with 90 g of 3 mmφ glass beads. Next, the obtained mixture was mixed and dispersed for 45 minutes or 90 minutes by a paint shaker, thereby preparing a mill base.

| Composition of Mill Base: | |
|---|---|
| Black iron-based composite particles | 12.4 parts by weight |
| Water-soluble alkyd resin (tradename: "S-118", produced by DAI-NIPPON INK KAGAKU KOGYO CO., LTD.) | 9.0 parts by weight |
| Defoamer (tradename: "NOPCO 8034", produced by SUN NOPCO LTD.) | 4.8 parts by weight |
| Water | 4.8 parts by weight |
| Butyl cellosolve | 4.1 parts by weight |

The above-prepared mill base was blended with paint components at the following weight ratio, and the obtained mixture was further mixed and dispersed for 15 minutes by a paint shaker, thereby obtaining a water-soluble paint. Composition of paint:

| Composition of paint: | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO LTD.) | 0.1 parts by weight |
| Water | 9.1 parts by weight |
| Butyl cellosolve | 1.6 parts by weight |

The coating film prepared from the thus obtained paint, showed a gloss of 87% and a blackness (L* value) of 17.4. Further, as a result of an acid resistance test thereof, the amount of change in gloss (ΔG value) was 5.1%, and the amount of change in lightness (ΔL* value) was 0.6.

Example 4

Production of Resin Composition 2.5 g of the black iron-based composite particles obtained in Example 1, and 47. 5 g of a polyvinyl chloride resin 103EP8D (produced by NIPPON ZEON CO., LTD.) were weighed and charged into a 100 ml beaker, and intimately mixed together by a spatula, thereby obtaining mixed particles.

0.5 g of calcium stearate was added to the mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and subjected to a pressure molding while applying a pressure of 1 ton/cm² thereto, thereby obtaining a colored resin plate having a thickness of 1 mm. The thus-produced colored resin plate had a blackness (L* value) of 17.9 and the dispersing condition thereof was the rank 5.

The colored resin plate was cut into three 1.5 cm-square test pieces. The three test pieces were placed in Geer oven maintained heated to 190° C. and taken out therefrom one by one at intervals of 30 minutes to examine whether or not the resin of each test piece was deteriorated. As a result, the test piece taken out 30 minutes after initiation of the heating showed a degree of resin-deterioration ($S/S_0 \times 100$) of 0%, the test piece next taken out 60 minutes after initiation of the heating showed a degree of resin-deterioration ($S/S_0 \times 100$) of 5%, and the test piece lastly taken out 90 minutes after initiation of the heating showed a degree of resin-deterioration ($S/S_0 \times 100$) of 5%.

Core Particles 1 to 7

Various black iron oxide particles and black iron oxide hydroxide particles produced by known methods, were prepared. The same procedure as defined in Example 1 was conducted by using these particles, thereby obtaining diaggregated black iron oxide particles and black iron oxide hydroxide particles.

Various properties of the thus obtained black iron oxide particles and black iron oxide hydroxide particles are shown in Table 1.

Meanwhile, the core particles 1 and 2 were produced by the method described in Japanese Patent Application Laid-open (KOKAI) No. 4-144924(1992). The core particles 3 were produced by the method described in Japanese Patent Publication (KOKOKU) No. 44-668(1969). The core particles 4 were produced by the method described in Japanese Patent Publication (KOKOKU) No. 3-9045(1991). The core particles 5 were produced by first preparing acicular goethite particles and then heat-treating the obtained acicular goethite particles at 340° C. in air, followed by heat-treating the acicular goethite particles at 400° C. in a hydrogen stream by the method described in Japanese Patent Publication (KOKOKU) No. 55-6579(1980). Further, the core particles 6 and 7 were produced by the method described in Japanese Patent Application Laid-open (KOKAI) No. 6-263449 (1994).

Core Particles 8

The same procedure as defined in Example 1 was conducted by using 20 kg of the diaggregated black manganese-containing hematite particles (core particles 1) and 150 liters of water, thereby obtaining a slurry containing the black manganese-containing hematite particles. The pH value of the obtained re-dispersed slurry containing the black manganese-containing hematite particles was adjusted to 10.5, and then the concentration of the solid content in the slurry was adjusted to 98 g/liter by adding water thereto. After 150 liters of the slurry was heated to 60° C., 2722 ml of a 1.0 mol/liter $NaAlO_2$ solution (corresponding to 0.5% by weight (calculated as Al) based on the weight of the black manganese-containing hematite particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the black manganese-containing hematite particles whose surface was coated with hydroxides of aluminum.

The thus obtained black manganese-containing hematite particles whose surface was coated with hydroxides of aluminum were granular particles having a particle size of 0.32 μm. The geometrical standard deviation of particle sizes of the obtained particles was 1.47, the BET specific surface area value was 3.8 $m^2/g$, and the blackness ($L^*$ value) was 22.6. As a result of fluorescent X-ray analysis, the obtained particles had a Mn content of 13.0% by weight and an Al content of 0.49% by weight.

Core Particles 9 to 14

The same procedure as defined above for the production of the core particles 8, was conducted except that kinds of core particles and kinds and amounts of additives used in the above surface treatment were changed variously, thereby obtaining surface-treated black iron oxide particles and surface-treated black iron oxide hydroxide particles.

The essential treating conditions are shown in Table 2, and various properties of the obtained surface-treated core particles are shown in Table 3.

Examples 5 to 11 and Comparative Examples 1 to 5

The same procedure as defined in Example 1 was conducted except that kinds of black iron oxide particles and black iron oxide hydroxide particles, addition or non-addition of alkoxysilane, kinds and amounts of alkoxysilane added, treating conditions of an edge runner used in the alkoxysilane-coating process, kinds and amounts of the carbon black coat formed, and treating conditions of an edge runner used in the process for forming the carbon black coat, were changed variously, thereby obtaining black iron-based composite particles. As a result of the observation by an electron microscope, no carbon black was recognized in the black iron-based composite particles obtained in Examples 5 to 11. Therefore, it was confirmed that a substantially whole amount of the carbon black used in Examples 5 to 11 contributed to the formation of the carbon black coat on the coating layer composed of an organosilane compound produced from the alkoxysilane.

Various properties of the carbon black fine particles A to C used, are shown in Table 4. The essential treating conditions are shown in Table 5, and various properties of the obtained black iron-based composite particles are shown in Table 6.

Example 12

11.0 kg of the core particles 8, i.e., the black manganese-containing hematite particles whose surface was coated with hydroxides of aluminum, were charged into an edge runner "MPUV-2 Model" (manufactured by MATSUMOTO CHUZO TEKKOSHO CO., LTD.), and mixed and stirred at 30 Kg/cm and a stirring speed of 22 rpm for 30 minutes, thereby diaggregating the particles.

220 g of methyl triethoxysilane was mixed and diluted with 400 ml of ethanol to prepare a solution of methyl triethoxysilane. The thus prepared methyl triethoxysilane solution was added to the diaggregated black manganese-containing hematite particles whose surface was coated with hydroxides of aluminum while operating the edge runner. The black manganese-containing hematite particles were continuously mixed and stirred at a linear load of 60 Kg/cm and a stirring speed of 22 rpm for 30 minutes.

Next, 1,100 g of the carbon black fine particles A were added to the black manganese-containing hematite particles coated with methyl triethoxysilane, for 10 minutes while operating the edge runner. Further, the particles were continuously mixed and stirred at a linear load of 75 Kg/cm and a stirring speed of 22 rpm for 30 minutes to form a carbon black coat on the coating layer composed of methyl triethoxysilane, thereby obtaining black iron-based composite particles.

The obtained black iron-based composite particles were heat-treated at 105° C. for 60 minutes by using a drier.

The black iron-based composite particles were granular particles having an particle size of 0.32 μm. In addition, the geometrical standard deviation of particle sizes of the obtained black iron-based composite particles was 1.44; the BET specific surface area value was 4.6 m$^2$/g; the blackness (L* value) was 16.5; the desorption percentage of carbon black was 4.8%. The coating amount of the organosilane compound produced from methyl triethoxysilane was 0.31% by weight (calculated as Si). The amount of the carbon black coat formed on the coating layer of the organosilane compound produced from methyl triethoxysilane is 9.04% by weight (calculated as C) based on the weight of the black iron-based composite particles (corresponding to 10 parts by weight based on 100 parts by weight of the black manganese-containing hematite particles). The thickness of the carbon black coat formed was 0.0025 μm. Meanwhile, since almost no carbon black was recognized as a result of the observation by an electron microscope, it was confirmed that a whole amount of the carbon black used contributed to the formation of the carbon black coat on the coating layer composed of the organosilane compound produced from methyl triethoxysilane.

Examples 13 to 18

The same procedure as defined in Example 12 was conducted except that kinds of black iron oxide particles and black iron oxide hydroxide particles, kinds and amounts of alkoxysilane added, treating conditions of an edge runner used in the alkoxysilane-coating process, kinds and amounts of a carbon black coat formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 13 to 18. Therefore, it was confirmed that a whole amount of the carbon black used contributed to the formation of the carbon black coat on the coating layer composed of the organosilane compound produced from the alkoxysilane.

The essential treating conditions are shown in Table 5, and various properties of the obtained black iron-based composite particles are shown in Table 6.

Comparative Example 6

Method described in Japanese Patent Publication (KOKOKU) No, 50-13300(1975)

1,000 ml of a water suspension containing 68.3 g of the core particles 3, i.e., magnetite particles (black iron oxide particles) was prepared, and then washed with cold water five times.

Next, 5 g of a water dispersion containing 1.75 g of the dried carbon black fine particles B was diluted with 500 ml of cold water.

While stirring, the carbon black-containing water dispersion was added to the water suspension containing the magnetite particles, for 5 minutes. After completion of the addition, the mixed suspension was continuously stirred for 10 minutes and then allowed to stand.

After about 4 hours, the obtained black precipitates were washed with water five times by an ordinary method, and then dried at 100° C. in air.

The obtained black particles had a blackness (L* value) of 20.0 which was substantially unchanged from those of the magnetite particles as the core particles and a carbon black desorption percentage of 50.2%.

Examples 19 to 32 and Comparative Examples 7 to 21

Production of Solvent-based Paint

The same procedure as defined in Example 2 was conducted except that kinds of black particles were changed variously, thereby obtaining solvent-based paints.

The essential production conditions and various properties of coating films obtained from the solvent-based paints are shown in Tables 7 and 8, respectively.

Examples 33 to 46 and Comparative Examples 22 to 36

Production of Water-based Paint

The same procedure as defined in Example 3 was conducted except that kinds of black particles were changed variously, thereby obtaining water-based paints.

The essential production conditions and various properties of coating films obtained from the water-based paints are shown in Tables 9 and 10, respectively.

Examples 47 to 60 and Comparative Examples 37 to 51

Production of Resin Composition

The same procedure as defined in Example 4 was conducted except that kinds of black particles were changed variously, thereby obtaining resin compositions.

The essential production conditions and various properties of colored resin plates obtained from the resin compositions are shown in Tables 11 and 12, respectively.

Example 61

110 g of methyl hydrogen polysiloxane (tradename: "TSF484", produced by TOSHIBA SILICONE CO., LTD.) was added to 11.0 g of the diaggregated black manganese-containing hematite particles obtained by the same procedure as defined in Example 1, while operating an edge runner "MPUV-2 Model" (manufactured by MATSUMOTO CHUZO TEKKOSHO CO., LTD.), and then continuously mixed and stirred at a linear load of 60 Kg/cm and a stirring speed of 22 rpm for 60 minutes.

Next, 550 g of carbon black fine particles (particle shape: granular shape; particle size: 0.022 μm; geometrical standard deviation of particle sizes: 1.68; BET specific surface area value: 134 m$^2$/g; and blackness (L* value): 16.6) were added to the black manganese-containing hematite particles coated with methyl hydrogen polysiloxane, for 10 minutes while operating the edge runner. Further, the obtained particles were continuously mixed and stirred at a linear load of 60 Kg/cm and a stirring speed of 22 rpm for 60 minutes to form a carbon black coat on the coating layer composed of methyl hydrogen polysiloxane, thereby obtaining black iron-based composite particles.

The obtained black iron-based composite particles were dried at 105° C. for 60 minutes by using a drier. The obtained black iron-based composite particles were granular particles having an particle size of 0.31 μm. In addition, the geometrical standard deviation of particle sizes of the black iron-based composite particles was 1.46; the BET specific surface area value was 8.9 m$^2$/g; the blackness (L* value) was 18.2; the carbon black desorption percentage was 6.4%. The coating amount of the methyl hydrogen polysiloxane was 0.41% by weight (calculated as Si). The amount of the carbon black coat formed on the coating layer composed of methyl hydrogen polysiloxane is 4.76% by weight (calculated as C) based on the weight of the black iron-based composite particles (corresponding to 5 parts by weight based on 100 parts by weight of the black manganese-containing hematite particles). The thickness of the carbon black coat formed was 0.0023 μm. As a result of the observation by an electron microscope, since almost no carbon black was recognized in the obtained composite particles, it was confirmed that substantially a whole amount of the carbon black used contributed to the formation of the carbon black coat on the coating layer composed of the methyl hydrogen polysiloxane.

Example 62

The same procedure as defined in Example 2 was conducted except that black iron-based composite particles obtained in Example 61 were used, thereby obtaining a solvent-based paint.

A coating film obtained from the solvent-based paint had a gloss of 91% and a blackness (L* value) of 18.6. As a result of an acid resistance test of the coating film, the amount of change in gloss (ΔG value) was 6.1% and the amount of change in lightness (ΔL* value) was 0.7.

Example 63

The same procedure as defined in Example 3 was conducted except that black iron-based composite particles obtained in Example 61 were used, thereby obtaining a water-based paint.

A coating film obtained from the water-based paint had a gloss of 86% and a blackness (L* value) of 18.8. As a result of an acid resistance test of the coating film, the amount of change in gloss (ΔG value) was 5.3% and the amount of change in lightness (ΔL* value) was 0.7.

Example 64

The same procedure as defined in Example 4 was conducted except that black iron-based composite particles obtained in Example 61 were used, thereby obtaining a colored resin plate. The thus obtained colored resin plate had a blackness (L* value) of 17.9 and the dispersion condition thereof was the rank 5.

The colored resin plate was cut into three 1.5 cm-square test pieces. The three test pieces were placed in Geer oven maintained at 190° C. and were taken out therefrom one by one at intervals of 30 minutes to examine whether or not the resin of each test piece was deteriorated. As a result, the test piece taken out 30 minutes after initiation of the heating showed a degree of resin-deterioration (S/S$_0$×100) of 0%, the test piece next taken out 60 minutes after initiation of the heating showed a degree of resin-deterioration (S/S$_0$×100) of 0%, and the test piece lastly taken out 90 minutes after initiation of the heating showed a degree of resin-deterioration (S/S$_0$×100) of 5%.

Examples 65 to 71 and Comparative Examples 52 to 54

The same procedure as defined in Example 61 was conducted except that kinds of black iron oxide particles and black iron oxide hydroxide particles, kinds and amounts of polysiloxane added, treating conditions of an edge runner used in the polysiloxane-coating process, kinds and amounts of carbon black coat formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 65 to 71. Therefore, it was confirmed that substantially a whole amount of the carbon black used were adhered on the coating layer composed of polysiloxane.

The essential treating conditions are shown in Table 13, and various properties of the obtained black iron-based composite particles are shown in Table 14.

Example 72

11.0 kg of the core particles 8, i.e., the black manganese-containing hematite particles whose surface was coated with hydroxides of aluminum, were charged into an edge runner "MPUV-2 Model" (manufactured by MATSUMOTO CHUZO TEKKOSHO CO., LTD.), and mixed and stirred at 30 Kg/cm and a stirring speed of 22 rpm for 30 minutes, thereby diaggregating the particles.

165 g of methyl hydrogen polysiloxane (tradename: "TSF484", produced by TOSHIBA SILICONE CO., LTD.) were added to the diaggregated black manganese-containing hematite particles whose surface was coated with hydroxides of aluminum while operating the edge runner. The black manganese-containing hematite particles were continuously mixed and stirred at a linear load of 30 Kg/cm and a stirring speed of 22 rpm for 30 minutes.

Next, 550 g of the carbon black fine particles A were added to the black manganese-containing hematite particles coated with methyl hydrogen polysiloxane, for 10 minutes while operating the edge runner. Further, the particles were continuously mixed and stirred at a linear load of 75 Kg/cm and a stirring speed of 22 rpm for 30 minutes to form a carbon black coat on the coating layer composed of methyl hydrogen polysiloxane, thereby obtaining black iron-based composite particles.

The obtained black iron-based composite particles were dried at 105° C. for 60 minutes by using a drier. The black iron-based composite particles were granular particles having an particle size of 0.32 μm. In addition, the geometrical standard deviation of particle sizes of the obtained black iron-based composite particles was 1.45; the BET specific surface area value was 4.1 m$^2$/g; the blackness (L* value) was 16.9; the desorption percentage of carbon black was 4.9%. The coating amount of the methyl hydrogen polysiloxane was 0.65% by weight (calculated as Si). The amount of the carbon black coat formed on the coating layer composed of methyl hydrogen polysiloxane is 4.74% by weight (calculated as C) based on the weight of the black iron-based composite particles (corresponding to 5 parts by weight based on 100 parts by weight of the black manganese-containing hematite particles). The thickness of the carbon black coat formed was 0.0023 μm. Meanwhile, since almost no carbon black was recognized as a result of the observation by an electron microscope, it was confirmed that substantially a whole amount of the carbon black used contributed to the formation of the carbon black coat on the coating layer composed of the methyl hydrogen polysiloxane.

Examples 73 to 78

The same procedure as defined in Example 72 was conducted except that kinds of black iron oxide particles and black iron oxide hydroxide particles, kinds and amounts of polysiloxane added, treating conditions of an edge runner used in the polysiloxane-coating process, kinds and amounts of carbon black formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 73 to 78. Therefore, it was confirmed that substantially a whole amount of the carbon black used contributed to the formation of the carbon black coat on the coating layer composed of a polysiloxane.

The essential treating conditions are shown in Table 13, and various properties of the obtained black iron-based composite particles are shown in Table 14.

Examples 79 to 92 and Comparative
Examples 55 to 57

Production of Solvent-based Paint

The same procedure as defined in Example 2 was conducted except that kinds of black particles were changed variously, thereby obtaining solvent-based paints.

The essential production conditions and various properties of coating films obtained from the solvent-based paints are shown in Table 15.

Examples 93 to 106 and Comparative
Examples 58 to 60

Production of Water-based Paint

The same procedure as defined in Example 3 was conducted except that kinds of black particles were changed variously, thereby obtaining water-based paints.

The essential production conditions and various properties of coating films obtained from the water-based paints are shown in Table 16.

Examples 107 to 120 and Comparative
Examples 61 to 63

Production of Resin Composition

The same procedure as defined in Example 4 was conducted except that kinds of black particles were changed variously, thereby obtaining resin compositions.

The essential production conditions and various properties of colored resin plates obtained from the resin compositions are shown in Table 17.

Example 121

110 g of polyether-modified polysiloxane (tradename "BYK-080", produced by BYK-Chemie CO., LTD.) were added to 11.0 g of the diaggregated black manganese-containing hematite particles obtained by the same procedure as defined in Example 1, while operating an edge runner "MPUV-2 Model" (manufactured by MATSUMOTO CHUZO TEKKOSHO CO., LTD.), and then continuously mixed and stirred at a linear load of 60 Kg/cm and stirring speed of 22 rpm for 60 minutes.

Next, 550 g of carbon black fine particles (particle shape: granular shape; particle size: 0.022 $\mu$m; geometrical standard deviation of particle sizes: 1.68; BET specific surface area: 134 m$^2$/g; and blackness (L* value): 16.6) were added to the black manganese-containing hematite particles coated with polyether-modified polysiloxane, for 10 minutes while operating the edge runner. Further, the obtained particles were continuously mixed and stirred at a linear load of 60 Kg/cm and stirring speed of 22 rpm for 60 minutes to form a carbon black coat on the coating layer composed of polyether-modified polysiloxane, thereby obtaining black iron-based composite particles.

The obtained black iron-based composite particles were dried at 105° C. for 60 minutes by using a drier. The obtained black iron-based composite particles were granular particles having an particle size of 0.31 $\mu$m. In addition, the geometrical standard deviation of particle sizes of the black iron-based composite particles was 1.46; the BET specific surface area value was 4.6 m$^2$/g; the blackness (L* value) was 17.6; the carbon black desorption percentage was 6.2%. The coating amount of the polyether-modified polysiloxane was 0.19% by weight (calculated as Si). The amount of the carbon black coat formed on the coating layer composed of polyether-modified polysiloxane is 4.73% by weight (calculated as C) based on the weight of the black iron-based composite particles (corresponding to 5 parts by weight based on 100 parts by weight of the black manganese-containing hematite particles). The thickness of the carbon black coat formed was 0.0023 $\mu$m. As a result of the observation by an electron microscope, since almost no carbon black was recognized in the obtained composite particles, it was confirmed that substantially a whole amount of the carbon black used contributed to the formation of the carbon black coat on the coating layer composed of the polyether-modified polysiloxane.

Example 122

The same procedure as defined in Example 2 was conducted except that black iron-based composite particles obtained in Example 121 were used, thereby obtaining a solvent-based paint.

A coating film obtained from the solvent-based paint had a gloss of 101% and a blackness (L* value) of 17.2. As a result of an acid resistance test of the coating film, the amount of change in gloss ($\Delta$G value) was 6.3% and the amount of change in lightness ($\Delta$L* value) was 0.6.

Example 123

The same procedure as defined in Example 3 was conducted except that black iron-based composite particles obtained in Example 121 were used, thereby obtaining a water-based paint.

A coating film obtained from the water-based paint had a gloss of 92% and a blackness (L* value) of 17.8. As a result of an acid resistance test of the coating film, the amount of change in gloss ($\Delta$G value) was 6.1% and the amount of change in lightness ($\Delta$L* value) was 0.8.

Example 124

The same procedure as defined in Example 4 was conducted except that black iron-based composite particles obtained in Example 121 were used, thereby obtaining a colored resin plate. The thus obtained colored resin plate had a blackness (L* value) of 18.0 and the dispersion condition thereof was the rank 5.

The colored resin plate was cut into three 1.5 cm-square test pieces. The three test pieces were placed in Geer oven maintained at 190° C. and were taken out therefrom one by one at intervals of 30 minutes to examine whether or not the resin of each test piece was deteriorated. As a result, the test piece taken out 30 minutes after initiation of the heating showed a degree of resin-deterioration (S/S$_0$×100) of 0%, the test piece next taken out 60 minutes after initiation of the heating showed a degree of resin-deterioration (S/S$_0$×100) of 0%, and the test piece lastly taken out 90 minutes after initiation of the heating showed a degree of resin-deterioration (S/S$_0$×100) of 5%.

Examples 125 to 131 and Comparative
Examples 64 to 66

The same procedure as defined in Example 121 was conducted except that kinds of black iron oxide particles and black iron oxide hydroxide particles, kinds and amounts of modified polysiloxane added, treating conditions of an edge runner used in the modified polysiloxane-coating process, kinds and amounts of carbon black coat formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 125 to 131. Therefore, it was confirmed that substantially a whole amount of the carbon black used contributed to the formation of the carbon black coat on the coating layer composed of modified polysiloxane.

The essential treating conditions are shown in Table 18, and various properties of the obtained black iron-based composite particles are shown in Table 19.

Example 132

11.0 kg of the core particles 8, i.e., the black manganese-containing hematite particles whose surface was coated with hydroxides of aluminum, were charged into an edge runner "MPUV-2 Model" (manufactured by MATSUMOTO CHUZO TEKKOSHO CO., LTD.), and mixed and stirred at 30 Kg/cm and a stirring speed of 22 rpm for 30 minutes, thereby diaggregating the particles.

220 g of polyether-modified polysiloxane (tradename "BYK-080", produced by BYK-Chemie CO., LTD.) were added to the diaggregated black manganese-containing hematite particles whose surface was coated with hydroxides of aluminum while operating the edge runner. The black manganese-containing hematite particles were continuously mixed and stirred at a linear load of 75 Kg/cm and a stirring speed of 22 rpm for 15 minutes.

Next, 550 g of the carbon black fine particles A were added to the black manganese-containing hematite particles coated with polyether-modified polysiloxane, for 10 minutes while operating the edge runner. Further, the particles were continuously mixed and stirred at a linear load of 60 Kg/cm and a stirring speed of 22 rpm for 30 minutes to form a carbon black coat on the coating layer composed of polyether-modified polysiloxane, thereby obtaining black iron-based composite particles.

The obtained black iron-based composite particles were dried at 105° C. for 60 minutes by using a drier. The black iron-based composite particles were granular particles having an particle size of 0.32 µm. In addition, the geometrical standard deviation of particle sizes of the obtained black iron-based composite particles was 1.44; the BET specific surface area value was 4.6 m²/g; the blackness (L* value) was 16.5; the desorption percentage of carbon black was 4.1%. The coating amount of the polyether-modified polysiloxane was 0.36% by weight (calculated as Si). The amount of the carbon black coat formed on the coating layer composed of polyether-modified polysiloxane is 4.74% by weight (calculated as C) based on the weight of the black iron-based composite particles (corresponding to 5 parts by weight based on 100 parts by weight of the black manganese-containing hematite particles). The thickness of the carbon black coat formed was 0.0023 µm. Meanwhile, since almost no carbon black was recognized as a result of the observation by an electron microscope, it was confirmed that substantially a whole amount of the carbon black used contributed to the formation of the carbon black coat on the coating layer composed of polyether-modified polysiloxane.

Examples 133 to 138

The same procedure as defined in Example 132 was conducted except that kinds of black iron oxide particles and black iron oxide hydroxide particles, kinds and amounts of modified polysiloxane added, treating conditions of an edge runner used in the modified polysiloxane-coating process, kinds and amounts of carbon black coat formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 133 to 138. Therefore, it was confirmed that substantially a whole amount of the carbon black used contributed to the formation of the carbon black coat on the coating layer composed of a modified polysiloxane.

The essential treating conditions are shown in Table 18, and various properties of the obtained black iron-based composite particles are shown in Table 19.

Examples 139 to 152 and Comparative Examples 67 to 69

Production of Solvent-based Paint

The same procedure as defined in Example 2 was conducted except that kinds of black particles were changed variously, thereby obtaining solvent-based paints.

The essential production conditions and various properties of coating films obtained from the solvent-based paints are shown in Table 20.

Examples 153 to 166 and Comparative Examples 70 to 72

Production of Water-based Paint

The same procedure as defined in Example 3 was conducted except that kinds of black particles were changed variously, thereby obtaining water-based paints.

The essential production conditions and various properties of coating films obtained from the water-based paints are shown in Table 21.

Examples 167 to 180 and Comparative Examples 73 to 75

Production of Resin Composition

The same procedure as defined in Example 4 was conducted except that kinds of black particles were changed variously, thereby obtaining resin compositions.

The essential production conditions and various properties of colored resin plates obtained from the resin compositions are shown in Table 22.

Example 181

220 g of carboxylic acid-terminal-modified polysiloxane (tradename: "TSF4770", produced by TOSHIBA SILICONE CO., LTD.) was added to 11.0 g of the diaggregated black manganese-containing hematite particles obtained by the same procedure as defined in Example 1, while operating an edge runner "MPUV-2 Model" (manufactured by MATSUMOTO CHUZO TEKKOSHO CO., LTD.), and then continuously mixed and stirred at a linear load of 60 Kg/cm for and a stirring speed of 22 rpm 30 minutes.

Next, 550 g of carbon black fine particles (particle shape: granular shape; particle size: 0.022 µm; geometrical standard deviation of particle sizes: 1.68; BET specific surface area value: 134 m²/g; and blackness (L* value): 16.6) were added to the black manganese-containing hematite particles coated with carboxylic acid-terminal-modified polysiloxane, for 10 minutes while operating the edge runner. Further, the obtained particles were continuously mixed and stirred at a linear load of 60 Kg/cm and a stirring speed of 22 rpm for 30 minutes to form a carbon black coat on the coating layer composed of carboxylic acid-terminal-modified polysiloxane, thereby obtaining black iron-based composite particles.

The obtained black iron-based composite particles were dried at 105° C. for 60 minutes by using a drier. The obtained black iron-based composite particles were granular particles having an particle size of 0.32 μm. In addition, the geometrical standard deviation of particle sizes of the black iron-based composite particles was 1.46; the BET specific surface area value was 4.2 m²/g; the blackness (L* value) was 17.9; the carbon black desorption percentage was 6.7%. The coating amount of the carboxylic acid-terminal-modified polysiloxane was 0.43% by weight (calculated as Si). The amount of the carbon black coat formed on the coating layer composed of carboxylic acid-terminal-modified polysiloxane is 4.72% by weight (calculated as C) based on the weight of the black iron-based composite particles (corresponding to 5 parts by weight based on 100 parts by weight of the black manganese-containing hematite particles). The thickness of the carbon black coat formed was 0.0022 μm. As a result of the observation by an electron microscope, since almost no carbon black was recognized in the obtained composite particles, it was confirmed that substantially a whole amount of the carbon black used contributed to the formation of the carbon black coat on the coating layer composed of carboxylic acid-terminal-modified polysiloxane.

Example 182

The same procedure as defined in Example 2 was conducted except that black iron-based composite particles obtained in Example 181 were used, thereby obtaining a solvent-based paint.

A coating film obtained from the solvent-based paint had a gloss of 98% and a blackness (L* value) of 17.8. As a result of an acid resistance test of the coating film, the amount of change in gloss (ΔG value) was 7.1% and the amount of change in lightness (ΔL* value) was 0.7.

Example 183

The same procedure as defined in Example 3 was conducted except that black iron-based composite particles obtained in Example 181 were used, thereby obtaining a water-based paint.

A coating film obtained from the water-based paint had a gloss of 93% and a blackness (L* value) of 18.1. As a result of an acid resistance test of the coating film, the amount of change in gloss (ΔG value) was 7.3% and the amount of change in lightness (ΔL* value) was 0.8.

Example 184

The same procedure as defined in Example 4 was conducted except that black iron-based composite particles obtained in Example 181 were used, thereby obtaining a colored resin plate. The thus obtained colored resin plate had a blackness (L* value) of 18.0 and the dispersion condition thereof was the rank 5.

The colored resin plate was cut into three 1.5 cm-square test pieces. The three test pieces were placed in Geer oven maintained at 190° C. and were taken out therefrom one by one at intervals of 30 minutes to examine whether or not the resin of each test piece was deteriorated. As a result, the test piece taken out 30 minutes after initiation of the heating showed a degree of resin-deterioration (S/S$_0$×100) of 0%, the test piece next taken out 60 minutes after initiation of the heating showed a degree of resin-deterioration (S/S$_0$×100) of 0%, and the test piece lastly taken out 90 minutes after initiation of the heating showed a degree of resin-deterioration (S/S$_0$×100) of 5%.

Examples 185 to 191 and Comparative
Examples 76 to 78

The same procedure as defined in Example 181 was conducted except that kinds of black iron oxide particles and black iron oxide hydroxide particles, kinds and amounts of terminal-modified polysiloxane added, treating conditions of an edge runner used in the terminal-modified polysiloxane-coating process, kinds and amounts of carbon black coat formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 185 to 191. Therefore, it was confirmed that substantially a whole amount of the carbon black used contributed to the formation of the carbon black coat on the coating layer composed of terminal-modified polysiloxane.

The essential treating conditions are shown in Table 23, and various properties of the obtained black iron-based composite particles are shown in Table 44.

Example 192

11.0 kg of the core particles 8, i.e., the black manganese-containing hematite particles whose surface was coated with hydroxides of aluminum, were charged into an edge runner "MPUV-2 Model" (manufactured by MATSUMOTO CHUZO TEKKOSHO CO., LTD.), and mixed and stirred at 30 Kg/cm and a stirring speed of 22 rpm for 30 minutes, thereby diaggregating the particles.

110 g of carboxylic acid-terminal-modified polysiloxane was added to the diaggregated black manganese-containing hematite particles whose surface was coated with hydroxides of aluminum while operating the edge runner. The black manganese-containing hematite particles were continuously mixed and stirred at a linear load of 30 Kg/cm and a stirring speed of 22 rpm for 45 minutes.

Next, 825 g of the carbon black fine particles A were added to the black manganese-containing hematite particles coated with carboxylic acid-terminal-modified polysiloxane, for 10 minutes while operating the edge runner. Further, the particles were continuously mixed and stirred at a linear load of 45 Kg/cm and a stirring speed of 22 rpm for 45 minutes to form a carbon black coat on the coating layer composed of carboxylic acid-terminal-modified polysiloxane, thereby obtaining black iron-based composite particles.

The obtained black iron-based composite particles were dried at 105° C. for 60 minutes by using a drier. The black iron-based composite particles were granular particles having an particle size of 0.32 μm. In addition, the geometrical standard deviation of particle sizes of the obtained black iron-based composite particles was 1.44; the BET specific surface area value was 5.1 m²/g; the blackness (L* value) was 16.6; the desorption percentage of carbon black was 3.6%. The coating amount of carboxylic acid-terminalmodified polysiloxane was 0.21% by weight (calculated as Si). The amount of the carbon black coat formed on the coating layer composed of carboxylic acid-terminal-modified polysiloxane is 6.93% by weight (calculated as C) based on the weight of the black iron-based composite particles (corresponding to 7.5 parts by weight based on 100 parts by weight of the black manganese-containing hematite particles). The thickness of the carbon black coat formed was 0.0023 µm. Meanwhile, since almost no carbon black was recognized as a result of the observation by an electron microscope, it was confirmed that substantially a whole amount of the carbon black used contributed to the formation of the carbon black coat on the coating layer composed of the carboxylic acid-terminal-modified polysiloxane.

Examples 193 to 198

The same procedure as defined in Example 192 was conducted except that kinds of black iron oxide particles and black iron oxide hydroxide particles, kinds and amounts of terminal-modified polysiloxane added, treating conditions of an edge runner used in the terminal-modified polysiloxane-coating process, kinds and amounts of carbon black coat formed, and treating conditions of an edge runner used in the process for forming the carbon coat, were changed variously, thereby obtaining black iron-based composite particles. As a result of the observation by an electron microscope, almost no carbon black was recognized in the black iron-based composite particles obtained in Examples 193 to 198. Therefore, it was confirmed that substantially a whole amount of the carbon black used contributed to the formation of the carbon black coat on the coating layer composed of a terminal-modified polysiloxane.

The essential treating conditions are shown in Table 23, and various properties of the obtained black iron-based composite particles are shown in Table 24.

Examples 199 to 212 and Comparative Examples 79 to 81

Production of Solvent-based Paint

The same procedure as defined in Example 2 was conducted except that kinds of black particles were changed variously, thereby obtaining solvent-based paints.

The essential production conditions and various properties of coating films obtained from the solvent-based paints are shown in Table 25.

Examples 213 to 226 and Comparative Examples 82 to 84

Production of Water-based Paint

The same procedure as defined in Example 3 was conducted except that kinds of black particles were changed variously, thereby obtaining water-based paints.

The essential production conditions and various properties of coating films obtained from the water-based paints are shown in Table 26.

Examples 227 to 240 and Comparative Examples 85 to 87

Production of Resin Composition

The same procedure as defined in Example 4 was conducted except that kinds of black particles were changed variously, thereby obtaining resin compositions.

The essential production conditions and various properties of colored resin plates obtained from the resin compositions are shown in Table 27.

Example 241

165 g of tridecafluorooctyl trimethoxysilane (tradename "TSL8257", produced by TOSHIBA SILICONE CO., LTD.) were added to 11.0 g of the diaggregated black manganese-containing hematite particles obtained by the same procedure as defined in Example 1, while operating an edge runner "MPUV-2 Model" (manufactured by MATSUMOTO CHUZO TEKKOSHO CO., LTD.), and then continuously mixed and stirred at a linear load of 60 Kg/cm and a stirring speed of 22 rpm for 30 minutes.

Next, 550 g of carbon black fine particles (particle shape: granular shape; particle size: 0.022 µm; geometrical standard deviation of particle sizes: 1.68; BET specific surface area value: 134 m$^2$/g; and blackness (L$^*$ value): 16.6) were added to the black manganese-containing hematite particles coated with tridecafluorooctyl trimethoxysilane, for 10 minutes while operating the edge runner. Further, the obtained particles were continuously mixed and stirred at a linear load of 60 Kg/cm and a stirring speed of 22 rpm for 30 minutes to form a carbon black coat on the coating layer composed of tridecafluorooctyl trimethoxysilane, thereby obtaining black iron-based composite particles.

The obtained black iron-based composite particles were heat-treated at 105° C. for 60 minutes by using a drier. The obtained black iron-based composite particles were granular particles having an particle size of 0.31 µm. In addition, the geometrical standard deviation of particle sizes of the black iron-based composite particles was 1.45; the BET specific surface area value was 5.0 m$^2$/g; the blackness (L$^*$ value) was 17.8; the carbon black desorption percentage was 6.5%. The coating amount of the fluoroalkyl organosilane compound produced from tridecafluorooctyl trimethoxysilane was 0.10% by weight (calculated as Si). The amount of the carbon black coat formed on the coating layer composed of the fluoroalkyl organosilane compound produced from tridecafluorooctyl trimethoxysilane is 4.71% by weight (calculated as C) based on the weight of the black iron-based composite particles (corresponding to 5 parts by weight based on 100 parts by weight of the black manganese-containing hematite particles). The thickness of the carbon black coat formed was 0.0022 µm. As a result of the observation by an electron microscope, since almost no carbon black was recognized in the obtained composite particles, it was confirmed that substantially a whole amount of the carbon black used contributed to the formation of the carbon black coat on the coating layer composed of the fluoroalkyl organosilane compound produced from tridecafluoroalkyl trimethoxysilane.

Example 242

The same procedure as defined in Example 2 was conducted except that black iron-based composite particles obtained in Example 241 were used, thereby obtaining a solvent-based paint.

A coating film obtained from the solvent-based paint had a gloss of 96% and a blackness (L$^*$ value) of 17.3. As a result of an acid resistance test of the coating film, the amount of change in gloss (ΔG value) was 7.2% and the amount of change in lightness (ΔL$^*$ value) was 0.7.

Example 243

The same procedure as defined in Example 3 was conducted except that black iron-based composite particles obtained in Example 241 were used, thereby obtaining a water-based paint.

A coating film obtained from the water-based paint had a gloss of 91% and a blackness (L* value) of 17.9. As a result of an acid resistance test of the coating film, the amount of change in gloss (ΔG value) was 8.3% and the amount of change in lightness (ΔL* value) was 0.7.

Example 244

The same procedure as defined in Example 4 was conducted except that black iron-based composite particles obtained in Example 241 were used, thereby obtaining a colored resin plate. The thus obtained colored resin plate had a blackness (L* value) of 18.0 and the dispersion condition thereof was the rank 5.

The colored resin plate was cut into three 1.5 cm-square test pieces. The three test pieces were placed in Geer oven maintained at 190° C. and were taken out therefrom one by one at intervals of 30 minutes to examine whether or not the resin of each test piece was deteriorated. As a result, the test piece taken out 30 minutes after initiation of the heating showed a degree of resin-deterioration (S/S$_0$×100) of 0%, the test piece next taken out 60 minutes after initiation of the heating showed a degree of resin-deterioration (S/S$_0$×100) of 5%, and the test piece lastly taken out 90 minutes after initiation of the heating showed a degree of resin-deterioration (S/S$_0$×100) of 5%.

Examples 245 to 251 and Comparative Examples 88 to 90

The same procedure as defined in Example 241 was conducted except that kinds of black iron oxide particles and black iron oxide hydroxide particles, kinds and amounts of fluoroalkyl silane compounds added, treating conditions of an edge runner used in the fluoroalkyl silane compound-coating process, kinds and amounts of carbon black coat formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 245 to 251. Therefore, it was confirmed that substantially a whole amount of the carbon black used contributed to the formation of the carbon black coat on the coating layer composed of fluoroalkyl organosilane compounds.

The essential treating conditions are shown in Table 28, and various properties of the obtained black iron-based composite particles are shown in Table 29.

Example 252

11.0 kg of the core particles 8, i.e., the black manganese-containing hematite particles whose surface was coated with hydroxides of aluminum, were charged into an edge runner "MPUV-2 Model" (manufactured by MATSUMOTO CHUZO TEKKOSHO CO., LTD.), and mixed and stirred at 30 Kg/cm and a stirring speed of 22 rpm for 30 minutes, thereby diaggregating the particles.

660 g of tridecafluorooctyl trimethoxysilane (tradename "TSL8257", produced by TOSHIBA SILICONE CO., LTD.) was added to the diaggregated black manganese-containing hematite particles whose surface was coated with hydroxides of aluminum while operating the edge runner. The black manganese-containing hematite particles were continuously mixed and stirred at a linear load of 75 Kg/cm and a stirring speed of 22 rpm for 30 minutes.

Next, 1,100 g of the carbon black fine particles A were added to the black manganese-containing hematite particles coated with tridecafluorooctyl trimethoxysilane, for 10 minutes while operating the edge runner. Further, the particles were continuously mixed and stirred at a linear load of 60 Kg/cm and a stirring speed of 22 rpm for 45 minutes to form a carbon black coat on the coating layer composed of tridecafluorooctyl trimethoxysilane, thereby obtaining black iron-based composite particles.

The obtained black iron-based composite particles were heat-treated at 105° C. for 60 minutes by using a drier. The black iron-based composite particles were granular particles having an particle size of 0.32 μm. In addition, the geometrical standard deviation of particle sizes of the obtained black iron-based composite particles was 1.48; the BET specific surface area value was 4.8 m$^2$/g; the blackness (L* value) was 16.6; the desorption percentage of carbon black was 3.6%. The coating amount of the fluoroalkyl organosilane compound produced from tridecafluorooctyl trimethoxysilane was 0.40% by weight (calculated as Si). The amount of the carbon black coat formed on the coating layer composed of the fluoroalkyl organosilane compound produced from tridecafluorooctyl trimethoxysilane is 9.05% by weight (calculated as C) based on the weight of the black iron-based composite particles (corresponding to 10 parts by weight based on 100 parts by weight of the black manganese-containing hematite particles). The thickness of the carbon black coat formed was 0.0025 μm. Meanwhile, since almost no carbon black was recognized as a result of the observation by an electron microscope, it was confirmed that substantially a whole amount of the carbon black used contributed to the formation of the carbon black coat on the coating layer composed of the fluoroalkyl organosilane compound produced from tridecafluorooctyl trimethoxysilane.

Examples 253 to 258

The same procedure as defined in Example 252 was conducted except that kinds of black iron oxide particles and black iron oxide hydroxide particles, kinds and amounts of fluoroalkylsilane compound added, treating conditions of an edge runner used in the fluoroalkylsilane compound-coating process, kinds and amounts of carbon black coat formed, and treating conditions of an edge runner used in the process for forming the carbon black coat, were changed variously, thereby obtaining black iron-based composite particles. As a result of the observation by an electron microscope, almost no carbon black was recognized in the black iron-based composite particles obtained in Examples 253 to 258. Therefore, it was confirmed that substantially a whole amount of the carbon black used contributed to the formation of the carbon black coat on the coating layer composed of a fluoroalkyl organosilane compound produced from fluoroalkylsilane compounds.

The essential treating conditions are shown in Table 28, and various properties of the obtained black iron-based composite particles are shown in Table 29.

Examples 259 to 272 and Comparative Examples 91 to 93

Production of Solvent-based Paint

The same procedure as defined in Example 2 was conducted except that kinds of black particles were changed variously, thereby obtaining solvent-based paints.

The essential production conditions and various properties of coating films obtained from the solvent-based paints are shown in Table 30.

Examples 273 to 286 and Comparative Examples 94 to 96

Production of Water-based Paint

The same procedure as defined in Example 3 was conducted except that kinds of black particles were changed variously, thereby obtaining water-based paints.

The essential production conditions and various properties of coating films obtained from the water-based paints are shown in Table 31.

Examples 297 to 300 and Comparative Examples 97 to 99

Production of Resin Composition

The same procedure as defined in Example 4 was conducted except that kinds of black particles were changed variously, thereby obtaining resin compositions.

The essential production conditions and various properties of colored resin plates obtained from the resin compositions are shown in Table 32.

TABLE 1

| Core particles | Properties of black iron oxide particles or black iron oxide hydroxide particles | |
|---|---|---|
| | Kinds | Particle shape |
| Core particles 1 | Manganese-containing hematite particles | Granular |
| Core particles 2 | Manganese-containing hematite particles | Granular |
| Core particles 3 | Magnetite particles | Octahedral |
| Core particles 4 | Magnetite particles | Spherical |
| Core particles 5 | Magnetite particles | Acicular |
| Core particles 6 | Manganese-containing goethite particles | Acicular |
| Core particles 7 | Manganese-containing hematite particles | Spindle-shaped |

| | Average major axis diameter (average particle size) ($\mu$m) | Average minor axis diameter ($\mu$m) | Aspect ratio (-) | Geometrical standard deviation (-) |
|---|---|---|---|---|
| Core particles 1 | 0.32 | — | — | 1.49 |
| Core particles 2 | 0.18 | — | — | 1.41 |
| Core particles 3 | 0.28 | — | — | 1.53 |
| Core particles 4 | 0.23 | — | — | 1.35 |
| Core particles 5 | 0.40 | 0.051 | 7.8 | 1.53 |
| Core particles 6 | 0.28 | 0.038 | 7.3 | 1.38 |
| Core particles 7 | 0.20 | 0.030 | 6.7 | 1.41 |

| | BET specific surface area ($m^2/g$) | Mn content (wt. %) | Blackness (L* value) (-) |
|---|---|---|---|
| Core particles 1 | 3.1 | 13.1 | 22.4 |
| Core particles 2 | 7.8 | 15.6 | 24.4 |
| Core particles 3 | 4.6 | — | 20.3 |
| Core particles 4 | 11.8 | — | 20.1 |
| Core particles 5 | 18.8 | — | 23.8 |
| Core particles 6 | 84.3 | 17.6 | 26.5 |
| Core particles 7 | 45.8 | 13.6 | 24.9 |

TABLE 2

| Core particles | Surface-treating process | | | |
|---|---|---|---|---|
| | Kind of core particles | Additives | | |
| | | Kinds | Calculated as | Amount (wt. %) |
| Core particles 8 | Core particles 1 | Sodium aluminate | Al | 0.5 |
| Core particles 9 | Core particles 2 | Water glass #3 | SiO$_2$ | 0.2 |
| Core particles 10 | Core particles 3 | Aluminum sulfate | Al | 1.5 |
| | | Water glass #3 | SiO$_2$ | 0.5 |
| Core particles 11 | Core particles 4 | Sodium aluminate | Al | 2.0 |
| | | Colloidal silica | SiO$_2$ | 1.0 |
| Core particles 12 | Core particles 5 | Aluminum acetate | Al | 5.0 |
| Core particles 13 | Core particles 6 | Aluminum sulfate | Al | 1.0 |
| Core particles 14 | Core particles 7 | Sodium aluminate | Al | 1.0 |

| | Coating material | | |
|---|---|---|---|
| | Kinds | Calculated as | Amount (wt. %) |
| Core particles 8 | A | Al | 0.49 |
| Core particles 9 | S | SiO$_2$ | 0.18 |
| Core particles 10 | A | Al | 1.46 |
| | S | SiO$_2$ | 0.49 |
| Core particles 11 | A | Al | 1.92 |
| | S | SiO$_2$ | 0.96 |
| Core particles 12 | A | Al | 4.75 |
| Core particles 13 | A | Al | 0.98 |
| Core particles 14 | A | Al | 0.98 |

Note;
A: Hydroxide of aluminum
S: Oxide of silicon

TABLE 3

| Core particles | Properties of surface-treated core particles | | | |
|---|---|---|---|---|
| | Average major axis diameter (average particle size) ($\mu$m) | Average minor axis diameter ($\mu$m) | Aspect ratio (-) | Geometrical standard deviation (-) |
| Core particles 8 | 0.32 | — | — | 1.47 |
| Core particles 9 | 0.18 | — | — | 1.40 |
| Core particles 10 | 0.29 | — | — | 1.51 |
| Core particles 11 | 0.24 | — | — | 1.35 |
| Core particles 12 | 0.40 | 0.051 | 7.8 | 1.52 |
| Core particles 13 | 0.28 | 0.038 | 7.3 | 1.38 |
| Core particles 14 | 0.20 | 0.030 | 6.7 | 1.41 |

| | BET specific surface area ($m^2/g$) | Mn content (wt. %) | Blackness (L* value) (-) |
|---|---|---|---|
| Core particles 8 | 3.8 | 13.0 | 22.6 |
| Core particles 9 | 7.5 | 15.6 | 25.1 |
| Core particles 10 | 9.8 | — | 21.4 |
| Core particles 11 | 13.6 | — | 20.8 |

TABLE 3-continued

| Core particles | Properties of surface-treated core particles | | |
|---|---|---|---|
| Core particles 12 | 25.4 | — | 24.6 |
| Core particles 13 | 81.9 | 17.5 | 26.7 |
| Core particles 14 | 45.8 | 13.4 | 24.8 |

TABLE 4

| Kind of carbon black particles | Properties of carbon black fine particles | | |
|---|---|---|---|
| | Particle shape | Average particle size ($\mu$m) | Geometrical standard deviation (–) |
| Carbon black A | Granular | 0.022 | 1.78 |
| Carbon black B | Granular | 0.015 | 1.56 |
| Carbon black C | Granular | 0.030 | 2.06 |
| | BET specific surface area ($m^2$/g) | Oil absorption (ml/100 g) | Blackness (L* value) (–) |
| Carbon black A | 133.5 | 84 | 14.6 |
| Carbon black B | 265.3 | 57 | 15.2 |
| Carbon black C | 84.6 | 95 | 17.0 |

TABLE 5

| Examples and Comparative Examples | Production of black iron-based composite particles or black iron-based particles Addition of alkoxysilane compound or silicon compound Additives | | |
|---|---|---|---|
| | Kind of core particles | Kind | Amount added (part by weight) |
| Example 5 | Core particles 1 | Methyl triethoxysilane | 1.0 |
| Example 6 | Core particles 2 | Methyl trimethoxysilane | 2.0 |
| Example 7 | Core particles 3 | Dimethyl dimethoxysilane | 1.0 |
| Example 8 | Core particles 4 | Phenyl triethoxysilane | 0.5 |
| Example 9 | Core particles 5 | Isobutyl trimethoxysilane | 5.0 |
| Example 10 | Core particles 6 | Methyl triethoxysilane | 3.0 |
| Example 11 | Core particles 7 | Methyl triethoxysilane | 1.5 |
| Example 12 | Core particles 8 | Methyl triethoxysilane | 2.0 |
| Example 13 | Core particles 9 | Methyl trimethoxysilane | 5.0 |
| Example 14 | Core particles 10 | Dimethyl dimethoxysilane | 0.2 |
| Example 15 | Core particles 11 | Phenyl triethoxysilane | 1.5 |
| Example 16 | Core particles 12 | Isobutyl trimethoxysilane | 1.0 |
| Example 17 | Core particles 13 | Methyl triethoxysilane | 3.0 |
| Example 18 | Core particles 14 | Methyl triethoxysilane | 1.5 |
| Comparative Example 1 | Core particles 1 | — | — |
| Comparative Example 2 | Core particles 1 | Methyl triethoxysilane | 1.0 |
| Comparative Example 3 | Core particles 3 | Dimethyl dimethoxysilane | 0.5 |
| Comparative Example 4 | Core particles 3 | Methyl triethoxysilane | 0.005 |
| Comparative Example 5 | Core particles 1 | γ-aminopropyl triethoxysilane | 1.0 |

| | Production of black iron-based composite particles or black iron-based particles Addition of alkoxysilane compound or silicon compound | | |
|---|---|---|---|
| | Edge runner treatment | | Coating amount (calculated as |
| | Linear load (Kg/cm) | Time (min) | Si) (wt. %) |
| Example 5 | 60 | 30 | 0.16 |
| Example 6 | 60 | 30 | 0.41 |
| Example 7 | 45 | 15 | 0.22 |
| Example 8 | 75 | 20 | 0.06 |
| Example 9 | 30 | 60 | 0.73 |
| Example 10 | 60 | 30 | 0.46 |
| Example 11 | 60 | 60 | 0.24 |
| Example 12 | 60 | 30 | 0.31 |
| Example 13 | 60 | 15 | 0.97 |
| Example 14 | 60 | 20 | 0.05 |
| Example 15 | 30 | 60 | 0.18 |
| Example 16 | 45 | 30 | 0.16 |
| Example 17 | 45 | 30 | 0.46 |
| Example 18 | 30 | 30 | 0.24 |
| Comparative Example 1 | — | — | — |
| Comparative Example 2 | 60 | 20 | 0.15 |
| Comparative Example 3 | 60 | 30 | 0.11 |
| Comparative Example 4 | 60 | 30 | $7.9 \times 10^{-4}$ |
| Comparative Example 5 | 60 | 30 | 0.13 |

| | Production of black iron-based composite particles or black iron-based particles Addition of carbon black fine particles Carbon black fine particles | |
|---|---|---|
| | Kinds | Amount added (part by weight) |
| Example 5 | A | 9.0 |
| Example 6 | A | 5.0 |
| Example 7 | B | 6.0 |
| Example 8 | B | 12.0 |
| Example 9 | C | 16.0 |
| Example 10 | C | 18.0 |
| Example 11 | C | 13.0 |
| Example 12 | A | 10.0 |
| Example 13 | A | 15.0 |
| Example 14 | B | 20.0 |
| Example 15 | B | 15.0 |
| Example 16 | C | 10.0 |
| Example 17 | C | 18.0 |
| Example 18 | C | 17.0 |
| Comparative Example 1 | A | 10.0 |
| Comparative Example 2 | — | — |
| Comparative | A | 0.01 |

TABLE 5-continued

| Examples and Comparative Examples | | |
|---|---|---|
| Example 3 | | |
| Comparative Example 4 | B | 5.0 |
| Comparative Example 5 | C | 10.0 |

Production of black iron-based composite particles or black iron-based particles
Addition of carbon black fine particles

| | Edge runner treatment | | Amount adhered (calculated as C) (wt. %) |
|---|---|---|---|
| | Linear load (Kg/cm) | Time (min) | |
| Example 5 | 60 | 30 | 8.30 |
| Example 6 | 60 | 20 | 4.75 |
| Example 7 | 30 | 60 | 5.66 |
| Example 8 | 30 | 90 | 10.73 |
| Example 9 | 45 | 45 | 13.70 |
| Example 10 | 60 | 60 | 15.19 |
| Example 11 | 60 | 30 | 11.49 |
| Example 12 | 75 | 30 | 9.05 |
| Example 13 | 60 | 30 | 13.04 |
| Example 14 | 30 | 45 | 16.63 |
| Example 15 | 60 | 60 | 12.99 |
| Example 16 | 60 | 30 | 9.09 |
| Example 17 | 60 | 30 | 15.25 |
| Example 18 | 60 | 30 | 14.53 |
| Comparative Example 1 | 60 | 30 | 9.06 |
| Comparative Example 2 | — | — | — |
| Comparative Example 3 | 30 | 60 | 0.01 |
| Comparative Example 4 | 60 | 45 | 4.75 |
| Comparative Example 5 | 60 | 30 | 9.00 |

TABLE 6

| Examples and Comparative Examples | Properties of black iron-based composite particles or black iron-based particles | | | |
|---|---|---|---|---|
| | Average major axis diameter (average particle size) (μm) | Average minor axis diameter (μm) | Aspect ratio (-) | Geometrical standard deviation (-) |
| Example 5 | 0.32 | — | — | 1.46 |
| Example 6 | 0.18 | — | — | 1.40 |
| Example 7 | 0.28 | — | — | 1.52 |
| Example 8 | 0.24 | — | — | 1.34 |
| Example 9 | 0.41 | 0.053 | 7.8 | 1.51 |
| Example 10 | 0.28 | 0.038 | 7.3 | 1.39 |
| Example 11 | 0.20 | 0.030 | 6.7 | 1.41 |
| Example 12 | 0.32 | — | — | 1.44 |
| Example 13 | 0.19 | — | — | 1.38 |
| Example 14 | 0.30 | — | — | 1.47 |
| Example 15 | 0.24 | — | — | 1.34 |
| Example 16 | 0.40 | 0.051 | 7.8 | 1.50 |
| Example 17 | 0.28 | 0.038 | 7.3 | 1.38 |
| Example 18 | 0.19 | 0.028 | 6.7 | 1.42 |
| Comparative Example 1 | 0.33 | — | — | 1.47 |
| Comparative Example 2 | 0.32 | — | — | 1.47 |
| Comparative Example 3 | 0.28 | — | — | 1.52 |
| Comparative Example 4 | 0.28 | — | — | 1.52 |
| Comparative Example 5 | 0.33 | — | 1.47 | |

| | Properties of black iron-based composite particles or black iron-based particles | | | | |
|---|---|---|---|---|---|
| | BET specific surface area ($m^2/g$) | Mn content (wt. %) | Blackness (L* value) (-) | Carbon black desorption percentage (%) | Thickness of carbon black coat (μm) |
| Example 5 | 5.1 | 12.0 | 16.3 | 6.8 | 0.0024 |
| Example 6 | 7.6 | 14.6 | 17.8 | 7.2 | 0.0022 |
| Example 7 | 5.0 | — | 17.0 | 8.6 | 0.0024 |
| Example 8 | 13.6 | — | 16.4 | 5.6 | 0.0026 |
| Example 9 | 23.8 | — | 17.8 | 9.1 | 0.0026 |
| Example 10 | 91.6 | 14.6 | 17.8 | 8.3 | 0.0026 |
| Example 11 | 47.6 | 11.9 | 17.6 | 6.8 | 0.0025 |
| Example 12 | 4.6 | 11.6 | 16.5 | 4.8 | 0.0025 |
| Example 13 | 9.1 | 13.0 | 16.8 | 1.6 | 0.0026 |
| Example 14 | 14.4 | — | 15.9 | 3.9 | 0.0027 |
| Example 15 | 16.1 | — | 16.2 | 4.8 | 0.0025 |
| Example 16 | 24.8 | — | 17.5 | 4.0 | 0.0025 |
| Example 17 | 86.4 | 14.4 | 17.2 | 2.3 | 0.0026 |
| Example 18 | 48.1 | 11.5 | 17.3 | 0.9 | 0.0026 |
| Comparative Example 1 | 16.6 | 12.0 | 21.3 | 68.3 | — |
| Comparative Example 2 | 4.6 | 13.1 | 23.1 | — | — |
| Comparative Example 3 | 5.6 | — | 21.4 | — | — |
| Comparative Example 4 | 17.6 | — | 20.1 | 46.8 | — |
| Comparative Example 5 | 10.7 | 11.9 | 22.0 | 51.6 | — |

TABLE 7

| Examples | Production of solvent-based paint | | Properties of paint |
|---|---|---|---|
| | Kinds of black iron-based composite particles | Kinds of resin | Viscosity (cP) |
| Example 19 | Example 5 | Aminoalkyd resin | 640 |
| Example 20 | Example 6 | Aminoalkyd resin | 845 |
| Example 21 | Example 7 | Aminoalkyd resin | 712 |
| Example 22 | Example 8 | Aminoalkyd resin | 640 |
| Example 23 | Example 9 | Aminoalkyd resin | 896 |
| Example 24 | Example 10 | Aminoalkyd resin | 998 |
| Example 25 | Example 11 | Aminoalkyd resin | 712 |
| Example 26 | Example 12 | Aminoalkyd resin | 538 |
| Example 27 | Example 13 | Aminoalkyd resin | 793 |

TABLE 7-continued

Examples

| | | | |
|---|---|---|---|
| Example 28 | Example 14 | Aminoalkyd resin | 768 |
| Example 29 | Example 15 | Aminoalkyd resin | 614 |
| Example 30 | Example 16 | Aminoalkyd resin | 712 |
| Example 31 | Example 17 | Aminoalkyd resin | 793 |
| Example 32 | Example 18 | Aminoalkyd resin | 768 |

| | Properties of coating film | | | |
|---|---|---|---|---|
| | | Blackness | Acid resistance | |
| | Gloss (%) | (L* value) (−) | ΔG (%) | ΔL* value (−) |
| Example 19 | 103 | 15.6 | 6.7 | 0.6 |
| Example 20 | 108 | 16.6 | 9.3 | 0.7 |
| Example 21 | 96 | 16.3 | 8.2 | 0.8 |
| Example 22 | 103 | 16.1 | 6.6 | 0.7 |
| Example 23 | 88 | 17.5 | 8.3 | 0.6 |
| Example 24 | 118 | 17.4 | 8.6 | 0.8 |
| Example 25 | 121 | 17.4 | 6.8 | 0.7 |
| Example 26 | 106 | 16.4 | 3.6 | 0.2 |
| Example 27 | 113 | 16.4 | 4.5 | 0.3 |
| Example 28 | 103 | 15.6 | 2.1 | 0.3 |
| Example 29 | 103 | 16.0 | 1.6 | 0.2 |
| Example 30 | 91 | 17.1 | 3.2 | 0.3 |
| Example 31 | 125 | 17.0 | 4.8 | 0.3 |
| Example 32 | 128 | 17.2 | 3.6 | 0.3 |

TABLE 8

Comparative Examples

| | Production of solvent-based paint | | Properties |
|---|---|---|---|
| | Kinds of black particles | Kinds of resin | of paint Viscosity (cP) |
| Comparative Example 7 | Core particles 1 | Aminoalkyd resin | 538 |
| Comparative Example 8 | Core particles 2 | Aminoalkyd resin | 896 |
| Comparative Example 9 | Core particles 3 | Aminoalkyd resin | 640 |
| Comparative Example 10 | Core particles 4 | Aminoalkyd resin | 793 |
| Comparative Example 11 | Core particles 5 | Aminoalkyd resin | 972 |
| Comparative Example 12 | Core particles 6 | Aminoalkyd resin | 1,178 |
| Comparative Example 13 | Carbon black A | Aminoalkyd resin | 8,192 |
| Comparative Example 14 | Carbon black B | Aminoalkyd resin | 10,240 |
| Comparative Example 15 | Carbon black C | Aminoalkyd resin | 6,400 |
| Comparative Example 16 | Comparative Example 1 | Aminoalkyd resin | 3,840 |
| Comparative Example 17 | Comparative Example 2 | Aminoalkyd resin | 435 |
| Comparative Example 18 | Comparative Example 3 | Aminoalkyd resin | 972 |
| Comparative Example 19 | Comparative Example 4 | Aminoalkyd resin | 4,352 |
| Comparative Example 20 | Comparative Example 5 | Aminoalkyd resin | 3,584 |
| Comparative Example 21 | Comparative Example 6 | Aminoalkyd resin | 2,816 |

TABLE 8-continued

Comparative Examples

| | Properties of coating film | | | |
|---|---|---|---|---|
| | | Blackness | Acid resistance | |
| | Gloss (%) | (L* value) (−) | ΔG (%) | ΔL* value (−) |
| Comparative Example 7 | 76 | 21.9 | 12.8 | 1.5 |
| Comparative Example 8 | 82 | 23.8 | 14.6 | 1.6 |
| Comparative Example 9 | 69 | 20.1 | 12.8 | 2.2 |
| Comparative Example 10 | 78 | 19.8 | 16.1 | 1.4 |
| Comparative Example 11 | 61 | 21.2 | 13.1 | 1.9 |
| Comparative Example 12 | 80 | 26.1 | 12.6 | 1.5 |
| Comparative Example 13 | 43 | 14.8 | 11.6 | 1.2 |
| Comparative Example 14 | 21 | 15.6 | 10.8 | 1.2 |
| Comparative Example 15 | 56 | 16.3 | 10.2 | 1.4 |
| Comparative Example 16 | 61 | 21.2 | 12.6 | 1.3 |
| Comparative Example 17 | 80 | 22.0 | 10.3 | 1.6 |
| Comparative Example 18 | 72 | 20.5 | 11.0 | 1.3 |
| Comparative Example 19 | 46 | 19.6 | 12.2 | 1.2 |
| Comparative Example 20 | 58 | 22.0 | 11.3 | 1.2 |
| Comparative Example 21 | 61 | 21.6 | 11.8 | 1.3 |

TABLE 9

Examples

| | Production of water-based paint | | |
|---|---|---|---|
| | Kinds of black iron-based composite particles | Kinds of resin | Properties of paint Viscosity (cP) |
| Example 33 | Example 5 | Water-soluble alkyd resin Water-soluble melamine resin | 896 |
| Example 34 | Example 6 | Water-soluble alkyd resin Water-soluble melamine resin | 973 |
| Example 35 | Example 7 | Water-soluble alkyd resin Water-soluble melamine resin | 768 |
| Example 36 | Example 8 | Water-soluble alkyd resin Water-soluble melamine resin | 845 |
| Example 37 | Example 9 | Water-soluble alkyd resin Water-soluble melamine resin | 973 |
| Example 38 | Example 10 | Water-soluble alkyd resin Water-soluble melamine resin | 922 |
| Example 39 | Example 11 | Water-soluble alkyd resin Water-soluble melamine resin | 870 |
| Example 40 | Example 12 | Water-soluble alkyd resin Water-soluble melamine resin | 794 |
| Example 41 | Example 13 | Water-soluble alkyd resin Water-soluble melamine resin | 614 |
| Example 42 | Example 14 | Water-soluble alkyd resin Water-soluble melamine resin | 666 |
| Example 43 | Example 15 | Water-soluble alkyd resin Water-soluble melamine resin | 717 |

TABLE 9-continued

Examples

| | | | |
|---|---|---|---|
| Example 44 | Example 16 | Water-soluble alkyd resin<br>Water-soluble melamine resin | 870 |
| Example 45 | Example 17 | Water-soluble alkyd resin<br>Water-soluble melamine resin | 896 |
| Example 46 | Example 18 | Water-soluble alkyd resin<br>Water-soluble melamine resin | 768 |

| | Properties of coating film | | | |
|---|---|---|---|---|
| | | Blackness | Acid resistance | |
| | Gloss (%) | (L* value)<br>(—) | ΔG<br>(%) | ΔL* value<br>(—) |
| Example 33 | 91 | 16.7 | 8.9 | 0.8 |
| Example 34 | 97 | 17.5 | 8.5 | 0.8 |
| Example 35 | 91 | 17.1 | 8.4 | 0.7 |
| Example 36 | 95 | 17.8 | 7.4 | 0.8 |
| Example 37 | 86 | 18.4 | 8.1 | 0.7 |
| Example 38 | 110 | 17.6 | 7.8 | 0.7 |
| Example 39 | 115 | 17.5 | 8.3 | 0.8 |
| Example 40 | 98 | 17.5 | 4.6 | 0.4 |
| Example 41 | 101 | 17.4 | 4.1 | 0.4 |
| Example 42 | 96 | 16.7 | 3.5 | 0.3 |
| Example 43 | 95 | 17.2 | 2.6 | 0.4 |
| Example 44 | 88 | 18.3 | 4.1 | 0.4 |
| Example 45 | 118 | 17.2 | 3.6 | 0.3 |
| Example 46 | 116 | 17.6 | 3.8 | 0.4 |

TABLE 10

Comparative Examples

| | Production of water-based paint | | Properties |
|---|---|---|---|
| | Kinds of black particles | Kinds of resin | of paint Viscosity (cP) |
| Comparative Example 22 | Core particles 1 | Water-soluble alkyd resin<br>Water-soluble melamine resin | 870 |
| Comparative Example 23 | Core particles 2 | Water-soluble alkyd resin<br>Water-soluble melamine resin | 1,050 |
| Comparative Example 24 | Core particles 3 | Water-soluble alkyd resin<br>Water-soluble melamine resin | 819 |
| Comparative Example 25 | Core particles 4 | Water-soluble alkyd resin<br>Water-soluble melamine resin | 922 |
| Comparative Example 26 | Core particles 5 | Water-soluble alkyd resin<br>Water-soluble melamine resin | 998 |
| Comparative Example 27 | Core particles 6 | Water-soluble alkyd resin<br>Water-soluble melamine resin | 1,152 |
| Comparative Example 28 | Carbon black A | Water-soluble alkyd resin<br>Water-soluble melamine resin | 12,800 |
| Comparative Example 29 | Carbon black B | Water-soluble alkyd resin<br>Water-soluble melamine resin | 16,640 |
| Comparative Example 30 | Carbon black C | Water-soluble alkyd resin<br>Water-soluble melamine resin | 8,704 |
| Comparative Example 31 | Comp. Ex. 1 | Water-soluble alkyd resin<br>Water-soluble melamine resin | 2,995 |
| Comparative Example 32 | Comp. Ex. 2 | Water-soluble alkyd resin<br>Water-soluble melamine resin | 788 |
| Comparative Example 33 | Comp. Ex. 3 | Water-soluble alkyd resin<br>Water-soluble melamine resin | 1,024 |
| Comparative Example 34 | Comp. Ex. 4 | Water-soluble alkyd resin<br>Water-soluble melamine resin | 3,174 |
| Comparative Example 35 | Comp. Ex. 5 | Water-soluble alkyd resin<br>Water-soluble melamine resin | 3,328 |
| Comparative Example 36 | Comp. Ex. 6 | Water-soluble alkyd resin<br>Water-soluble melamine resin | 2,560 |

| | Properties of coating film | | | |
|---|---|---|---|---|
| | | Blackness | Acid resistance | |
| | Gloss (%) | (L* value)<br>(—) | ΔG<br>(%) | ΔL* value<br>(—) |
| Comparative Example 22 | 73 | 22.4 | 16.9 | 1.8 |
| Comparative Example 23 | 76 | 24.1 | 18.3 | 2.4 |
| Comparative Example 24 | 65 | 21.0 | 16.6 | 3.0 |
| Comparative Example 25 | 70 | 20.6 | 21.5 | 2.1 |
| Comparative Example 26 | 48 | 21.8 | 18.7 | 2.4 |
| Comparative Example 27 | 74 | 26.0 | 15.8 | 2.3 |
| Comparative Example 28 | 20 | 16.1 | 14.6 | 1.4 |
| Comparative Example 29 | 15 | 16.3 | 12.8 | 1.6 |
| Comparative Example 30 | 9 | 16.9 | 12.1 | 1.5 |
| Comparative Example 31 | 58 | 22.1 | 15.8 | 1.9 |
| Comparative Example 32 | 68 | 23.2 | 12.1 | 2.0 |
| Comparative Example 33 | 64 | 21.4 | 13.0 | 1.6 |
| Comparative Example 34 | 38 | 20.7 | 14.3 | 1.7 |
| Comparative Example 35 | 60 | 21.9 | 13.8 | 1.8 |
| Comparative Example 36 | 48 | 22.6 | 14.1 | 2.0 |

TABLE 11

Examples

| | Production of resin composition<br>Black iron-based composite particles | |
|---|---|---|
| | Kinds | Amount (part by weight) |
| Example 47 | Example 5 | 5.0 |
| Example 48 | Example 6 | 5.0 |
| Example 49 | Example 7 | 5.0 |
| Example 50 | Example 8 | 5.0 |
| Example 51 | Example 9 | 5.0 |
| Example 52 | Example 10 | 5.0 |
| Example 53 | Example 11 | 5.0 |
| Example 54 | Example 12 | 5.0 |
| Example 55 | Example 13 | 5.0 |
| Example 56 | Example 14 | 5.0 |
| Example 57 | Example 15 | 5.0 |
| Example 58 | Example 16 | 5.0 |
| Example 59 | Example 17 | 5.0 |
| Example 60 | Example 18 | 5.0 |

| | Production of resin composition<br>Resin | |
|---|---|---|
| | Kinds | Amount (part by weight) |
| Example 47 | Polyvinyl chloride resin | 95.0 |
| Example 48 | Polyvinyl chloride resin | 95.0 |

TABLE 11-continued

| Examples | | |
|---|---|---|
| Example 49 | Polyvinyl chloride resin | 95.0 |
| Example 50 | Polyvinyl chloride resin | 95.0 |
| Example 51 | Polyvinyl chloride resin | 95.0 |
| Example 52 | Polyvinyl chloride resin | 95.0 |
| Example 53 | Polyvinyl chloride resin | 95.0 |
| Example 54 | Polyvinyl chloride resin | 95.0 |
| Example 55 | Polyvinyl chloride resin | 95.0 |
| Example 56 | Polyvinyl chloride resin | 95.0 |
| Example 57 | Polyvinyl chloride resin | 95.0 |
| Example 58 | Polyvinyl chloride resin | 95.0 |
| Example 59 | Polyvinyl chloride resin | 95.0 |
| Example 60 | Polyvinyl chloride resin | 95.0 |

Production of resin composition
Additives

| | Kinds | Amount (part by weight) | Kneading temperature (° C.) |
|---|---|---|---|
| Example 47 | Calcium stearate | 1.0 | 160 |
| Example 48 | Calcium stearate | 1.0 | 160 |
| Example 49 | Calcium stearate | 1.0 | 160 |
| Example 50 | Calcium stearate | 1.0 | 160 |
| Example 51 | Calcium stearate | 1.0 | 160 |
| Example 52 | Calcium stearate | 1.0 | 160 |
| Example 53 | Calcium stearate | 1.0 | 160 |
| Example 54 | Calcium stearate | 1.0 | 160 |
| Example 55 | Calcium stearate | 1.0 | 160 |
| Example 56 | Calcium stearate | 1.0 | 160 |
| Example 57 | Calcium stearate | 1.0 | 160 |
| Example 58 | Calcium stearate | 1.0 | 160 |
| Example 59 | Calcium stearate | 1.0 | 160 |
| Example 60 | Calcium stearate | 1.0 | 160 |

Properties of resin composition

| | Dispersing condition (-) | Blackness ($L^*$) value (-) | Percentage of area of deteriorated and discolored portions when heated at 190° C. $(S/S_0) \times 100$ (%) | | |
|---|---|---|---|---|---|
| | | | 30 minutes | 60 minutes | 90 minutes |
| Example 47 | 5 | 17.5 | 0 | 5 | 5 |
| Example 48 | 4 | 18.7 | 0 | 5 | 10 |
| Example 49 | 5 | 18.4 | 0 | 5 | 5 |
| Example 50 | 4 | 18.8 | 0 | 0 | 5 |
| Example 51 | 4 | 19.5 | 0 | 5 | 10 |
| Example 52 | 4 | 18.7 | 0 | 0 | 5 |
| Example 53 | 5 | 18.9 | 0 | 0 | 5 |
| Example 54 | 5 | 18.6 | 0 | 0 | 5 |
| Example 55 | 5 | 18.8 | 0 | 0 | 0 |
| Example 56 | 5 | 17.6 | 0 | 0 | 5 |
| Example 57 | 5 | 18.0 | 0 | 0 | 0 |
| Example 58 | 5 | 18.5 | 0 | 0 | 0 |
| Example 59 | 5 | 18.2 | 0 | 0 | 0 |
| Example 60 | 5 | 18.1 | 0 | 0 | 0 |

TABLE 12

Comparative Examples

Production of resin composition
Black particles

| | Kinds | Amount (part by weight) |
|---|---|---|
| Comparative Example 37 | Core particles 1 | 5.0 |
| Comparative Example 38 | Core particles 2 | 5.0 |
| Comparative Example 39 | Core particles 3 | 5.0 |
| Comparative Example 40 | Core particles 4 | 5.0 |
| Comparative Example 41 | Core particles 5 | 5.0 |
| Comparative Example 42 | Core particles 6 | 5.0 |
| Comparative Example 43 | Carbon black A | 5.0 |
| Comparative Example 44 | Carbon black B | 5.0 |
| Comparative Example 45 | Carbon black C | 5.0 |
| Comparative Example 46 | Comparative Example 1 | 5.0 |
| Comparative Example 47 | Comparative Example 2 | 5.0 |
| Comparative Example 48 | Comparative Example 3 | 5.0 |
| Comparative Example 49 | Comparative Example 4 | 5.0 |
| Comparative Example 50 | Comparative Example 5 | 5.0 |
| Comparative Example 51 | Comparative Example 6 | 5.0 |

Production of resin composition
Resin

| | Kinds | Amount (part by weight) |
|---|---|---|
| Comparative Example 37 | Polyvinyl chloride resin | 95.0 |
| Comparative Example 38 | Polyvinyl chloride resin | 95.0 |
| Comparative Example 39 | Polyvinyl chloride resin | 95.0 |
| Comparative Example 40 | Polyvinyl chloride resin | 95.0 |
| Comparative Example 41 | Polyvinyl chloride resin | 95.0 |
| Comparative Example 42 | Polyvinyl chloride resin | 95.0 |
| Comparative Example 43 | Polyvinyl chloride resin | 95.0 |
| Comparative Example 44 | Polyvinyl chloride resin | 95.0 |
| Comparative Example 45 | Polyvinyl chloride resin | 95.0 |
| Comparative Example 46 | Polyvinyl chloride resin | 95.0 |
| Comparative Example 47 | Polyvinyl chloride resin | 95.0 |
| Comparative Example 48 | Polyvinyl chloride resin | 95.0 |
| Comparative Example 49 | Polyvinyl chloride resin | 95.0 |
| Comparative Example 50 | Polyvinyl chloride resin | 95.0 |
| Comparative Example 51 | Polyvinyl chloride resin | 95.0 |

Production of resin composition
Additives

| | Kinds | Amount (part by weight) | Kneading temperature (° C.) |
|---|---|---|---|
| Comparative Example 37 | Calcium stearate | 1.0 | 160 |

TABLE 12-continued

Comparative Examples

| | | | |
|---|---|---|---|
| Comparative Example 38 | Calcium stearate | 1.0 | 160 |
| Comparative Example 39 | Calcium stearate | 1.0 | 160 |
| Comparative Example 40 | Calcium stearate | 1.0 | 160 |
| Comparative Example 41 | Calcium stearate | 1.0 | 160 |
| Comparative Example 42 | Calcium stearate | 1.0 | 160 |
| Comparative Example 43 | Calcium stearate | 1.0 | 160 |
| Comparative Example 44 | Calcium stearate | 1.0 | 160 |
| Comparative Example 45 | Calcium stearate | 1.0 | 160 |
| Comparative Example 46 | Calcium stearate | 1.0 | 160 |
| Comparative Example 47 | Calcium stearate | 1.0 | 160 |
| Comparative Example 48 | Calcium stearate | 1.0 | 160 |
| Comparative Example 49 | Calcium stearate | 1.0 | 160 |
| Comparative Example 50 | Calcium stearate | 1.0 | 160 |
| Comparative Example 51 | Calcium stearate | 1.0 | 160 |

Properties of resin composition

| | Dispersing condition (−) | Blackness ($L^*$ value) (−) | Percentage of area of deteriorated and discolored portions when heated at 190° C. $(S/S_0) \times 100$ (%) | | |
|---|---|---|---|---|---|
| | | | 30 minutes | 60 minutes | 90 minutes |
| Comparative Example 37 | 3 | 24.6 | 15 | 30 | 50 |
| Comparative Example 38 | 2 | 26.1 | 30 | 60 | 85 |
| Comparative Example 39 | 3 | 22.4 | 15 | 35 | 60 |
| Comparative Example 40 | 3 | 22.4 | 10 | 20 | 40 |
| Comparative Example 41 | 3 | 24.8 | 5 | 20 | 60 |
| Comparative Example 42 | 2 | 27.5 | 5 | 15 | 25 |
| Comparative Example 43 | 2 | 17.8 | 5 | 10 | 35 |
| Comparative Example 44 | 2 | 18.6 | 5 | 10 | 15 |
| Comparative Example 45 | 3 | 19.3 | 10 | 20 | 25 |
| Comparative Example 46 | 3 | 23.2 | 10 | 20 | 35 |
| Comparative Example 47 | 3 | 24.3 | 10 | 15 | 25 |
| Comparative Example 48 | 3 | 22.7 | 10 | 15 | 30 |
| Comparative Example 49 | 3 | 21.5 | 15 | 25 | 35 |
| Comparative Example 50 | 3 | 23.5 | 10 | 20 | 30 |
| Comparative Example 51 | 2 | 23.8 | 10 | 15 | 25 |

TABLE 13

Examples and Comparative Examples

Production of black iron-based composite particles or black iron-based particles
Addition of polysiloxane Additives

| | Kind of core particles | Kinds | Amount added (part by weight) |
|---|---|---|---|
| Example 65 | Core particles 1 | TSF484 | 1.0 |
| Example 66 | Core particles 2 | TSF484 | 5.0 |
| Example 67 | Core particles 3 | KF99 | 2.0 |
| Example 68 | Core particles 4 | L-9000 | 1.0 |
| Example 69 | Core particles 5 | TSF484/TSF451 | 0.4/0.1 |
| Example 70 | Core particles 6 | TSF484/L-45 | 0.5/1.5 |
| Example 71 | Core particles 7 | TSF451 | 3.0 |
| Example 72 | Core particles 8 | TSF484 | 1.5 |
| Example 73 | Core particles 9 | TSF484 | 3.5 |
| Example 74 | Core particles 10 | KF99 | 1.0 |
| Example 75 | Core particles 11 | L-9000 | 2.0 |
| Example 76 | Core particles 12 | TSF484/TSF451 | 0.25/0.05 |
| Example 77 | Core particles 13 | TSF484/L-45 | 1.0/4.0 |
| Example 78 | Core particles 14 | TSF451 | 2.0 |
| Comparative Example 52 | Core particles 1 | TSF484 | 1.0 |
| Comparative Example 53 | Core particles 2 | TSF484 | 0.5 |
| Comparative Example 54 | Core particles 3 | TSF484 | 0.005 |

Production of black iron-based composite particles or black iron-based particles
Addition of polysiloxane

| | Edge runner treatment | | Coating amount (calculated as Si) (wt. %) |
|---|---|---|---|
| | Linear load (Kg/cm) | Time (min) | |
| Example 65 | 60 | 30 | 0.44 |
| Example 66 | 45 | 45 | 2.19 |
| Example 67 | 60 | 30 | 0.87 |
| Example 68 | 30 | 30 | 0.45 |
| Example 69 | 75 | 30 | 0.23 |
| Example 70 | 60 | 30 | 0.75 |
| Example 71 | 45 | 30 | 1.10 |
| Example 72 | 30 | 60 | 0.65 |
| Example 73 | 45 | 45 | 1.51 |
| Example 74 | 45 | 30 | 0.43 |
| Example 75 | 30 | 30 | 0.87 |
| Example 76 | 60 | 30 | 0.13 |
| Example 77 | 60 | 60 | 1.89 |
| Example 78 | 30 | 45 | 0.75 |
| Comparative Example 52 | 60 | 30 | 0.44 |
| Comparative Example 53 | 60 | 30 | 0.21 |
| Comparative Example 54 | 60 | 30 | $2.2 \times 10^{-3}$ |

Production of black iron-based composite particles or black iron-based particles
Addition of carbon black fine particles
Carbon black fine particles

| | Kinds | Amount added (part by weight) |
|---|---|---|
| Example 65 | A | 10.0 |
| Example 66 | A | 3.0 |

TABLE 13-continued

| Examples and Comparative Examples | | |
|---|---|---|
| Example 67 | A | 5.0 |
| Example 68 | B | 10.0 |
| Example 69 | B | 15.0 |
| Example 70 | C | 5.0 |
| Example 71 | C | 8.0 |
| Example 72 | A | 5.0 |
| Example 73 | A | 10.0 |
| Example 74 | A | 15.0 |
| Example 75 | B | 10.0 |
| Example 76 | B | 20.0 |
| Example 77 | C | 7.5 |
| Example 78 | C | 10.0 |
| Comparative Example 52 | — | — |
| Comparative Example 53 | A | 0.01 |
| Comparative Example 54 | B | 3.0 |

| | Production of black iron-based composite particles or black iron-based particles Addition of carbon black fine particles | | |
|---|---|---|---|
| | Edge runner treatment | | Amount adhered (calculated as C) (wt. %) |
| | Linear load (Kg/cm) | Time (min) | |
| Example 65 | 60 | 60 | 9.06 |
| Example 66 | 60 | 20 | 2.90 |
| Example 67 | 45 | 30 | 4.75 |
| Example 68 | 30 | 30 | 9.11 |
| Example 69 | 60 | 30 | 13.01 |
| Example 70 | 30 | 60 | 4.76 |
| Example 71 | 60 | 45 | 7.41 |
| Example 72 | 75 | 30 | 4.72 |
| Example 73 | 60 | 30 | 8.99 |
| Example 74 | 60 | 60 | 12.89 |
| Example 75 | 45 | 45 | 9.08 |
| Example 76 | 30 | 90 | 16.56 |
| Example 77 | 30 | 60 | 6.98 |
| Example 78 | 60 | 20 | 9.05 |
| Comparative Example 52 | — | — | — |
| Comparative Example 53 | 60 | 45 | 0.01 |
| Comparative Example 54 | 60 | 45 | 2.91 |

TABLE 14

| Examples and Comparative Examples | Properties of black iron-based composite particles or black iron-based particles | | | |
|---|---|---|---|---|
| | Average major axis diameter (average particle size) ($\mu$m) | Average minor axis diameter ($\mu$m) | Aspect ratio (-) | Geometrical standard deviation (-) |
| Example 65 | 0.32 | — | — | 1.47 |
| Example 66 | 0.18 | — | — | 1.40 |
| Example 67 | 0.28 | — | — | 1.53 |

TABLE 14-continued

| Examples and Comparative Examples | | | | |
|---|---|---|---|---|
| Example 68 | 0.23 | — | — | 1.35 |
| Example 69 | 0.41 | 0.053 | 7.8 | 1.52 |
| Example 70 | 0.29 | 0.040 | 7.3 | 1.38 |
| Example 71 | 0.21 | 0.031 | 6.7 | 1.41 |
| Example 72 | 0.32 | — | — | 1.45 |
| Example 73 | 0.18 | — | — | 1.39 |
| Example 74 | 0.29 | — | — | 1.52 |
| Example 75 | 0.23 | — | — | 1.34 |
| Example 76 | 0.40 | 0.051 | 7.8 | 1.50 |
| Example 77 | 0.28 | 0.038 | 7.3 | 1.38 |
| Example 78 | 0.19 | 0.028 | 6.7 | 1.41 |
| Comparative Example 52 | 0.32 | — | — | 1.48 |
| Comparative Example 53 | 0.28 | — | — | 1.52 |
| Comparative Example 54 | 0.28 | — | — | 1.52 |

| | Properties of black iron-based composite particles or black iron-based particles | | | | |
|---|---|---|---|---|---|
| | BET specific surface area (m$^2$/g) | Mn content (wt. %) | Blackness (L* value) (-) | Carbon black desorption percentage (%) | Thickness of carbon black coat ($\mu$m) |
| Example 65 | 6.2 | 11.9 | 16.2 | 5.8 | 0.0026 |
| Example 66 | 8.3 | 15.0 | 17.9 | 6.9 | 0.0018 |
| Example 67 | 5.6 | — | 17.2 | 5.2 | 0.0022 |
| Example 68 | 12.8 | — | 16.6 | 6.8 | 0.0025 |
| Example 69 | 21.6 | — | 17.9 | 8.4 | 0.0026 |
| Example 70 | 86.6 | 16.6 | 17.9 | 7.1 | 0.0021 |
| Example 71 | 47.1 | 12.5 | 17.7 | 6.9 | 0.0025 |
| Example 72 | 4.1 | 12.3 | 16.9 | 4.9 | 0.0023 |
| Example 73 | 7.9 | 14.1 | 17.1 | 3.2 | 0.0026 |
| Example 74 | 13.6 | — | 16.1 | 4.3 | 0.0026 |
| Example 75 | 15.5 | — | 16.5 | 2.6 | 0.0025 |
| Example 76 | 19.6 | — | 16.9 | 0.8 | 0.0026 |
| Example 77 | 86.3 | 16.4 | 17.6 | 1.6 | 0.0024 |
| Example 78 | 46.6 | 12.2 | 17.7 | 2.1 | 0.0025 |
| Comparative Example 52 | 4.5 | 13.1 | 23.1 | — | — |
| Comparative Example 53 | 6.1 | — | 21.4 | — | — |
| Comparative Example 54 | 17.8 | — | 20.5 | 48.3 | — |

TABLE 15

| Examples and Comparative Examples | Production of solvent-based paint | | Properties of paint |
|---|---|---|---|
| | Kinds of black iron-based particles | Kinds of resin | Viscosity (cP) |
| Example 79 | Example 65 | Aminoalkyd resin | 768 |
| Example 80 | Example 66 | Aminoalkyd resin | 845 |
| Example 81 | Example 67 | Aminoalkyd resin | 794 |
| Example 82 | Example 68 | Aminoalkyd resin | 717 |
| Example 83 | Example 69 | Aminoalkyd resin | 666 |
| Example 84 | Example 70 | Aminoalkyd resin | 923 |
| Example 85 | Example 71 | Aminoalkyd resin | 870 |
| Example 86 | Example 72 | Aminoalkyd resin | 640 |
| Example 87 | Example 73 | Aminoalkyd resin | 666 |

TABLE 15-continued

| Examples and Comparative Examples | | | |
|---|---|---|---|
| Example 88 | Example 74 | Aminoalkyd resin | 717 |
| Example 89 | Example 75 | Aminoalkyd resin | 589 |
| Example 90 | Example 76 | Aminoalkyd resin | 666 |
| Example 91 | Example 77 | Aminoalkyd resin | 742 |
| Example 92 | Example 78 | Aminoalkyd resin | 845 |
| Comparative Example 55 | Comparative Example 2 | Aminoalkyd resin | 384 |
| Comparative Example 56 | Comparative Example 3 | Aminoalkyd resin | 896 |
| Comparative Example 57 | Comparative Example 4 | Aminoalkyd resin | 4,122 |

| | Properties of coating film | | |
|---|---|---|---|
| | | Blackness | Acid resistance | |
| | Gloss (%) | (L* value) (−) | ΔG (%) | ΔL* value (−) |
| Example 79 | 100 | 15.6 | 6.9 | 0.7 |
| Example 80 | 102 | 16.7 | 8.9 | 0.7 |
| Example 81 | 98 | 16.5 | 8.5 | 0.8 |
| Bxample 82 | 100 | 16.2 | 6.8 | 0.6 |
| Example 83 | 123 | 17.6 | 8.1 | 0.6 |
| Example 84 | 116 | 17.4 | 7.9 | 0.7 |
| Example 85 | 91 | 17.4 | 9.8 | 0.9 |
| Example 86 | 109 | 16.6 | 3.2 | 0.3 |
| Example 87 | 115 | 16.8 | 3.8 | 0.1 |
| Example 88 | 106 | 15.7 | 2.3 | 0.2 |
| Example 89 | 112 | 16.3 | 2.0 | 0.2 |
| Example 90 | 109 | 16.8 | 1.5 | 0.2 |
| Example 91 | 97 | 17.1 | 4.7 | 0.3 |
| Example 92 | 99 | 17.5 | 4.6 | 0.4 |
| Comparative Example 55 | 76 | 22.2 | 10.9 | 1.3 |
| Comparative Example 56 | 73 | 20.7 | 11.3 | 1.4 |
| Comparative Example 57 | 38 | 19.8 | 12.5 | 1.4 |

TABLE 16

| Examples and Comparative Examples | | | |
|---|---|---|---|
| | Production of water-based paint | | |
| | Kinds of black iron-based particles | Kinds of resin | Properties of paint Viscosity (cP) |
| Example 93 | Example 65 | Water-soluble alkyd resin / Water-soluble melamine resin | 845 |
| Example 94 | Example 66 | Water-soluble alkyd resin / Water-soluble melainine resin | 793 |
| Example 95 | Example 67 | Water-soluble alkyd resin / Water-soluble melamine resin | 717 |
| Example 96 | Example 68 | Water-soluble alkyd resin / Water-soluble melamine resin | 923 |
| Example 97 | Example 69 | Water-soluble alkyd resin / Water-soluble melamine resin | 973 |
| Example 98 | Example 70 | Water-soluble alkyd resin / Water-soluble melamine resin | 896 |
| Example 99 | Example 71 | Water-soluble alkyd resin / Water-soluble melamine resin | 794 |
| Example 100 | Example 72 | Water-soluble alkyd resin / Water-soluble melamine resin | 870 |
| Example 101 | Example 73 | Water-soluble alkyd resin / Water-soluble melamine resin | 768 |
| Example 102 | Example 74 | Water-soluble alkyd resin / Water-soluble melamine resin | 640 |
| Example 103 | Example 75 | Water-soluble alkyd resin / Water-soluble melamine resin | 691 |
| Example 104 | Example 76 | Water-soluble alkyd resin / Water-soluble melamine resin | 794 |
| Example 105 | Example 77 | Water-soluble alkyd resin / Water-soluble melamine resin | 947 |
| Example 106 | Example 78 | Water-soluble alkyd resin / Water-soluble melamine resin | 819 |
| Comparative Example 58 | Comp. Ex. 2 | Water-soluble alkyd resin / Water-soluble melamine resin | 870 |
| Comparative Example 59 | Comp. Ex. 3 | Water-soluble alkyd resin / Water-soluble melamine resin | 1,152 |
| Comparative Example 60 | Comp. Ex. 4 | Water-soluble alkyd resin / Water-soluble melamine resin | 3,584 |

| | Properties of coating film | | |
|---|---|---|---|
| | | Blackness | Acid resistance | |
| | Gloss (%) | (L* value) (−) | ΔG (%) | ΔL* value (−) |
| Example 93 | 96 | 16.6 | 7.8 | 0.8 |
| Example 94 | 98 | 17.4 | 8.3 | 0.8 |
| Example 95 | 96 | 17.3 | 7.9 | 0.8 |
| Example 96 | 101 | 17.8 | 6.8 | 0.8 |
| Example 97 | 106 | 18.2 | 7.9 | 0.7 |
| Example 98 | 98 | 17.8 | 8.7 | 0.8 |
| Example 99 | 90 | 17.8 | 9.6 | 0.9 |
| Example 100 | 101 | 17.6 | 3.9 | 0.2 |
| Example 101 | 106 | 17.8 | 3.8 | 0.2 |
| Example 102 | 110 | 17.0 | 3.8 | 0.3 |
| Example 103 | 113 | 16.9 | 3.1 | 0.3 |
| Example 104 | 110 | 18.3 | 3.6 | 0.2 |
| Example 105 | 96 | 17.6 | 4.8 | 0.3 |
| Example 106 | 99 | 18.1 | 4.6 | 0.4 |
| Comparative Example 58 | 60 | 23.1 | 13.1 | 2.0 |
| Comparative Example 59 | 53 | 21.5 | 13.5 | 1.5 |
| Comparative Example 60 | 46 | 20.7 | 14.6 | 1.7 |

TABLE 17

| Examples and Comparative Examples | Production of resin composition Black iron-based particles | |
|---|---|---|
| | Kinds | Amount (part by weight) |
| Example 107 | Example 65 | 5.0 |
| Example 108 | Example 66 | 5.0 |
| Example 109 | Example 67 | 5.0 |
| Example 110 | Example 68 | 5.0 |
| Example 111 | Example 69 | 5.0 |
| Example 112 | Example 70 | 5.0 |
| Example 113 | Example 71 | 5.0 |
| Example 114 | Example 72 | 5.0 |
| Example 115 | Example 73 | 5.0 |
| Example 116 | Example 74 | 5.0 |
| Example 117 | Example 75 | 5.0 |
| Example 118 | Example 76 | 5.0 |

TABLE 17-continued

| Examples and Comparative Examples | | |
|---|---|---|
| Example 119 | Example 77 | 5.0 |
| Example 120 | Example 78 | 5.0 |
| Comparative Example 61 | Comparative Example 2 | 5.0 |
| Comparative Example 62 | Comparative Example 3 | 5.0 |
| Comparative Example 63 | Comparative Example 4 | 5.0 |

Production of resin composition
Resin

| | Kinds | Amount (part by weight) |
|---|---|---|
| Example 107 | Polyvinyl chloride resin | 95.0 |
| Example 108 | Polyvinyl chloride resin | 95.0 |
| Example 109 | Polyvinyl chloride resin | 95.0 |
| Example 110 | Polyvinyl chloride resin | 95.0 |
| Example 111 | Polyvinyl chloride resin | 95.0 |
| Example 112 | Polyvinyl chloride resin | 95.0 |
| Example 113 | Polyvinyl chloride resin | 95.0 |
| Example 114 | Polyvinyl chloride resin | 95.0 |
| Example 115 | Polyvinyl chloride resin | 95.0 |
| Example 116 | Polyvinyl chloride resin | 95.0 |
| Example 117 | Polyvinyl chloride resin | 95.0 |
| Example 118 | Polyvinyl chloride resin | 95.0 |
| Example 119 | Polyvinyl chloride resin | 95.0 |
| Example 120 | Polyvinyl chloride resin | 95.0 |
| Comparative Example 61 | Polyvinyl chloride resin | 95.0 |
| Comparative Example 62 | Polyvinyl chloride resin | 95.0 |
| Comparative Example 63 | Polyvinyl chloride resin | 95.0 |

Production of resin composition
Additives

| | Kinds | Amount (part by weight) | Kneading temperature (°C) |
|---|---|---|---|
| Example 107 | Calcium stearate | 1.0 | 160 |
| Example 108 | Calcium stearate | 1.0 | 160 |
| Example 109 | Calcium stearate | 1.0 | 160 |
| Example 110 | Calcium stearate | 1.0 | 160 |
| Example 111 | Calcium stearate | 1.0 | 160 |
| Example 112 | Calcium stearate | 1.0 | 160 |
| Example 113 | Calcium stearate | 1.0 | 160 |
| Example 114 | Calcium stearate | 1.0 | 160 |
| Example 115 | Calcium stearate | 1.0 | 160 |
| Example 116 | Calcium stearate | 1.0 | 160 |
| Example 117 | Calcium stearate | 1.0 | 160 |
| Example 118 | Calcium stearate | 1.0 | 160 |
| Example 119 | Calcium stearate | 1.0 | 160 |
| Example 120 | Calcium stearate | 1.0 | 160 |
| Comparative Example 61 | Calcium stearate | 1.0 | 160 |
| Comparative Example 62 | Calcium stearate | 1.0 | 160 |
| Comparative Example 63 | Calcium stearate | 1.0 | 160 |

Properties of resin composition

| | Dispersing condition (—) | Blackness (L*) value (—) | Percentage of area of deteriorated and discolored portions when heated at 190°C (S/S0) × 100 (%) | | |
|---|---|---|---|---|---|
| | | | 30 minutes | 60 minutes | 90 minutes |
| Example 107 | 5 | 17.6 | 0 | 5 | 5 |
| Example 108 | 5 | 18.8 | 0 | 5 | 10 |
| Example 109 | 5 | 18.8 | 0 | 0 | 5 |
| Example 110 | 5 | 18.7 | 0 | 0 | 5 |
| Example 111 | 5 | 19.6 | 0 | 5 | 5 |
| Example 112 | 5 | 19.0 | 0 | 5 | 5 |
| Example 113 | 4 | 19.3 | 0 | 5 | 10 |
| Example 114 | 5 | 18.3 | 0 | 0 | 5 |
| Example 115 | 5 | 18.6 | 0 | 0 | 0 |
| Example 116 | 5 | 17.8 | 0 | 0 | 0 |
| Example 117 | 5 | 18.1 | 0 | 0 | 0 |
| Example 118 | 5 | 18.8 | 0 | 0 | 5 |
| Example 119 | 5 | 18.5 | 0 | 5 | 5 |
| Example 120 | 4 | 18.3 | 0 | 5 | 10 |
| Comparative Example 61 | 3 | 24.5 | 10 | 20 | 25 |
| Comparative Example 62 | 3 | 22.6 | 10 | 25 | 30 |
| Comparative Example 63 | 3 | 21.8 | 15 | 25 | 35 |

TABLE 18

Examples and Comparative Examples

Production of black iron-based composite particles or black iron-based particles
Addition of modified polysiloxane
Additives

| | Kinds of core particles | Kinds | Amount added (part by weight) |
|---|---|---|---|
| Example 125 | Core particles 1 | BYK-080 | 1.0 |
| Example 126 | Core particles 2 | BYK-080 | 0.5 |
| Example 127 | Core particles 3 | BYK-310 | 2.0 |
| Example 128 | Core particles 4 | BYK-322 | 5.0 |
| Example 129 | Core particles 5 | TSF4446 | 1.0 |
| Example 130 | Core particles 6 | TSF4460 | 3.0 |
| Example 131 | Core particles 7 | YF3965 | 1.0 |
| Example 132 | Core particles 8 | BYK-080 | 2.0 |
| Example 133 | Core particles 9 | BYK-080 | 3.0 |
| Example 134 | Core particles 10 | BYK-310 | 1.5 |
| Example 135 | Core particles 11 | BYK-322 | 7.0 |
| Example 136 | Core particles 12 | TSF4446 | 0.5 |
| Example 137 | Core particles 13 | TSF4460 | 1.0 |
| Example 138 | Core particles 14 | YF3965 | 2.5 |
| Comparative Example 64 | Core particles 1 | BYK-080 | 1.0 |
| Comparative Example 65 | Core particles 3 | BYK-080 | 0.5 |

TABLE 18-continued

| Examples and Comparative Examples | | | |
|---|---|---|---|
| Comparative Example 66 | Core particles 3 | BYK-080 | 0.005 |

Production of black iron-based composite particles or black iron-based particles
Addition of modified polysiloxane

| | Edge runner treatment | | Coating amount (calculated as |
|---|---|---|---|
| | Linear load (Kg/cm) | Time (min) | Si) (wt. %) |
| Example 125 | 60 | 30 | 0.18 |
| Example 126 | 60 | 20 | 0.08 |
| Example 127 | 60 | 20 | 0.35 |
| Example 128 | 60 | 30 | 0.88 |
| Example 129 | 60 | 30 | 0.17 |
| Example 130 | 30 | 60 | 0.51 |
| Example 131 | 60 | 15 | 0.15 |
| Example 132 | 75 | 15 | 0.36 |
| Example 133 | 60 | 20 | 0.50 |
| Example 134 | 60 | 30 | 0.25 |
| Example 135 | 45 | 45 | 1.21 |
| Example 136 | 30 | 60 | 0.12 |
| Example 137 | 30 | 30 | 0.18 |
| Example 138 | 60 | 30 | 0.36 |
| Comparative Example 64 | 60 | 30 | 0.16 |
| Comparative Example 65 | 60 | 30 | 0.08 |
| Comparative Example 66 | 60 | 30 | $9.0 \times 10^{-4}$ |

Production of black iron-based composite particles or black iron-based particles
Addition of carbon black fine particles
Carbon black fine particles

| | Kinds | Amount added (part by weight) |
|---|---|---|
| Example 125 | A | 8.0 |
| Example 126 | A | 6.0 |
| Example 127 | A | 6.5 |
| Example 128 | B | 11.5 |
| Example 129 | B | 15.0 |
| Example 130 | C | 15.0 |
| Example 131 | C | 10.0 |
| Example 132 | A | 7.5 |
| Example 133 | A | 12.5 |
| Example 134 | A | 18.0 |
| Example 135 | B | 15.0 |
| Example 136 | B | 9.0 |
| Example 137 | C | 17.0 |
| Example 138 | C | 18.0 |
| Comparative Example 64 | — | — |
| Comparative Example 65 | A | 0.01 |
| Comparative Example 66 | B | 5.0 |

Production of black iron-based composite particles or carbon black iron-based particles
Addition of carbon black fine particles

| | Edge runner treatment | | Amount adhered (calculated |
|---|---|---|---|
| | Linear load (Kg/cm) | Time (min) | as C) (wt. %) |
| Example 125 | 30 | 30 | 7.41 |
| Example 126 | 30 | 30 | 5.67 |
| Example 127 | 60 | 60 | 6.09 |
| Example 128 | 60 | 60 | 10.26 |
| Example 129 | 30 | 45 | 12.91 |
| Example 130 | 30 | 45 | 12.68 |
| Example 131 | 60 | 30 | 9.06 |
| Example 132 | 60 | 30 | 6.96 |
| Example 133 | 45 | 45 | 11.07 |
| Example 134 | 60 | 60 | 15.18 |
| Example 135 | 30 | 50 | 13.11 |
| Example 136 | 60 | 45 | 8.26 |
| Example 137 | 45 | 60 | 14.55 |
| Example 138 | 60 | 30 | 15.68 |
| Comparative Example 64 | — | — | — |
| Comparative Example 65 | 60 | 30 | 0.01 |
| Comparative Example 66 | 60 | 30 | 4.76 |

TABLE 19

Examples and Comparative Examples

Properties of black iron-based composite particles or black iron-based particles

| | Average major axis diameter (average particle size) (μm) | Average minor axis diameter (μm) | Aspect ratio (—) | Geometrical standard deviation (—) |
|---|---|---|---|---|
| Example 125 | 0.32 | — | — | 1.46 |
| Example 126 | 0.18 | — | — | 1.40 |
| Example 127 | 0.28 | — | — | 1.52 |
| Example 128 | 0.23 | — | — | 1.34 |
| Example 129 | 0.41 | 0.053 | 7.8 | 1.51 |
| Example 130 | 0.28 | 0.038 | 7.3 | 1.39 |
| Example 131 | 0.21 | 0.031 | 6.7 | 1.41 |
| Example 132 | 0.32 | — | — | 1.44 |
| Example 133 | 0.18 | — | — | 1.38 |
| Example 134 | 0.29 | — | — | 1.47 |
| Example 135 | 0.23 | — | — | 1.34 |
| Example 136 | 0.40 | 0.051 | 7.8 | 1.50 |
| Example 137 | 0.28 | 0.038 | 7.3 | 1.38 |
| Example 138 | 0.19 | 0.028 | 6.7 | 1.42 |
| Comparative Example 64 | 0.32 | — | — | 1.47 |
| Comparative Example 65 | 0.28 | — | — | 1.52 |
| Comparative Example 66 | 0.28 | — | — | 1.52 |

TABLE 19-continued

Examples and Comparative Examples

| | Properties of black iron-based composite particles or black iron-based particles | | | | |
|---|---|---|---|---|---|
| | BET specific surface area (m2/g) | Mn content (wt. %) | Blackness (L* value) (-) | Carbon black desorption percentage (%) | Thickness of carbon black coat (μm) |
| Example 125 | 5.1 | 12.0 | 16.3 | 6.1 | 0.0025 |
| Example 126 | 7.6 | 14.6 | 17.8 | 8.3 | 0.0023 |
| Example 127 | 5.0 | — | 17.0 | 9.6 | 0.0024 |
| Example 128 | 13.6 | — | 16.4 | 9.2 | 0.0026 |
| Example 129 | 23.8 | — | 17.8 | 8.1 | 0.0026 |
| Example 130 | 91.6 | 14.6 | 17.8 | 7.6 | 0.0026 |
| Example 131 | 47.6 | 11.9 | 17.6 | 5.6 | 0.0025 |
| Example 132 | 4.6 | 11.6 | 16.5 | 4.1 | 0.0025 |
| Example 133 | 9.1 | 13.0 | 16.8 | 3.6 | 0.0026 |
| Example 134 | 14.4 | — | 15.9 | 2.8 | 0.0026 |
| Example 135 | 16.1 | — | 16.2 | 1.6 | 0.0026 |
| Example 136 | 24.8 | — | 17.5 | 4.6 | 0.0025 |
| Example 137 | 86.4 | 14.4 | 17.2 | 1.5 | 0.0026 |
| Example 138 | 48.1 | 11.5 | 17.3 | 1.8 | 0.0026 |
| Comparative Example 64 | 4.6 | 13.1 | 23.1 | — | — |
| Comparative Example 65 | 5.6 | — | 21.4 | — | — |
| Comparative Example 66 | 17.6 | — | 20.1 | 38.8 | — |

TABLE 20

Production of solvent-based paint

| | Kind of black iron-based particles | Kind of resin | Properties of paint Viscosity (cP) |
|---|---|---|---|
| Example 139 | Example 125 | Aminoalkyd resin | 666 |
| Example 140 | Example 126 | Aminoalkyd resin | 794 |
| Example 141 | Example 127 | Aminoalkyd resin | 717 |
| Example 142 | Example 128 | Aminoalkyd resin | 614 |
| Example 143 | Example 129 | Aminoalkyd resin | 923 |
| Example 144 | Example 130 | Aminoalkyd resin | 845 |
| Example 145 | Example 131 | Aminoalkyd resin | 666 |
| Example 146 | Example 132 | Aminoalkyd resin | 717 |
| Example 147 | Example 133 | Aminoalkyd resin | 845 |
| Example 148 | Example 134 | Aminoalkyd resin | 768 |
| Example 149 | Example 135 | Aminoalkyd resin | 768 |
| Example 150 | Example 136 | Aminoalkyd resin | 666 |
| Example 151 | Example 137 | Aminoalkyd resin | 717 |
| Example 152 | Example 138 | Aminoalkyd resin | 640 |
| Comparative Example 67 | Comparative Example 64 | Aminoalkyd resin | 640 |
| Comparative Example 68 | Comparative Example 65 | Aminoalkyd resin | 921 |
| Comparative Example 69 | Comparative Example 66 | Aminoalkyd resin | 3,738 |

| | Properties of coating film | | | |
|---|---|---|---|---|
| | Gloss (%) | Blackness (L* value) (-) | Acid resistance ΔG (%) | ΔL* value (-) |
| Example 139 | 105 | 15.8 | 7.8 | 0.7 |
| Example 140 | 109 | 16.9 | 8.3 | 0.8 |
| Example 141 | 98 | 16.7 | 7.6 | 0.7 |
| Example 142 | 104 | 16.3 | 8.2 | 0.8 |
| Example 143 | 90 | 17.8 | 8.9 | 0.8 |
| Example 144 | 118 | 17.6 | 8.1 | 0.8 |
| Example 145 | 122 | 17.6 | 7.4 | 0.7 |
| Example 146 | 108 | 17.0 | 3.2 | 0.3 |
| Example 147 | 115 | 16.6 | 3.8 | 0.2 |
| Example 148 | 108 | 16.1 | 4.6 | 0.2 |
| Example 149 | 106 | 16.5 | 2.3 | 0.3 |
| Example 150 | 93 | 16.9 | 3.1 | 0.3 |
| Example 151 | 127 | 17.3 | 3.9 | 0.4 |
| Example 152 | 126 | 17.5 | 4.0 | 0.3 |
| Comparative Example 67 | 76 | 22.2 | 11.2 | 1.7 |
| Comparative Example 68 | 76 | 21.5 | 11.6 | 1.8 |
| Comparative Example 69 | 43 | 19.9 | 13.6 | 1.4 |

TABLE 21

Production of water-based paint

| | Kinds of black iron-based particles | Kinds of resin | Properties of paint Viscosity (cP) |
|---|---|---|---|
| Example 153 | Example 125 | Water-soluble alkyd resin Water-soluble melamine resin | 974 |
| Example 154 | Example 126 | Water-soluble alkyd resin Water-soluble melamine resin | 923 |
| Example 155 | Example 127 | Water-soluble alkyd resin Water-soluble melamine resin | 717 |
| Example 156 | Example 128 | Water-soluble alkyd resin Water-soluble melamine resin | 896 |
| Example 157 | Example 129 | Water-soluble alkyd resin Water-soluble melamine resin | 896 |
| Example 158 | Example 130 | Water-soluble alkyd resin Water-soluble melamine resin | 819 |
| Example 159 | Example 131 | Water-soluble alkyd resin Water-soluble melamine resin | 845 |
| Example 160 | Example 132 | Water-soluble alkyd resin Water-soluble melamine resin | 870 |
| Example 161 | Example 133 | Water-soluble alkyd resin Water-soluble melamine resin | 640 |
| Example 162 | Example 134 | Water-soluble alkyd resin Water-soluble melamine resin | 717 |
| Example 163 | Example 135 | Water-soluble alkyd resin Water-soluble melamine resin | 768 |
| Example 164 | Example 136 | Water-soluble alkyd resin Water-soluble melamine resin | 793 |
| Example 165 | Example 137 | Water-soluble alkyd resin Water-soluble melamine resin | 973 |
| Example 166 | Example 138 | Water-soluble alkyd resin Water-soluble melamine resin | 870 |
| Comparative Example 70 | Comp. Ex. 64 | Water-soluble alkyd resin Water-soluble melamine resin | 142 |
| Comparative Example 71 | Comp. Ex. 65 | Water-soluble alkyd resin Water-soluble melamine resin | 1,254 |
| Comparative Example 72 | Comp. Ex. 66 | Water-soluble alkyd resin Water-soluble melamine resin | 3,712 |

| | Properties of coating film | | | |
|---|---|---|---|---|
| | Gloss (%) | Blackness (L* value) (-) | Acid resistance ΔG (%) | ΔL* value (-) |
| Example 153 | 93 | 16.9 | 8.6 | 0.8 |
| Example 154 | 97 | 17.6 | 8.6 | 0.8 |
| Example 155 | 93 | 17.3 | 7.6 | 0.8 |
| Example 156 | 96 | 17.8 | 7.8 | 0.8 |
| Example 157 | 88 | 18.3 | 8.0 | 0.7 |
| Example 158 | 112 | 17.9 | 7.6 | 0.7 |
| Example 159 | 110 | 17.8 | 7.9 | 0.7 |
| Example 160 | 101 | 17.7 | 4.3 | 0.4 |
| Example 161 | 96 | 17.0 | 3.8 | 0.3 |

TABLE 21-continued

| | | | | |
|---|---|---|---|---|
| Example 162 | 98 | 17.1 | 3.2 | 0.2 |
| Example 163 | 97 | 16.9 | 3.1 | 0.2 |
| Example 164 | 91 | 18.2 | 4.4 | 0.3 |
| Example 165 | 116 | 17.3 | 3.8 | 0.3 |
| Example 166 | 112 | 17.8 | 4.1 | 0.4 |
| Comparative Example 70 | 64 | 23.6 | 14.6 | 1.9 |
| Comparative Example 71 | 60 | 21.8 | 14.8 | 1.9 |
| Comparative Example 72 | 35 | 21.0 | 15.2 | 1.8 |

TABLE 22

| Examples and Comparative Examples | Production of resin composition Black iron-based particles | |
|---|---|---|
| | Kinds | Amount (part by weight) |
| Example 167 | Example 125 | 5.0 |
| Example 168 | Example 126 | 5.0 |
| Example 169 | Example 127 | 5.0 |
| Example 170 | Example 128 | 5.0 |
| Example 171 | Example 129 | 5.0 |
| Example 172 | Example 130 | 5.0 |
| Example 173 | Example 131 | 5.0 |
| Example 174 | Example 132 | 5.0 |
| Example 175 | Example 133 | 5.0 |
| Example 176 | Example 134 | 5.0 |
| Example 177 | Example 135 | 5.0 |
| Example 178 | Example 136 | 5.0 |
| Example 179 | Example 137 | 5.0 |
| Example 180 | Example 138 | 5.0 |
| Comparative Example 73 | Comparative Example 64 | 5.0 |
| Comparative Example 74 | Comparative Example 65 | 5.0 |
| Comparative Example 75 | Comparative Example 66 | 5.0 |

| Examples and Comparative Examples | Production of resin composition Resin | |
|---|---|---|
| | Kinds | Amount (part by weight) |
| Example 167 | Polyvinyl chloride resin | 95.0 |
| Example 168 | Polyvinyl chloride resin | 95.0 |
| Example 169 | Polyvinyl chloride resin | 95.0 |
| Example 170 | Polyvinyl chloride resin | 95.0 |
| Example 171 | Polyvinyl chloride resin | 95.0 |
| Example 172 | Polyvinyl chloride resin | 95.0 |
| Example 173 | Polyvinyl chloride resin | 95.0 |
| Example 174 | Polyvinyl chloride resin | 95.0 |
| Example 175 | Polyvinyl chloride resin | 95.0 |
| Example 176 | Polyvinyl chloride resin | 95.0 |
| Example 177 | Polyvinyl chloride resin | 95.0 |
| Example 178 | Polyvinyl chloride resin | 95.0 |
| Example 179 | Polyvinyl chloride resin | 95.0 |
| Example 180 | Polyvinyl chloride resin | 95.0 |
| Comparative Example 73 | Polyvinyl chloride resin | 95.0 |
| Comparative Example 74 | Polyvinyl chloride resin | 95.0 |
| Comparative Example 75 | Polyvinyl chloride resin | 95.0 |

| Examples and Comparative Examples | Production of resin composition Additives | | |
|---|---|---|---|
| | Kinds | Amount (part by weight) | Kneading temperature (° C.) |
| Example 167 | Calcium stearate | 1.0 | 160 |
| Example 168 | Calcium stearate | 1.0 | 160 |
| Example 169 | Calcium stearate | 1.0 | 160 |
| Example 170 | Calcium stearate | 1.0 | 160 |
| Example 171 | Calcium stearate | 1.0 | 160 |
| Example 172 | Calcium stearate | 1.0 | 160 |
| Example 173 | Calcium stearate | 1.0 | 160 |
| Example 174 | Calcium stearate | 1.0 | 160 |
| Example 175 | Calcium stearate | 1.0 | 160 |
| Example 176 | Calcium stearate | 1.0 | 160 |
| Example 177 | Calcium stearate | 1.0 | 160 |
| Example 178 | Calcium stearate | 1.0 | 160 |
| Example 179 | Calcium stearate | 1.0 | 160 |
| Example 180 | Calcium stearate | 1.0 | 160 |
| Comparative Example 73 | Calcium stearate | 1.0 | 160 |
| Comparative Example 74 | Calcium stearate | 1.0 | 160 |
| Comparative Example 75 | Calcium stearate | 1.0 | 160 |

| | Properties of resin composition | | | | |
|---|---|---|---|---|---|
| Examples and Comparative Examples | Dispersing condition (−) | Blackness (L* value) (−) | Percentage of area of deteriorated and discolored portions when heated at 190° C. (S/S0 × 100 (%)) | | |
| | | | 30 minutes | 60 minutes | 90 minutes |
| Example 167 | 5 | 17.7 | 0 | 5 | 5 |
| Example 168 | 4 | 18.6 | 0 | 5 | 10 |
| Example 169 | 5 | 18.6 | 0 | 0 | 5 |
| Example 170 | 5 | 18.9 | 0 | 0 | 5 |
| Example 171 | 4 | 19.4 | 0 | 5 | 5 |
| Example 172 | 4 | 18.9 | 0 | 0 | 5 |
| Example 173 | 5 | 18.8 | 0 | 0 | 5 |
| Example 174 | 5 | 18.5 | 0 | 0 | 5 |
| Example 175 | 5 | 18.1 | 0 | 0 | 0 |
| Example 176 | 5 | 17.4 | 0 | 0 | 0 |
| Example 177 | 5 | 17.8 | 0 | 0 | 0 |
| Example 178 | 5 | 18.3 | 0 | 0 | 0 |
| Example 179 | 5 | 18.4 | 0 | 0 | 0 |
| Example 180 | 5 | 18.4 | 0 | 0 | 0 |
| Comparative Example 73 | 3 | 24.5 | 10 | 15 | 25 |
| Comparative Example 74 | 2 | 22.9 | 10 | 20 | 30 |
| Comparative Example 75 | 3 | 21.8 | 15 | 25 | 35 |

TABLE 23

| | Production of black iron-based composite particles or black iron-based particles Addition of terminal-modified polysiloxane Additives | | |
|---|---|---|---|
| Examples and Comparative Examples | Kinds of core particles | Kinds | Amount added (part by weight) |
| Example 185 | Core particles 1 | TSF4770 | 2.0 |
| Example 186 | Core particles 2 | TSF4770 | 1.0 |
| Example 187 | Core particles 3 | TSF4751 | 0.5 |
| Example 188 | Core particles 4 | TSF4751 | 3.0 |
| Example 189 | Core particles 5 | XF-3905 | 5.0 |
| Example 190 | Core particles 6 | XF-3905 | 1.5 |
| Example 191 | Core particles 7 | YF-3804 | 2.0 |
| Example 192 | Core particles 8 | TSF4770 | 1.0 |

TABLE 23-continued

| Examples and Comparative Examples | Core particles | | |
|---|---|---|---|
| Example 193 | Core particles 9 | TSF4770 | 3.0 |
| Example 194 | Core particles 10 | TSF4751 | 0.5 |
| Example 195 | Core particles 11 | TSF4751 | 1.7 |
| Example 196 | Core particles 12 | XF-3905 | 2.0 |
| Example 197 | Core particles 13 | XF-3905 | 1.0 |
| Example 198 | Core particles 14 | YF-3804 | 1.5 |
| Comparative Example 76 | Core particles 1 | TSF4770 | 1.0 |
| Comparative Example 77 | Core particles 3 | TSF4770 | 1.0 |
| Comparative Example 78 | Core particles 3 | TSF4770 | 0.005 |

Production of black iron-based composite particles or black iron-based particles
Addition of terminal-modified polysiloxane

| Examples and Comparative Examples | Edge runner treatment | | Coating amount (calculated as Si) (wt. %) |
|---|---|---|---|
| | Linear load (Kg/cm) | Time (min) | |
| Example 185 | 60 | 30 | 0.45 |
| Example 186 | 30 | 20 | 0.22 |
| Example 187 | 60 | 20 | 0.12 |
| Example 188 | 30 | 30 | 0.71 |
| Example 189 | 45 | 30 | 1.11 |
| Example 190 | 30 | 45 | 0.32 |
| Example 191 | 45 | 60 | 0.44 |
| Example 192 | 30 | 45 | 0.21 |
| Example 193 | 30 | 20 | 0.68 |
| Example 194 | 60 | 30 | 0.14 |
| Example 195 | 30 | 45 | 0.38 |
| Example 196 | 75 | 30 | 0.46 |
| Example 197 | 60 | 45 | 0.21 |
| Example 198 | 45 | 60 | 0.37 |
| Comparative Example 76 | 30 | 30 | 0.26 |
| Comparative Example 77 | 60 | 20 | 0.25 |
| Comparative Example 78 | 45 | 30 | $1.3 \times 10^{-3}$ |

Production of black iron-based composite particles or black iron-based particles
Addition of carbon black fine particles
Carbon black fine particles

| Examples and Comparative Examples | Kinds | Amount added (part by weight) |
|---|---|---|
| Example 185 | A | 10.0 |
| Example 186 | A | 6.0 |
| Example 187 | A | 8.0 |
| Example 188 | B | 10.0 |
| Example 189 | B | 15.0 |
| Example 190 | C | 17.0 |
| Example 191 | C | 10.0 |
| Example 192 | A | 7.5 |
| Example 193 | A | 12.0 |
| Example 194 | A | 19.0 |
| Example 195 | B | 13.0 |
| Example 196 | B | 9.0 |
| Example 197 | C | 16.0 |
| Example 198 | C | 15.0 |
| Comparative Example 76 | — | — |
| Comparative Example 77 | A | 0.01 |
| Comparative Example 78 | B | 5.0 |

Production of black iron-based composite particles or black iron-based particles
Addition of carbon black fine particles

| Examples and Comparative Examples | Edge runner treatment | | Amount adhered (calculated as C) (wt. %) |
|---|---|---|---|
| | Linear load (Kg/cm) | Time (min) | |
| Example 185 | 60 | 30 | 9.12 |
| Example 186 | 30 | 30 | 5.56 |
| Example 187 | 45 | 45 | 7.43 |
| Example 188 | 30 | 30 | 9.09 |
| Example 189 | 60 | 60 | 12.96 |
| Example 190 | 30 | 45 | 14.42 |
| Example 191 | 30 | 60 | 9.10 |
| Example 192 | 45 | 45 | 6.97 |
| Example 193 | 60 | 45 | 10.73 |
| Example 194 | 30 | 60 | 15.12 |
| Example 195 | 45 | 30 | 11.46 |
| Example 196 | 60 | 25 | 8.27 |
| Example 197 | 45 | 20 | 13.60 |
| Example 198 | 60 | 30 | 12.93 |
| Comparative Example 76 | — | — | — |
| Comparative Example 77 | 30 | 60 | 0.01 |
| Comparative Example 78 | 60 | 45 | 4.73 |

TABLE 24

Properties of black iron-based composite particles or black iron-based particles

| Examples and Comparative Examples | Average major axis diameter (average particle size) (μm) | Average minor axis diameter (μm) | Aspect ratio (—) | Geometrical standard deviation (—) |
|---|---|---|---|---|
| Example 185 | 0.32 | — | — | 1.47 |
| Example 186 | 0.18 | — | — | 1.40 |
| Example 187 | 0.28 | — | — | 1.52 |
| Example 188 | 0.23 | — | — | 1.35 |
| Example 189 | 0.41 | 0.053 | 7.8 | 1.51 |
| Example 190 | 0.28 | 0.038 | 7.3 | 1.39 |
| Example 191 | 0.20 | 0.030 | 6.7 | 1.40 |
| Example 192 | 0.32 | — | — | 1.44 |
| Example 193 | 0.18 | — | — | 1.39 |
| Example 194 | 0.29 | — | — | 1.49 |
| Example 195 | 0.24 | — | — | 1.34 |
| Example 196 | 0.40 | 0.051 | 7.8 | 1.49 |
| Example 197 | 0.28 | 0.038 | 7.3 | 1.38 |
| Example 198 | 0.19 | 0.028 | 6.7 | 1.41 |
| Comparative Example 76 | 0.33 | — | — | 1.48 |
| Comparative Example 77 | 0.28 | — | — | 1.52 |
| Comparative Example 78 | 0.28 | — | — | 1.52 |

Properties of black iron-based composite particles or black iron-based particles

| Examples and Comparative Examples | BET specific surface area (m2/g) | Mn content (wt. %) | Blackness (L* value) (—) | Carbon black desorption percentage (%) | Thickness of carbon black coat (μm) |
|---|---|---|---|---|---|
| Example 185 | 5.8 | 12.0 | 16.4 | 8.6 | 0.0025 |
| Example 186 | 7.8 | 14.8 | 18.0 | 7.9 | 0.0024 |
| Example 187 | 5.8 | — | 17.1 | 6.8 | 0.0024 |

TABLE 24-continued

| Example | | | | | |
|---|---|---|---|---|---|
| Example 188 | 14.1 | — | 16.6 | 8.1 | 0.0026 |
| Example 189 | 23.4 | — | 17.8 | 9.2 | 0.0026 |
| Example 190 | 93.8 | 15.1 | 17.9 | 8.6 | 0.0026 |
| Example 191 | 48.6 | 12.1 | 17.8 | 7.6 | 0.0025 |
| Example 192 | 5.1 | 11.8 | 16.6 | 3.6 | 0.0025 |
| Example 193 | 8.9 | 13.6 | 17.1 | 2.8 | 0.0026 |
| Example 194 | 13.8 | — | 16.4 | 3.2 | 0.0026 |
| Example 195 | 17.2 | — | 16.3 | 1.8 | 0.0026 |
| Example 196 | 26.8 | — | 17.8 | 0.9 | 0.0025 |
| Example 197 | 90.6 | 15.4 | 17.4 | 3.6 | 0.0026 |
| Example 198 | 47.8 | 11.8 | 17.5 | 4.1 | 0.0026 |
| Comparative Example 76 | 4.7 | 13.6 | 23.2 | — | — |
| Comparative Example 77 | 6.6 | — | 21.5 | — | — |
| Comparative Example 78 | 18.1 | — | 20.2 | 39.6 | — |

TABLE 25

Production of solvent-based paint

| Examples and Comparative Examples | Kinds of black iron-based particles | Kinds of resin | Properties of paint Viscosity (cP) |
|---|---|---|---|
| Example 199 | Example 185 | Aminoalkyd resin | 717 |
| Example 200 | Example 186 | Aminoalkyd resin | 870 |
| Example 201 | Example 187 | Aminoalkyd resin | 666 |
| Example 202 | Example 188 | Aminoalkyd resin | 538 |
| Example 203 | Example 189 | Aminoalkyd resin | 845 |
| Example 204 | Example 190 | Aminoalkyd resin | 923 |
| Example 205 | Example 191 | Aminoalkyd resin | 666 |
| Example 206 | Example 192 | Aminoalkyd resin | 589 |
| Example 207 | Example 193 | Aminoalkyd resin | 742 |
| Example 208 | Example 194 | Aminoalkyd resin | 845 |
| Example 209 | Example 195 | Aminoalkyd resin | 640 |
| Example 210 | Example 196 | Aminoalkyd resin | 717 |
| Example 211 | Example 197 | Aminoalkyd resin | 870 |
| Example 212 | Example 198 | Aminoalkyd resin | 896 |
| Comparative Example 79 | Comparative Example 76 | Aminoalkyd resin | 512 |
| Comparative Example 80 | Comparative Example 77 | Aminoalkyd resin | 840 |
| Comparative Example 81 | Comparative Example 78 | Aminoalkyd resin | 2,944 |

| Examples and Comparative Examples | Properties of coating film | | | |
|---|---|---|---|---|
| | Gloss (%) | Blackness (L* value) (-) | ΔG (%) | ΔL* value (-) |
| | | Acid resistance | | |
| Example 199 | 100 | 15.7 | 7.3 | 0.8 |
| Example 200 | 105 | 16.8 | 8.6 | 0.7 |
| Example 201 | 98 | 16.6 | 7.1 | 0.8 |
| Example 202 | 101 | 16.3 | 6.9 | 0.6 |
| Example 203 | 91 | 17.8 | 8.1 | 0.8 |
| Example 204 | 109 | 17.7 | 7.6 | 0.7 |
| Example 205 | 113 | 17.7 | 7.1 | 0.7 |
| Example 206 | 109 | 16.8 | 4.1 | 0.3 |
| Example 207 | 108 | 16.8 | 3.6 | 0.3 |
| Example 208 | 101 | 15.8 | 3.1 | 0.2 |
| Example 209 | 106 | 16.4 | 2.8 | 0.2 |
| Example 210 | 96 | 17.3 | 3.6 | 0.3 |
| Example 211 | 131 | 17.1 | 1.3 | 0.3 |
| Example 212 | 130 | 17.2 | 4.1 | 0.3 |
| Comparative Example 79 | 78 | 22.1 | 11.1 | 1.5 |
| Comparative Example 80 | 70 | 20.6 | 11.4 | 1.4 |
| Comparative Example 81 | 43 | 19.4 | 12.8 | 1.3 |

TABLE 26

Production of water-based paint

| Examples and Comparative Examples | Kind of black iron-based particles | Kind of resin | Properties of paint Viscosity (cP) |
|---|---|---|---|
| Example 213 | Example 185 | Water-soluble alkyd resin / Water-soluble melamine resin | 870 |
| Example 214 | Example 186 | Water-soluble alkyd resin / Water-soluble melamine resin | 923 |
| Example 215 | Example 187 | Water-soluble alkyd resin / Water-soluble melamine resin | 794 |
| Example 216 | Example 188 | Water-soluble alkyd resin / Water-soluble melamine resin | 870 |
| Example 217 | Example 189 | Water-soluble alkyd resin / Water-soluble melamine resin | 923 |
| Example 218 | Example 190 | Water-soluble alkyd resin / Water-soluble melamine resin | 923 |
| Example 219 | Example 191 | Water-soluble alkyd resin / Water-soluble melamine resin | 794 |
| Example 220 | Example 192 | Water-soluble alkyd resin / Water-soluble melamine resin | 819 |
| Example 221 | Example 193 | Water-soluble alkyd resin / Water-soluble melamine resin | 768 |
| Example 222 | Example 194 | Water-soluble alkyd resin / Water-soluble melamine resin | 717 |
| Example 223 | Example 195 | Water-soluble alkyd resin / Water-soluble melamine resin | 666 |
| Example 224 | Example 196 | Water-soluble alkyd resin / Water-soluble melamine resin | 819 |
| Example 225 | Example 197 | Water-soluble alkyd resin / Water-soluble melamine resin | 973 |
| Example 226 | Example 198 | Water-soluble alkyd resin / Water-soluble melamine resin | 845 |
| Comparative Example 82 | Comp. Ex. 76 | Water-soluble alkyd resin / Water-soluble melamine resin | 717 |
| Comparative Example 83 | Comp. Ex. 77 | Water-soluble alkyd resin / Water-soluble melamine resin | 896 |
| Comparative Example 84 | Comp. Ex. 78 | Water-soluble alkyd resin / Water-soluble melamine resin | 3,584 |

| | Properties of coating film | | | |
|---|---|---|---|---|
| | Gloss (%) | Blackness (L* value) (-) | ΔG (%) | ΔL* value (-) |
| | | | Acid resistance | |
| Example 213 | 93 | 16.8 | 8.4 | 0.6 |
| Example 214 | 96 | 17.7 | 7.8 | 0.7 |
| Example 215 | 93 | 17.2 | 8.0 | 0.7 |
| Example 216 | 98 | 17.6 | 6.8 | 0.8 |
| Example 217 | 90 | 18.3 | 8.4 | 0.6 |
| Example 218 | 106 | 17.6 | 8.1 | 0.7 |
| Example 219 | 110 | 17.6 | 7.4 | 0.7 |
| Example 220 | 100 | 17.8 | 3.8 | 0.3 |
| Example 221 | 103 | 17.8 | 4.6 | 0.3 |
| Example 222 | 101 | 17.8 | 4.1 | 0.4 |
| Example 223 | 98 | 16.9 | 3.8 | 0.3 |
| Example 224 | 96 | 18.5 | 3.2 | 0.2 |
| Example 225 | 116 | 17.4 | 3.9 | 0.2 |
| Example 226 | 113 | 17.8 | 3.6 | 0.3 |
| Comparative Example 82 | 64 | 23.2 | 12.7 | 2.1 |
| Comparative Example 83 | 60 | 21.6 | 13.6 | 2.1 |
| Comparative Example 84 | 44 | 20.9 | 14.6 | 1.9 |

TABLE 27

| Examples and Comparative Examples | Production of resin composition Black iron-based particles | |
|---|---|---|
| | Kinds | Amount (part by weight) |
| Example 227 | Example 185 | 5.0 |
| Example 228 | Example 186 | 5.0 |
| Example 229 | Example 187 | 5.0 |
| Example 230 | Example 188 | 5.0 |
| Example 231 | Example 189 | 5.0 |
| Example 232 | Example 190 | 5.0 |
| Example 233 | Example 191 | 5.0 |
| Example 234 | Example 192 | 5.0 |
| Example 235 | Example 193 | 5.0 |
| Example 236 | Example 194 | 5.0 |
| Example 237 | Example 195 | 5.0 |
| Example 238 | Example 196 | 5.0 |
| Example 239 | Example 197 | 5.0 |
| Example 240 | Example 198 | 5.0 |
| Comparative Example 85 | Comparative Example 76 | 5.0 |
| Comparative Example 86 | Comparative Example 77 | 5.0 |
| Comparative Example 87 | Comparative Example 78 | 5.0 |

| Examples and Comparative Examples | Production of resin composition Resin | |
|---|---|---|
| | Kinds | Amount (part by weight) |
| Example 227 | Polyvinyl chloride resin | 95.0 |
| Example 228 | Polyvinyl chloride resin | 95.0 |
| Example 229 | Polyvinyl chloride resin | 95.0 |
| Example 230 | Polyvinyl chloride resin | 95.0 |
| Example 231 | Polyvinyl chloride resin | 95.0 |
| Example 232 | Polyvinyl chloride resin | 95.0 |
| Example 233 | Polyvinyl chloride resin | 95.0 |
| Example 234 | Polyvinyl chloride resin | 95.0 |
| Example 235 | Polyvinyl chloride resin | 95.0 |
| Example 236 | Polyvinyl chloride resin | 95.0 |
| Example 237 | Polyvinyl chloride resin | 95.0 |
| Example 238 | Polyvinyl chloride resin | 95.0 |
| Example 239 | Polyvinyl chloride resin | 95.0 |
| Example 240 | Polyvinyl chloride resin | 95.0 |
| Comparative Example 85 | Polyvinyl chloride resin | 95.0 |
| Comparative Example 86 | Polyvinyl chloride resin | 95.0 |
| Comparative Example 87 | Polyvinyl chloride resin | 95.0 |

| Examples and Comparative Examples | Production of resin composition Additives | | |
|---|---|---|---|
| | Kinds | Amount (part by weight) | Kneading temperature (° C.) |
| Example 227 | Calcium stearate | 1.0 | 160 |
| Example 228 | Calcium stearate | 1.0 | 160 |
| Example 229 | Calcium stearate | 1.0 | 160 |
| Example 230 | Calcium stearate | 1.0 | 160 |
| Example 231 | Calcium stearate | 1.0 | 160 |
| Example 232 | Calcium stearate | 1.0 | 160 |
| Example 233 | Calcium stearate | 1.0 | 160 |
| Example 234 | Calcium stearate | 1.0 | 160 |
| Example 235 | Calcium stearate | 1.0 | 160 |
| Example 236 | Calcium stearate | 1.0 | 160 |
| Example 237 | Calcium stearate | 1.0 | 160 |
| Example 238 | Calcium stearate | 1.0 | 160 |
| Example 239 | Calcium stearate | 1.0 | 160 |
| Example 240 | Calcium stearate | 1.0 | 160 |
| Comparative Example 85 | Calcium stearate | 1.0 | 160 |
| Comparative Example 86 | Calcium stearate | 1.0 | 160 |
| Comparative Example 87 | Calcium stearate | 1.0 | 160 |

| Examples and Comparative Examples | Properties of resin composition | | | | |
|---|---|---|---|---|---|
| | Dispersing condition (−) | Blackness ($L^*$ value) (−) | Percentage of area of deteriorated and discolored portions when heated at 190° C. (S/S0) × 100 (%) | | |
| | | | 30 minutes | 60 minutes | 90 minutes |
| Example 227 | 4 | 17.6 | 0 | 5 | 5 |
| Example 228 | 4 | 18.8 | 0 | 5 | 10 |
| Example 229 | 5 | 18.6 | 0 | 5 | 5 |
| Example 230 | 5 | 18.7 | 0 | 0 | 5 |
| Example 231 | 4 | 19.7 | 0 | 5 | 10 |
| Example 232 | 4 | 18.8 | 0 | 5 | 10 |
| Example 233 | 4 | 18.7 | 0 | 5 | 5 |
| Example 234 | 5 | 18.5 | 0 | 0 | 0 |
| Example 235 | 5 | 18.6 | 0 | 0 | 0 |
| Example 236 | 5 | 17.2 | 0 | 0 | 5 |
| Example 237 | 5 | 18.3 | 0 | 0 | 5 |
| Example 238 | 5 | 18.2 | 0 | 0 | 0 |
| Example 239 | 5 | 18.3 | 0 | 5 | 5 |
| Example 240 | 5 | 18.1 | 0 | 0 | 0 |
| Comparative Example 85 | 3 | 24.4 | 10 | 15 | 20 |
| Comparative Example 86 | 3 | 22.9 | 10 | 20 | 30 |
| Comparative Example 87 | 3 | 21.8 | 10 | 25 | 35 |

TABLE 28

| Examples and Comparative Examples | Production of black iron-based composite particles or black iron-based particles Addition of fluoroalkylsilane Additives | | |
|---|---|---|---|
| | Kind of core particles | Kinds | Amount added (part by weight) |
| Example 245 | Core particles 1 | TSL8257 | 2.0 |
| Example 246 | Core particles 2 | TSL8233 | 4.0 |
| Example 247 | Core particles 3 | TSL8262 | 3.0 |
| Example 248 | Core particles 4 | TSL8257 | 1.0 |
| Example 249 | Core particles 5 | TSL8233 | 10.0 |
| Example 250 | Core particles 6 | TSL8262 | 2.0 |
| Example 251 | Core particles 7 | TSL8257 | 3.0 |
| Example 252 | Core particles 8 | TSL8257 | 6.0 |
| Example 253 | Core particles 9 | TSL8233 | 4.0 |
| Example 254 | Core particles 10 | TSL8262 | 0.5 |
| Example 255 | Core particles 11 | TSL8257 | 1.5 |
| Example 256 | Core particles 12 | TSL8233 | 2.0 |
| Example 257 | Core particles 13 | TSL8262 | 0.8 |
| Example 258 | Core particles 14 | TSL8257 | 4.0 |
| Comparative Example 88 | Core particles 1 | TSL8257 | 2.0 |
| Comparative Example 89 | Core particles 3 | TSL8257 | 30 |
| Comparative Example 90 | Core particles 3 | TSL8257 | 0.005 |

TABLE 28-continued

Production of black iron-based composite particles or black iron-based particles
Addition of fluoroalkylsilane

| Examples and Comparative Examples | Edge runner treatment Linear load (Kg/cm) | Time (min) | Coating amount (calculated as Si) (wt. %) |
|---|---|---|---|
| Example 245 | 60 | 30 | 0.13 |
| Example 246 | 60 | 30 | 0.21 |
| Example 247 | 60 | 15 | 0.48 |
| Example 248 | 60 | 20 | 0.07 |
| Example 249 | 60 | 60 | 0.54 |
| Example 250 | 30 | 30 | 0.32 |
| Example 251 | 60 | 60 | 0.20 |
| Example 252 | 75 | 30 | 0.40 |
| Example 253 | 60 | 15 | 0.21 |
| Example 254 | 60 | 20 | 0.08 |
| Example 255 | 45 | 60 | 0.10 |
| Example 256 | 30 | 30 | 0.11 |
| Example 257 | 30 | 30 | 0.13 |
| Example 258 | 60 | 30 | 0.26 |
| Comparative Example 88 | 60 | 20 | 0.13 |
| Comparative Example 89 | 60 | 30 | 0.2 |
| Comparative Example 90 | 60 | 30 | 3.3 × 10-4 |

Production of black iron-based composite particles or black iron-based particles
Addition of carbon black fine particles
Carbon black fine particles

| Examples and Comparative Examples | Kinds | Amount added (part by weight) |
|---|---|---|
| Example 245 | A | 8.0 |
| Example 246 | A | 6.0 |
| Example 247 | A | 5.0 |
| Example 248 | B | 13.0 |
| Example 249 | B | 18.0 |
| Example 250 | C | 15.0 |
| Example 251 | C | 15.0 |
| Example 252 | A | 10.0 |
| Example 253 | A | 10.0 |
| Example 254 | A | 18.0 |
| Example 255 | B | 16.0 |
| Example 256 | B | 9.0 |
| Example 257 | C | 16.0 |
| Example 258 | C | 15.0 |
| Comparative Example 88 | — | — |
| Comparative Example 89 | A | 0.01 |
| Comparative Example 90 | B | 5.0 |

Production of black iron-based composite particles or black iron-based particles
Addition of carbon black

| Examples and Comparative Examples | Edge runner treatment Linear load (Kg/cm) | Time (min) | Amount adhered (calculated as C) (wt. %) |
|---|---|---|---|
| Example 245 | 30 | 60 | 7.42 |
| Example 246 | 60 | 30 | 5.68 |
| Example 247 | 45 | 30 | 4.78 |
| Example 248 | 60 | 60 | 11.53 |
| Example 249 | 45 | 75 | 15.16 |
| Example 250 | 30 | 40 | 13.03 |
| Example 251 | 45 | 45 | 13.04 |
| Example 252 | 60 | 45 | 9.01 |
| Example 253 | 60 | 60 | 9.09 |
| Example 254 | 30 | 30 | 15.18 |
| Example 255 | 30 | 20 | 13.81 |
| Example 256 | 60 | 60 | 8.26 |
| Example 257 | 30 | 20 | 13.76 |
| Example 258 | 60 | 30 | 12.99 |
| Comparative Example 88 | — | — | — |
| Comparative Example 89 | 60 | 30 | 0.01 |
| Comparative Example 90 | 60 | 30 | 4.76 |

TABLE 29

| Examples and Comparative Examples | Properties of black iron-based composite particles or black iron-based particles | | | |
|---|---|---|---|---|
| | Average major axis diameter (average particle size) ($\mu$m) | Average minor axis diameter ($\mu$m) | Aspect ratio (-) | Geometrical standard deviation (-) |
| Example 245 | 0.32 | — | — | 1.47 |
| Example 246 | 0.18 | — | — | 1.41 |
| Example 247 | 0.28 | — | — | 1.53 |
| Example 248 | 0.23 | — | — | 1.35 |
| Example 249 | 0.40 | 0.051 | 7.8 | 1.53 |
| Example 250 | 0.28 | 0.038 | 7.3 | 1.38 |
| Example 251 | 0.20 | 0.030 | 6.7 | 1.41 |
| Example 252 | 0.32 | — | — | 1.48 |
| Example 253 | 0.19 | — | — | 1.41 |
| Example 254 | 0.29 | — | — | 1.52 |
| Example 255 | 0.24 | — | — | 1.35 |
| Example 256 | 0.41 | 0.053 | 7.8 | 1.53 |
| Example 257 | 0.29 | 0.040 | 7.3 | 1.38 |
| Example 258 | 0.20 | 0.030 | 6.7 | 1.41 |
| Comparative Example 88 | 0.33 | — | — | 1.47 |
| Comparative Example 89 | 0.32 | — | — | 1.48 |
| Comparative Example 90 | 0.28 | — | — | 1.51 |

| | BET specific surface area (m2/g) | Mn content (wt. %) | Blackness (L* value) (-) | Carbon black desorption percentage (%) | Thickness of carbon black coat ($\mu$m) |
|---|---|---|---|---|---|
| Example 245 | 5.0 | 12.1 | 16.4 | 7.1 | 0.0025 |
| Example 246 | 7.4 | 14.7 | 18.0 | 8.6 | 0.0024 |
| Example 247 | 5.3 | — | 17.2 | 6.9 | 0.0023 |
| Example 248 | 13.0 | — | 16.6 | 5.8 | 0.0025 |
| Example 249 | 21.6 | — | 17.7 | 5.9 | 0.0026 |
| Example 250 | 89.7 | 14.5 | 17.9 | 6.9 | 0.0026 |
| Example 251 | 46.6 | 11.8 | 17.5 | 7.5 | 0.0026 |
| Example 252 | 4.8 | 11.5 | 16.6 | 3.6 | 0.0026 |
| Example 253 | 8.9 | 12.9 | 16.9 | 2.8 | 0.0025 |
| Example 254 | 13.8 | — | 15.8 | 0.6 | 0.0026 |
| Example 255 | 15.8 | — | 16.3 | 1.8 | 0.0026 |
| Example 256 | 23.6 | — | 17.3 | 3.2 | 0.0025 |
| Example 257 | 83.1 | 14.4 | 17.2 | 4.6 | 0.0026 |
| Example 258 | 47.1 | 11.5 | 17.2 | 4.8 | 0.0026 |
| Comparative Example 88 | 16.6 | 12.0 | 21.3 | — | |
| Comparative Example 89 | 4.7 | 13.1 | 23.0 | — | |
| Comparative Example 90 | 5.6 | — | 21.4 | 64.2 | |

TABLE 30

Production of solvent-based paint

| Examples and Comparative Examples | Kinds of black iron-based particles | Kinds of resin | Properties of paint Viscosity (cP) |
|---|---|---|---|
| Example 259 | Example 245 | Aminoalkyd resin | 666 |
| Example 260 | Example 246 | Aminoalkyd resin | 793 |
| Example 261 | Example 247 | Aminoalkyd resin | 614 |
| Example 262 | Example 248 | Aminoalkyd resin | 666 |
| Example 263 | Example 249 | Aminoalkyd resin | 768 |
| Example 264 | Example 250 | Aminoalkyd resin | 845 |
| Example 265 | Example 251 | Aminoalkyd resin | 896 |
| Example 266 | Example 252 | Aminoalkyd resin | 614 |
| Example 267 | Example 253 | Aminoalkyd resin | 712 |
| Example 268 | Example 254 | Aminoalkyd resin | 712 |
| Example 269 | Example 255 | Aminoalkyd resin | 538 |
| Example 270 | Example 256 | Aminoalkyd resin | 640 |
| Example 271 | Example 257 | Aminoalkyd resin | 845 |
| Example 272 | Example 258 | Aminoalkyd resin | 712 |
| Comparative Example 91 | Comparative Example 88 | Aminoalkyd resin | 538 |
| Comparative Example 92 | Comparative Example 89 | Aminoalkyd resin | 845 |
| Comparative Example 93 | Comparative Example 90 | Aminoalkyd resin | 4,096 |

| Examples and Comparative Examples | Properties of coating film | | | |
|---|---|---|---|---|
| | Blackness | | Acid resistance | |
| | Gloss (%) | (L* value) (−) | ΔG (%) | ΔL* value (−) |
| Example 259 | 105 | 15.9 | 7.8 | 0.7 |
| Example 260 | 109 | 16.8 | 9.2 | 0.8 |
| Example 261 | 98 | 16.5 | 8.6 | 0.9 |
| Example 262 | 106 | 16.3 | 7.4 | 0.6 |
| Example 263 | 93 | 17.3 | 7.3 | 0.6 |
| Example 264 | 118 | 17.4 | 6.9 | 0.7 |
| Example 265 | 122 | 17.1 | 8.1 | 0.8 |
| Example 266 | 110 | 16.5 | 4.1 | 0.3 |
| Example 267 | 111 | 16.6 | 4.6 | 0.3 |
| Example 268 | 106 | 15.8 | 2.3 | 0.4 |
| Example 269 | 103 | 15.9 | 1.8 | 0.3 |
| Example 270 | 94 | 16.9 | 3.4 | 0.2 |
| Example 271 | 128 | 17.2 | 3.2 | 0.4 |
| Example 272 | 123 | 17.4 | 3.7 | 0.3 |
| Comparative Example 91 | 81 | 22.1 | 11.3 | 1.7 |
| Comparative Example 92 | 73 | 20.7 | 11.6 | 1.8 |
| Comparative Example 93 | 48 | 19.8 | 12.5 | 1.6 |

TABLE 31

Production of water-based paint

| Examples and Comparative Examples | Kinds of black iron-based particles | Kinds of resin | Properties of paint Viscosity (cP) |
|---|---|---|---|
| Example 273 | Example 245 | Water-soluble alkyd resin Water-soluble melamine resin | 845 |
| Example 274 | Example 246 | Water-soluble alkyd resin Water-soluble melamine resin | 896 |
| Example 275 | Example 247 | Water-soluble alkyd resin Water-soluble melamine resin | 717 |
| Example 276 | Example 248 | Water-soluble alkyd resin Water-soluble melamine resin | 896 |
| Example 277 | Example 249 | Water-soluble alkyd resin Water-soluble melamine resin | 922 |
| Example 278 | Example 250 | Water-soluble alkyd resin Water-soluble melamine resin | 870 |
| Example 279 | Example 251 | Water-soluble alkyd resin Water-soluble melamine resin | 794 |
| Example 280 | Example 252 | Water-soluble alkyd resin Water-soluble melamine resin | 973 |
| Example 281 | Example 253 | Water-soluble alkyd resin Water-soluble melamine resin | 640 |
| Example 282 | Example 254 | Water-soluble alkyd resin Water-soluble melamine resin | 870 |
| Example 283 | Example 255 | Water-soluble alkyd resin Water-soluble melamine resin | 768 |
| Example 284 | Example 256 | Water-soluble alkyd resin Water-soluble melamine resin | 845 |
| Example 285 | Example 257 | Water-soluble alkyd resin Water-soluble melamine resin | 896 |
| Example 286 | Example 258 | Water-soluble alkyd resin Water-soluble melamine resin | 666 |
| Comparative Example 94 | Comp. Ex. 88 | Water-soluble alkyd resin Water-soluble melamine resin | 717 |
| Comparative Example 95 | Comp. Ex. 89 | Water-soluble alkyd resin Water-soluble melamine resin | 922 |
| Comparative Example 96 | Comp. Ex. 90 | Water-soluble alkyd resin Water-soluble melamine resin | 2,560 |

| Examples and Comparative Examples | Properties of coating film | | | |
|---|---|---|---|---|
| | Blackness | | Acid resistance | |
| | Gloss (%) | (L* value) (−) | ΔG (%) | ΔL* value (−) |
| Example 273 | 92 | 16.6 | 8.6 | 0.7 |
| Example 274 | 96 | 17.1 | 8.7 | 0.8 |
| Example 275 | 93 | 17.4 | 8.2 | 0.7 |
| Example 276 | 98 | 17.6 | 7.2 | 0.8 |
| Example 277 | 90 | 18.3 | 8.3 | 0.7 |
| Example 278 | 106 | 17.5 | 8.1 | 0.8 |
| Example 279 | 111 | 17.3 | 7.8 | 0.9 |
| Example 280 | 96 | 17.5 | 4.3 | 0.3 |
| Example 281 | 99 | 17.3 | 4.0 | 0.3 |
| Example 282 | 98 | 16.8 | 3.9 | 0.2 |
| Example 283 | 97 | 17.3 | 2.1 | 0.2 |
| Example 284 | 91 | 18.1 | 3.6 | 0.3 |
| Example 285 | 113 | 17.5 | 2.8 | 0.4 |
| Example 286 | 113 | 17.7 | 2.6 | 0.3 |
| Comparative Example 94 | 66 | 23.6 | 14.1 | 2.5 |
| Comparative Example 95 | 63 | 22.0 | 14.8 | 2.0 |
| Comparative Example 96 | 46 | 21.0 | 14.6 | 1.9 |

TABLE 32

| Examples and Comparative Examples | Production of resin composition Black iron-based particles | |
|---|---|---|
| | Kinds | Amount (part by weight) |
| Example 287 | Example 245 | 5.0 |
| Example 288 | Example 246 | 5.0 |
| Example 289 | Example 247 | 5.0 |
| Example 290 | Example 248 | 5.0 |
| Example 291 | Example 249 | 5.0 |
| Example 292 | Example 250 | 5.0 |
| Example 293 | Example 251 | 5.0 |
| Example 294 | Example 252 | 5.0 |
| Example 295 | Example 253 | 5.0 |
| Example 296 | Example 254 | 5.0 |
| Example 297 | Example 255 | 5.0 |
| Example 298 | Example 256 | 5.0 |
| Example 299 | Example 257 | 5.0 |
| Example 300 | Example 258 | 5.0 |

TABLE 32-continued

| | | | | | |
|---|---|---|---|---|---|
| Comparative Example 97 | Comparative Example 88 | 5.0 | | | |
| Comparative Example 98 | Comparative Example 89 | 5.0 | | | |
| Comparative Example 99 | Comparative Example 90 | 5.0 | | | |

Production of resin composition

| Examples and Comparative Examples | Resin Kinds | Amount (part by weight) |
|---|---|---|
| Example 287 | Polyvinyl chloride resin | 95.0 |
| Example 288 | Polyvinyl chloride resin | 95.0 |
| Example 289 | Polyvinyl chloride resin | 95.0 |
| Example 290 | Polyvinyl chloride resin | 95.0 |
| Example 291 | Polyvinyl chloride resin | 95.0 |
| Example 292 | Polyvinyl chloride resin | 95.0 |
| Example 293 | Polyvinyl chloride resin | 95.0 |
| Example 294 | Polyvinyl chloride resin | 95.0 |
| Example 295 | Polyvinyl chloride resin | 95.0 |
| Example 296 | Polyvinyl chloride resin | 95.0 |
| Example 297 | Polyvinyl chloride resin | 95.0 |
| Example 298 | Polyvinyl chloride resin | 95.0 |
| Example 299 | Polyvinyl chloride resin | 95.0 |
| Example 300 | Polyvinyl chloride resin | 95.0 |
| Comparative Example 97 | Polyvinyl chloride resin | 95.0 |
| Comparative Example 98 | Polyvinyl chloride resin | 95.0 |
| Comparative Example 99 | Polyvinyl chloride resin | 95.0 |

Production of resin composition

| Examples and Comparative Examples | Additives Kinds | Amount (part by weight) | Kneading temperature (° C.) |
|---|---|---|---|
| Example 287 | Calcium stearate | 1.0 | 160 |
| Example 288 | Calcium stearate | 1.0 | 160 |
| Example 289 | Calcium stearate | 1.0 | 160 |
| Example 290 | Calcium stearate | 1.0 | 160 |
| Example 291 | Calcium stearate | 1.0 | 160 |
| Example 292 | Calcium stearate | 1.0 | 160 |
| Example 293 | Calcium stearate | 1.0 | 160 |
| Example 294 | Calcium stearate | 1.0 | 160 |
| Example 295 | Calcium stearate | 1.0 | 160 |
| Example 296 | Calcium stearate | 1.0 | 160 |
| Example 297 | Calcium stearate | 1.0 | 160 |
| Example 298 | Calcium stearate | 1.0 | 160 |
| Example 299 | Calcium stearate | 1.0 | 160 |
| Example 300 | Calcium stearate | 1.0 | 160 |
| Comparative Example 97 | Calcium stearate | 1.0 | 160 |
| Comparative Example 98 | Calcium stearate | 1.0 | 160 |
| Comparative Example 99 | Calcium stearate | 1.0 | 160 |

Properties of resin composition

| Examples and Comparative Examples | Dispersing condition (−) | Blackness value (−) $L^* (S/S0) \times 100$ (%) | Percentage of area of deteriorated and discolored portions when heated at 190° C. | | |
|---|---|---|---|---|---|
| | | | 30 minutes | 60 minutes | 90 minutes |
| Example 287 | 5 | 17.6 | 0 | 5 | 5 |
| Example 288 | 5 | 18.6 | 0 | 5 | 10 |
| Example 289 | 5 | 18.1 | 0 | 5 | 5 |
| Example 290 | 4 | 18.8 | 0 | 0 | 5 |
| Example 291 | 4 | 19.1 | 0 | 5 | 10 |
| Example 292 | 4 | 18.6 | 0 | 5 | 10 |
| Example 293 | 5 | 18.7 | 0 | 5 | 5 |
| Example 294 | 5 | 18.3 | 0 | 0 | 5 |
| Example 295 | 5 | 18.5 | 0 | 0 | 0 |
| Example 296 | 5 | 17.5 | 0 | 0 | 5 |
| Example 297 | 5 | 17.9 | 0 | 0 | 0 |
| Example 298 | 5 | 18.4 | 0 | 0 | 0 |
| Example 299 | 5 | 18.1 | 0 | 0 | 5 |
| Example 300 | 5 | 18.2 | 0 | 0 | 0 |
| Comparative Example 97 | 3 | 24.5 | 10 | 15 | 25 |
| Comparative Example 98 | 3 | 22.9 | 15 | 20 | 30 |
| Comparative Example 99 | 3 | 22.1 | 15 | 20 | 35 |

What is claimed is:

1. Black iron-based composite particles comprising:

black iron oxide particles or black iron oxide hydroxide particles having an average particle size of 0.08 to 1.0 μm;

a coating layer formed on the surface of said black iron oxide particle or black iron oxide hydroxide particles, comprising at least one organosilicon compound selected from the group consisting of:

(1) organosilane compounds obtained from an alkoxysilane compounds, (2) polysiloxanes or modified polysiloxanes, and (3) fluoroalkyl organosilane compounds obtained from a fluoroalkylsilane compounds; and a carbon black coat formed on said coating layer comprising said organosilicon compound, in an amount of 1 to 30 parts by weight based on 100 parts by weight of said black iron oxide particles or black iron oxide hydroxide particles.

2. Black iron-based composite particles according to claim 1, wherein said black iron oxide particle or black iron oxide hydroxide particle is particle having a coat which is formed on at least a part of the surface of said black iron oxide particle or black iron oxide hydroxide particle and which comprises at least one compound selected from the group consisting of hydroxides of aluminum, oxides of aluminum, hydroxides of silicon and oxides of silicon.

3. Black iron-based composite particles according to claim 2, wherein the amount of said at least one compound selected from the group consisting of hydroxides of aluminum, oxides of aluminum, hydroxides of silicon and oxides of silicon, is 0.01 to 50% by weight, calculated as Al or $SiO_2$, based on the weight of said black iron oxide particles or black iron oxide hydroxide particles.

4. Black iron-based composite particles according to claim 1, wherein said modified polysiloxanes are ones selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

5. Black iron-based composite particles according to claim 4, wherein said polysiloxanes modified with at least one compound selected from the group consisting of polyethers, polyesters and epoxy compounds are represented by the general formula (III), (IV) or (V):

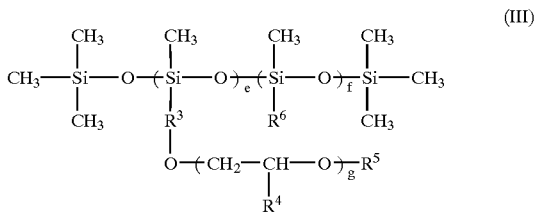

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer of 1 to 15; i, j and k are an integer of 0 to 15; e is an integer of 1 to 50; and f is an integer of 1 to 300;

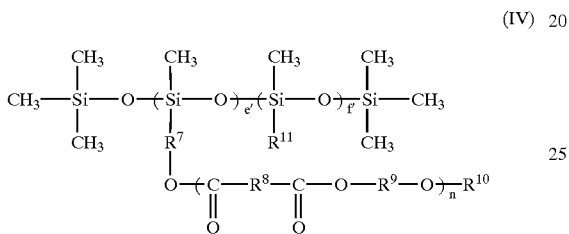

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer of 1 to 15; r and s are an integer of 0 to 15; e' is an integer of 1 to 50; and f' is an integer of 1 to 300; or

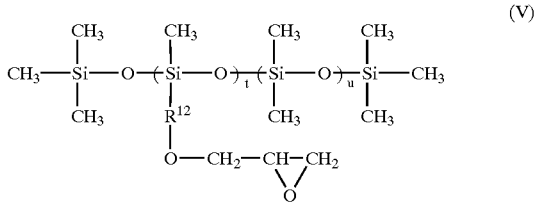

wherein $R^{12}$ is $-(-CH_2-)_v-$; v is an integer of 1 to 15; t is an integer of 1 to 50; and u is an integer of 1 to 300.

6. Black iron-based composite particles according to claim 4, wherein said polysiloxanes whose molecular terminal is modified with at least one group selected from the group consisting of carboxylic acid groups, alcohol groups and a hydroxyl group are represented by the general formula (VI):

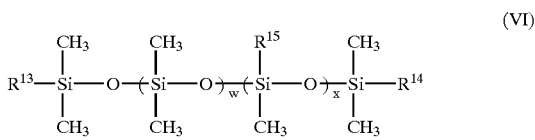

wherein $R^{13}$ and $R^{14}$ are $-OH$, $R^{16}OH$ or $R^{17}COOH$ and may be the same or different; $R^{15}$ is $-CH_3$ or $-C_6H_5$; $R^{16}$ and $R^{17}$ are $-(-CH_2-)_y-$ (wherein y is an integer of 1 to 15); w is an integer of 1 to 200; and x is an integer of 0 to 100.

7. Black iron-based composite particles according to claim 1, wherein said alkoxysilane compound is represented by the general formula (I):

wherein $R^1$ is $C_6H_5-$, $(CH_3)_2CHCH_2-$ or $n-C_bH_{2b+1}-$ (wherein b is an integer of 1 to 18); X is $CH_3O-$ or $C_2H_5O-$; and a is an integer of 0 to 3.

8. Black iron-based composite particles according to claim 7, wherein said alkoxysilane compound is methyl triethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, isobutyl trimethoxysilane or decyl trimethoxysilane.

9. Black iron-based composite particles according to claim 1, wherein said polysiloxanes are represented by the general formula (II):

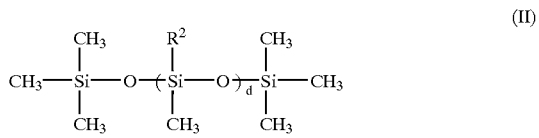

wherein R2 is $H-$ or $CH3-$, and d is an integer of 15 to 450.

10. Black iron-based composite particles according to claim 9, wherein said polysiloxanes are ones having methyl hydrogen siloxane units.

11. Black iron-based composite particles according to claim 1, wherein said fluoroalkylsilane compounds are represented by the general formula (VII):

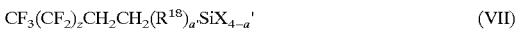

wherein $R^{18}$ is $CH_3-$, $C_2H_5-$, $CH_3O-$ or $C_2H_5O-$; X is $CH_3O-$ or $C_2H_5-$; and z is an integer of 0 to 15; and a' is an integer of 0 to 3.

12. Black iron-based composite particles according to claim 1, which further comprise a blackness (L* value) of 15 to 18.

13. Black iron-based composite particles according to claim 1, which further comprise a particle size of 0.082 to 1.05 µm.

14. Black iron-based composite particles according to claim 1, which further comprise a BET specific surface area value of 1 to 200 m²/g.

15. Black iron-based composite particles according to claim 1, which further comprise a geometrical standard deviation of particle sizes of 1.01 to 1.8.

16. Black iron-based composite particles according to claim 1, wherein said black iron oxide particles are magnetite particles or manganese-containing hematite particles.

17. Black iron-based composite particles according to claim 1, wherein said black iron oxide hydroxide particles are manganese-containing goethite particles.

18. Black iron-based composite particles according to claim 1, wherein the amount of said coating organosilicon compounds is 0.02 to 5.0% by weight, calculated as Si, based on the total weight of the organosilicon compounds and said black iron oxide particles or black iron oxide hydroxide particles.

19. Black iron-based composite particles according to claim 1, wherein said carbon black coat is obtained by mixing carbon black fine particles having a particle size of 0.005 to 0.05 µm with the black iron oxide particles or black iron oxide hydroxide particles coated with at least one organosilicon compound while applying a shear force.

20. Black iron-based composite particles according to claim 1, wherein the thickness of said carbon black coat is not more than 0.04 μm.

21. A process for producing black iron-based composite particles defined in claim 1, which process comprises:

mixing as core particles black iron oxide particles or black iron oxide hydroxide particles having an average particle size of 0.08 to 1.0 μm together with at least one compound selected from the group consisting of:

(1) alkoxysilane compounds, (2) polysiloxanes or modified polysiloxanes, and (3) fluoroalkylsilane compounds by using an apparatus capable of applying a shear force to the core particles, thereby coating the surface of said black iron oxide particle or black iron oxide hydroxide particle with the said compounds;

mixing the obtained black iron oxide particles or black iron oxide hydroxide particles coated with the said compounds and carbon black fine particles having an average particle size of 0.005 to 0.05 μm in an amount of 1 to 30 parts by weight based on 100 parts by weight of the core particles by using an apparatus capable of applying a shear force to the core particles, thereby forming carbon black coat on the surface of a coating layer comprising the organosilicon compounds.

22. A process for producing black iron-based composite particles according to claim 21, wherein said black iron oxide particles or black iron oxide hydroxide particles as core particles are coated with at least one compound selected from the group consisting of hydroxides of aluminum, oxides of aluminum, hydroxides of silicon and oxides of silicon.

23. A paint comprising:

said black iron-based composite particles defined in claim 1; and a paint base material.

24. A paint according to claim 23, wherein the amount of said black iron-based composite particles is 1.0 to 100 parts by weight based on 100 parts by weight of said paint base material.

25. A rubber or resin composition comprising:

said black iron-based composite particles defined in claim 1; and a base material for rubber or resin composition.

26. A rubber or resin composition according to claim 25, wherein the amount of said black iron-based composite particles is 0.5 to 200 parts by weight based on 100 parts by weight of said base material for rubber or resin composition.

* * * * *